United States Patent
Tanaka et al.

(10) Patent No.: US 6,470,376 B1
(45) Date of Patent: Oct. 22, 2002

(54) PROCESSOR CAPABLE OF EFFICIENTLY EXECUTING MANY ASYNCHRONOUS EVENT TASKS

(75) Inventors: Takaharu Tanaka, Katano (JP);
  Kiyoshi Maenobu, Amagasaki (JP);
  Kosuke Yoshioka, Neyaga (JP);
  Makoto Hirai, Suita (JP); Tokuzo Kiyohara, Osaka (JP)

(73) Assignee: Matsushita Electric Industrial Co., LTD, Osaka-fu (JP)

( * ) Notice: Subject to any disclaimer, the term of this patent is extended or adjusted under 35 U.S.C. 154(b) by 0 days.

(21) Appl. No.: 09/034,198

(22) Filed: Mar. 3, 1998

(30) Foreign Application Priority Data

Mar. 4, 1997 (JP) .............................. 9-049370

(51) Int. Cl.$^7$ ................................................ G06F 9/00
(52) U.S. Cl. ...................................... 709/108; 709/106
(58) Field of Search ................................. 709/106, 107, 709/108, 102; 712/246, 228

(56) References Cited

U.S. PATENT DOCUMENTS

| | | | |
|---|---|---|---|
| 3,728,692 A | * | 4/1973 | Fennel, Jr. .................. 712/205 |
| 4,348,725 A | * | 9/1982 | Farrell et al. ............... 364/134 |
| 5,136,710 A | | 8/1992 | Arnold et al. |
| 5,210,872 A | | 5/1993 | Ferguson et al. |
| 5,371,887 A | | 12/1994 | Yoshida et al. |
| 5,600,837 A | * | 2/1997 | Artieri ......................... 709/103 |
| 5,630,130 A | | 5/1997 | Perotto et al. |
| 5,761,522 A | * | 6/1998 | Hisanaga et al. ............... 712/1 |
| 5,799,182 A | * | 8/1998 | Gravenstein et al. ........ 712/245 |
| 5,867,704 A | * | 2/1999 | Tanaka et al. ............... 709/105 |
| 6,085,218 A | * | 7/2000 | Carmon ....................... 709/107 |

FOREIGN PATENT DOCUMENTS

| | | | |
|---|---|---|---|
| EP | 403729 | * | 12/1990 |
| JP | 01-099132 | | 4/1989 |
| JP | 01-169540 | | 7/1989 |
| JP | 06-187170 | | 7/1994 |
| JP | 06-202887 | | 7/1994 |
| JP | 08-249194 | | 9/1996 |
| WO | 94/15287 | * | 7/1994 |

\* cited by examiner

Primary Examiner—Larry D. Donaghue
(74) Attorney, Agent, or Firm—Price & Gess

(57) ABSTRACT

The counter 52 is set with an initial value of "1" and is a counter with a maximum value of "4". This counter 52 increments the count value held by the flip-flop 51 in synchronization with a clock signal so that the count value changes as shown by the progression 1,2,3,4,1,2,3,4. This clock signal is also used by the instruction decode control unit 11 to control the execution of instructions, with the counting by the counter 52 being performed once for each instruction execution performed by the instruction decode control unit 11. The comparator 54 compares the count value counted by the counter 52 with the maximum value "4", and when the values match, sets the task switching signal chg_task_ex at a "High" value, so that the processing switches to the execution of the next task.

28 Claims, 56 Drawing Sheets

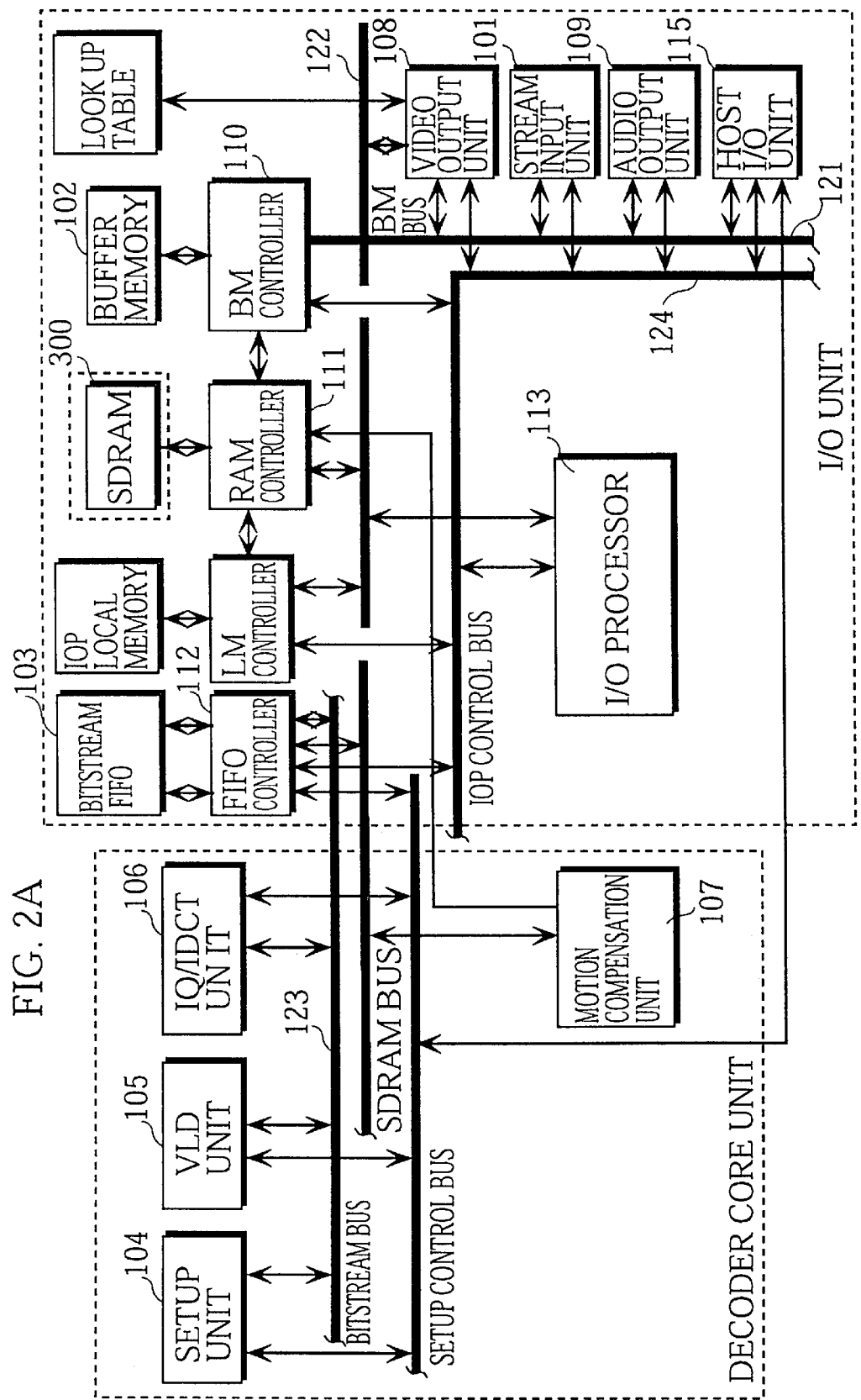

FIG. 4B

OUTPUT LOGIC OF THE SELECTOR 25

| | |
|---|---|
| WHEN A wait_until_next_thread instruction IS DECODED | ADDRESS (ROUTE ①) IS OUTPUTTED FROM THE SELECTOR 26 |
| WHEN AN ABSOLUTE ADDRESS-INDICATING BRANCH INSTRUCTION IS DECODED | ADDRESS (ROUTE ②) IS OUTPUTTED FROM THE DECODER 11 |
| WHEN AN INDIRECT ADDRESSING BRANCH INSTRUCTION IS DECODED | ADDRESS (ROUTE ③) IS OUTPUTTED FROM THE ALU 14 |
| WHEN A chg_task_id SIGNAL IS OUTPUTTED | ADDRESS (ROUTE ④) IS OUTPUTTED FROM THE IF 2 | taskID task0 000      task1 001
task2 010      task3 011
task4 100      task5 101 taskn bit5   bit4   bit3   bit2   bit1   bit0 bit0 · · · 1 : task0 EXECUTED    0 : NOT EXECUTED
bit1 · · · 1 : task1 EXECUTED    0 : NOT EXECUTED
bit2 · · · 1 : task2 EXECUTED    0 : NOT EXECUTED
bit3 · · · 1 : task3 EXECUTED    0 : NOT EXECUTED
bit4 · · · 1 : task4 EXECUTED    0 : NOT EXECUTED
bit5 · · · 1 : task5 EXECUTED    0 : NOT EXECUTED

FIG. 7A

| task0 | task1 | task2 | task3 | task4 | task5 |
|---|---|---|---|---|---|
| INSTRUCTION 0-0 | INSTRUCTION 1-0 | INSTRUCTION 2-0 | INSTRUCTION 3-0 | INSTRUCTION 4-0 | INSTRUCTION 5-0 |
| INSTRUCTION 0-1 | INSTRUCTION 1-1 | INSTRUCTION 2-1 | INSTRUCTION 3-1 | INSTRUCTION 4-1 | INSTRUCTION 5-1 |
| INSTRUCTION 0-2 | INSTRUCTION 1-2 | INSTRUCTION 2-2 | INSTRUCTION 3-2 | INSTRUCTION 4-2 | INSTRUCTION 5-2 |
| INSTRUCTION 0-3 | INSTRUCTION 1-3 | INSTRUCTION 2-3 | INSTRUCTION 3-3 | INSTRUCTION 4-3 | INSTRUCTION 5-3 |
| INSTRUCTION 0-4 | INSTRUCTION 1-4 | INSTRUCTION 2-4 | INSTRUCTION 3-4 | INSTRUCTION 4-4 | INSTRUCTION 5-4 |
| INSTRUCTION 0-5 | INSTRUCTION 1-5 | INSTRUCTION 2-5 | INSTRUCTION 3-5 | INSTRUCTION 4-5 | INSTRUCTION 5-5 |
| INSTRUCTION 0-6 | INSTRUCTION 1-6 | INSTRUCTION 2-6 | INSTRUCTION 3-6 | INSTRUCTION 4-6 | INSTRUCTION 5-6 |
| INSTRUCTION 0-7 | INSTRUCTION 1-7 | INSTRUCTION 2-7 | INSTRUCTION 3-7 | INSTRUCTION 4-7 | INSTRUCTION 5-7 |
| INSTRUCTION 0-8 | INSTRUCTION 1-8 | INSTRUCTION 2-8 | INSTRUCTION 3-8 | INSTRUCTION 4-8 | INSTRUCTION 5-8 |
| INSTRUCTION 0-9 | INSTRUCTION 1-9 | INSTRUCTION 2-9 | INSTRUCTION 3-9 | INSTRUCTION 4-9 | INSTRUCTION 5-9 |
| INSTRUCTION 0-10 | INSTRUCTION 1-10 | INSTRUCTION 2-10 | INSTRUCTION 3-10 | INSTRUCTION 4-10 | INSTRUCTION 5-10 |
| INSTRUCTION 0-11 | INSTRUCTION 1-11 | INSTRUCTION 2-11 | INSTRUCTION 3-11 | INSTRUCTION 4-11 | INSTRUCTION 5-11 |
| INSTRUCTION 0-12 | INSTRUCTION 1-12 | INSTRUCTION 2-12 | INSTRUCTION 3-12 | INSTRUCTION 4-12 | INSTRUCTION 5-12 |
| INSTRUCTION 0-13 | INSTRUCTION 1-13 | INSTRUCTION 2-13 | INSTRUCTION 3-13 | INSTRUCTION 4-13 | INSTRUCTION 5-13 |
| INSTRUCTION 0-14 | INSTRUCTION 1-14 | INSTRUCTION 2-14 | INSTRUCTION 3-14 | INSTRUCTION 4-14 | INSTRUCTION 5-14 |
| INSTRUCTION 0-15 | INSTRUCTION 1-15 | INSTRUCTION 2-15 | INSTRUCTION 3-15 | INSTRUCTION 4-15 | INSTRUCTION 5-15 |

FIG. 7B

REGISTER INDICATING ARITHMETIC INSTRUCTION

| 0 | 0 | src1 | src2 | dest/cond | operation |
|---|---|------|------|-----------|-----------|
| 0 1 | | 2   4 5   7 | | 8   10 | 11   15 |

| high\low operation | 00 | 01 | 10 | 11 |
|---|---|---|---|---|
| 000 | src1+src2=dst ADD | src1-src2=dst SUB | src1×src2=dst MUL | src1 cmp src2(cond) CMP |
| 001 | src1≪src2=dst | src1≫src2=dst | src1≫src2=dst | src1≫(32-src2)=dst |
| 010 | src1 and src2=dst AND | src1 or src2=dst OR | src1 xor src2=dst XOR | src1 test src2(cond) TST |
| 011 | src1 andn src2=dst ANDN | src1 orn src2=dst ORN | src1 xnor src2=dst XNOR | |
| 100 | src1=dst MOV | -src1=dst NOT | NOP | |
| 101 | | Mask G(src1)=dst MASKG | NOP | bra src1,pc+1=dst BRA |
| 110 | BIN0 | BIN1 | BIN2 | BIN3 |
| 111 | BEX0 | BEX1 | BEX2 | BEX3 |

FIG. 7C

MEMORY LOAD/MEMORY STORE INSTRUCTION

| 0 1 | src1 | src/dst | 1 0 | operation | im:3 |
|---|---|---|---|---|---|
| 0 | 2 | 4  5 | 7  8 | 9 10 11 12 | 13 |

| operation: | high / low | 0 | 1 |
|---|---|---|---|
| | 10 | Mem(im:3+src1) ⇒ dst_REG | src_REG ⇒ Mem(im:3+src1) |

FIG. 7D  IMMEDIATE COMPARISON INSTRUCTION/IMMEDIATE CALCULATION INSTRUCTION/ABSOLUTE ADDRESS-INDICATING BRANCH INSTRUCTION

```
| 0 | operation | src/dst |   imm:8   |
  0        1   4 5       7 8         15 imm:11
```

| operation: high \ low | 00 | 01 | 10 | 11 |
|---|---|---|---|---|
| 00 | src+im8⇒dst  ADD | src-im8=dst  SUB | src cmp im8(==) | srccmp im8(!=) |
| 01 | src or im8⇒dst  OR | src andn im8=dst  AND | src cmp im8(>=) | src cmp im8(<) |
| 10 | src≪im8⇒dst  LSL | im8≪24=dst | s×im8⇒d  MUL | src test im8(!=) |
| 11 | im:8⇒dst  MOV | (s≪8)+im8⇒dst | im:11⇒r0  MOV | bra im:11  BRAI |

FIG. 10A

| task0 | task1 | task2 | task3 | task4 | task5 |
|---|---|---|---|---|---|
| INSTRUCTION 0-0 | INSTRUCTION 1-0 | INSTRUCTION 2-0 | INSTRUCTION 3-0 | INSTRUCTION 4-0 | INSTRUCTION 5-0 |
| INSTRUCTION 0-1<br>●wuns | INSTRUCTION 1-1 | INSTRUCTION 2-1 | INSTRUCTION 3-1 | INSTRUCTION 4-1 | INSTRUCTION 5-1 |
| INSTRUCTION 0-2<br>LD mem1,r0 | INSTRUCTION 1-2 | INSTRUCTION 2-2 | INSTRUCTION 3-2 | INSTRUCTION 4-2 | INSTRUCTION 5-2 |
| INSTRUCTION 0-3<br>LD buf1,r1 | INSTRUCTION 1-3 | INSTRUCTION 2-3 | INSTRUCTION 3-3 | INSTRUCTION 4-3 | INSTRUCTION 5-3 |
| INSTRUCTION 0-4<br>mul r0,r1,r2 | INSTRUCTION 1-4 | INSTRUCTION 2-4 | INSTRUCTION 3-4 | INSTRUCTION 4-4 | INSTRUCTION 5-4 |
| INSTRUCTION 0-5<br>ST r2,mem1 | INSTRUCTION 1-5 | INSTRUCTION 2-5 | INSTRUCTION 3-5 | INSTRUCTION 4-5 | INSTRUCTION 5-5 |
| INSTRUCTION 0-6 | INSTRUCTION 1-6 | INSTRUCTION 2-6 | INSTRUCTION 3-6 | INSTRUCTION 4-6 | INSTRUCTION 5-6 |
| INSTRUCTION 0-7 | INSTRUCTION 1-7 | INSTRUCTION 2-7 | INSTRUCTION 3-7 | INSTRUCTION 4-7 | INSTRUCTION 5-7 |
| INSTRUCTION 0-8 | INSTRUCTION 1-8 | INSTRUCTION 2-8 | INSTRUCTION 3-8 | INSTRUCTION 4-8 | INSTRUCTION 5-8 |
| INSTRUCTION 0-9 | INSTRUCTION 1-9 | INSTRUCTION 2-9 | INSTRUCTION 3-9 | INSTRUCTION 4-9 | INSTRUCTION 5-9 |

FIG. 14B

OUTPUT LOGIC OF THE SELECTOR 25

| | OUTPUT LOGIC OF THE SELECTOR 25 |
|---|---|
| WHEN A wait_until_next_thread instruction IS DECODED | ADDRESS (ROUTE ①) IS OUTPUTTED FROM THE SELECTOR 26 |
| WHEN AN ABSOLUTE ADDRESS-INDICATING BRANCH INSTRUCTION IS DECODED | ADDRESS (ROUTE ②) IS OUTPUTTED FROM THE DECODER 11 |
| WHEN AN INDIRECT ADDRESSING BRANCH INSTRUCTION IS DECODED | ADDRESS (ROUTE ③) IS OUTPUTTED FROM THE ALU 14 |
| WHEN A chg_task_id SIGNAL IS OUTPUTTED | ADDRESS (ROUTE ④) IS OUTPUTTED FROM THE IF 2 |
| WHEN A cmp_and_wait INSTRUCTION IS DECODED | ADDRESS (ROUTE ⑤) IS OUTPUTTED FROM THE FE 27 | wait BITS bit0 · · · 1 : task0 SET IN wait STATE   0 : NOT SET
bit1 · · · 1 : task1 SET IN wait STATE   0 : NOT SET
bit2 · · · 1 : task2 SET IN wait STATE   0 : NOT SET
bit3 · · · 1 : task3 SET IN wait STATE   0 : NOT SET
bit4 · · · 1 : task4 SET IN wait STATE   0 : NOT SET
bit5 · · · 1 : task5 SET IN wait STATE   0 : NOT SET FIG. 17
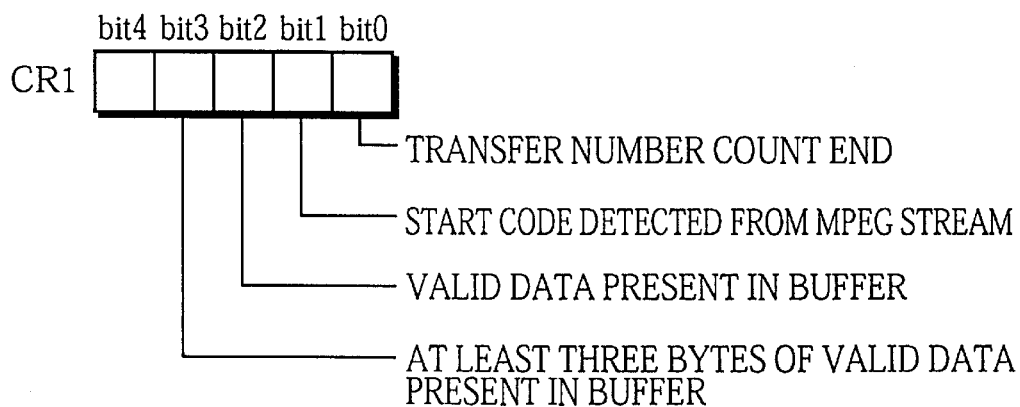
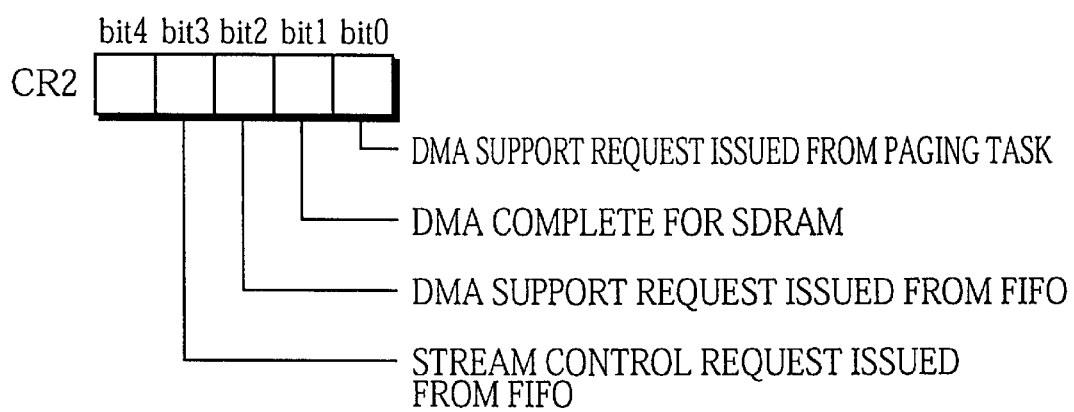
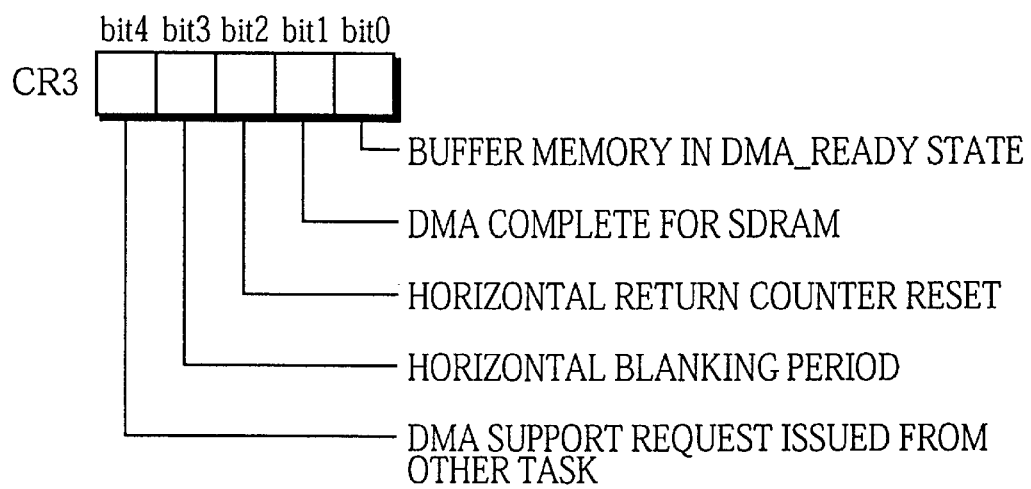

PHENOMENA j0,j3,j4,j5 NOT PRESENT

FRAME FOR WHICH ONLY THE PHENOMENON j0 AWAITED BY
THE cmp_and_wait INSTRUCTION OF task0 IS PRESENT FRAMES FOLLOWING THE OCCURRENCE OF PHENOMENON j0

| iexecmode | !cstate | OUTPUT OF SELECTOR 52 |
|---|---|---|
| 1 | 0 | taskide |
| 0 | 1 | taskidne |
| 0 | 0 | taskidne |
| 1 | 1 | taskidne |

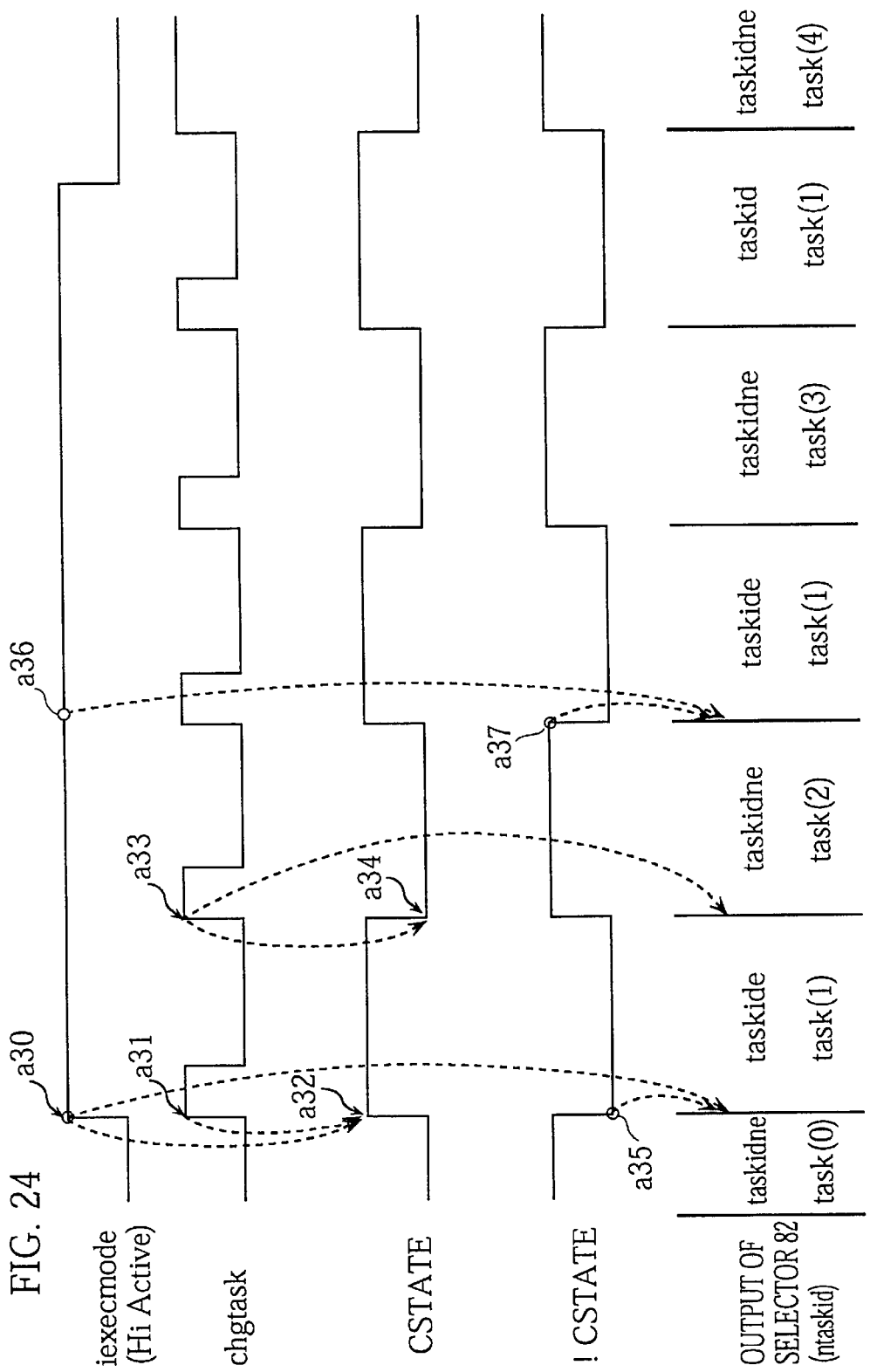

FIG. 25A

NORMAL STATE

```
task0  task2  task3  task4  task5
+----+----+----+----+----+
4cycle 4cycle 4cycle 4cycle 4cycle
```

FIG. 25B

EMERGENCY STATE

```
task0  task1  task2  task1  task3  task1  task4  task1  task5  task1
+----+----+----+----+----+----+----+----+----+----+
4cycle 4cycle 4cycle 4cycle 4cycle 4cycle 4cycle 4cycle 4cycle 4cycle
``` sleep BITS bit0 ··· 0 : task0 SET IN sleep STATE    1 : NOT SET
bit1 ··· 0 : task1 SET IN sleep STATE    1 : NOT SET
bit2 ··· 0 : task2 SET IN sleep STATE    1 : NOT SET
bit3 ··· 0 : task3 SET IN sleep STATE    1 : NOT SET
bit4 ··· 0 : task4 SET IN sleep STATE    1 : NOT SET
bit5 ··· 0 : task5 SET IN sleep STATE    1 : NOT SET

FIG. 29A

| task0 MEMORY CONTROL | task1 PAGING | task2 | task3 HOST I/F | task4 | task5 |
|---|---|---|---|---|---|
| INSTRUCTION 0-0 | INSTRUCTION 1-0 | INSTRUCTION 2-0 | INSTRUCTION 3-0 | INSTRUCTION 4-0 | INSTRUCTION 5-0 |
| INSTRUCTION 0-1 | INSTRUCTION 1-1 ●sleep | INSTRUCTION 2-1 ●sleep | INSTRUCTION 3-1 ●sleep | INSTRUCTION 4-1 | INSTRUCTION 5-1 |
| INSTRUCTION 0-2 | INSTRUCTION 1-2 | INSTRUCTION 2-2 | INSTRUCTION 3-2 | INSTRUCTION 4-2 | INSTRUCTION 5-2 |
| INSTRUCTION 0-3 | INSTRUCTION 1-3 | INSTRUCTION 2-3 | INSTRUCTION 3-3 | INSTRUCTION 4-3 | INSTRUCTION 5-3 |
| INSTRUCTION 0-4 | INSTRUCTION 1-4 | INSTRUCTION 2-4 | INSTRUCTION 3-4 | INSTRUCTION 4-4 | INSTRUCTION 5-4 |
| INSTRUCTION 0-5 | INSTRUCTION 1-5 | INSTRUCTION 2-5 | INSTRUCTION 3-5 | INSTRUCTION 4-5 | INSTRUCTION 5-5 |
| INSTRUCTION 0-6 | INSTRUCTION 1-6 | INSTRUCTION 2-6 | INSTRUCTION 3-6 | INSTRUCTION 4-6 | INSTRUCTION 5-6 |
| INSTRUCTION 0-7 | INSTRUCTION 1-7 | INSTRUCTION 2-7 | INSTRUCTION 3-7 | INSTRUCTION 4-7 | INSTRUCTION 5-7 |
| INSTRUCTION 0-8 | INSTRUCTION 1-8 | INSTRUCTION 2-8 | INSTRUCTION 3-8 | INSTRUCTION 4-8 | INSTRUCTION 5-8 |
| INSTRUCTION 0-9 | INSTRUCTION 1-9 | INSTRUCTION 2-9 | INSTRUCTION 3-9 | INSTRUCTION 4-9 | INSTRUCTION 5-9 |
| INSTRUCTION 0-10 ★wake(3) | INSTRUCTION 1-10 | INSTRUCTION 2-10 | INSTRUCTION 3-10 | INSTRUCTION 4-10 | INSTRUCTION 5-10 |
| INSTRUCTION 0-11 | INSTRUCTION 1-11 | INSTRUCTION 2-11 | INSTRUCTION 3-11 | INSTRUCTION 4-11 | INSTRUCTION 5-11 |
| INSTRUCTION 0-12 | INSTRUCTION 1-12 | INSTRUCTION 2-12 | INSTRUCTION 3-12 | INSTRUCTION 4-12 | INSTRUCTION 5-12 |
| INSTRUCTION 0-13 ★wake(1) | INSTRUCTION 1-13 | INSTRUCTION 2-13 | INSTRUCTION 3-13 | INSTRUCTION 4-13 | INSTRUCTION 5-13 |
| INSTRUCTION 0-14 | INSTRUCTION 1-14 | INSTRUCTION 2-14 | INSTRUCTION 3-14 | INSTRUCTION 4-14 | INSTRUCTION 5-14 |
| INSTRUCTION 0-15 | INSTRUCTION 1-15 | INSTRUCTION 2-15 | INSTRUCTION 3-15 | INSTRUCTION 4-15 | INSTRUCTION 5-15 |

FIG. 31A

WHEN sleep INSTRUCTION IN task1 task2 task3 IS EXECUTED

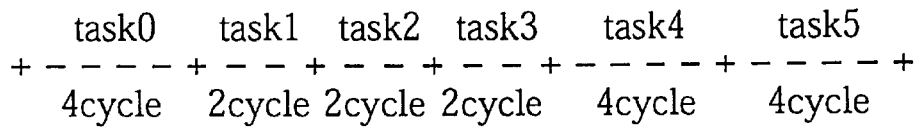

```
   task0    task1   task2   task3    task4       task5
+ - - - - + - - + - - + - - + - - - - + - - - - +
  4cycle   2cycle 2cycle 2cycle  4cycle      4cycle
```

FIG. 31B

WHEN task1 task2 task3 ARE ASLEEP

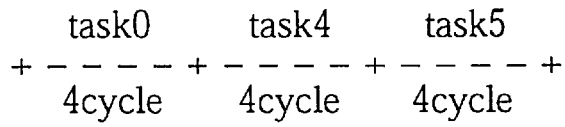

```
    task0      task4     task5
+ - - - - + - - - - + - - - - +
   4cycle    4cycle    4cycle
```

FIG. 31C

WHEN task3 IS ACTIVATED

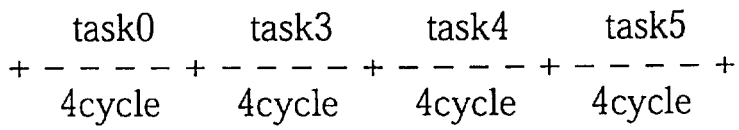

```
   task0     task3      task4      task5
+ - - - - + - - - - + - - - - + - - - - +
  4cycle    4cycle     4cycle     4cycle
```

FIG. 31D

WHEN task1 IS ACTIVATED

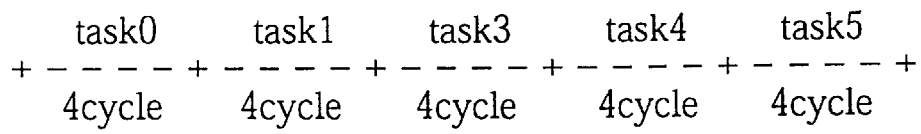

```
   task0     task1      task3      task4      task5
+ - - - - + - - - - + - - - - + - - - - + - - - - +
  4cycle    4cycle     4cycle     4cycle     4cycle
```

PROCESSOR CAPABLE OF EFFICIENTLY EXECUTING MANY ASYNCHRONOUS EVENT TASKS

BACKGROUND OF THE INVENTION

1. Field of the Invention

The present invention relates to a processor to be used in an AV (Audio Visual) decoder that reproduces multimedia data of variable code length, such as MPEG (Moving Pictures Experts Group) streams, and is a specialized processor that oversees the periphery control by the main processor in an AV decoder.

2. Description of the Prior Art

The reproduction of MPEG streams is a fundamental technique in the field of multimedia and has been subject to an explosion in demand in recent years. Of the various MPEG reproduction techniques, the new field of consumer reproduction devices that interactively reproduce video and audio has been subject to special attention. To ensure the success of their products, the various manufacturers in this field have been making huge efforts to develop AV decoders that enable the high quality reproduction of MPEG streams.

While a variety of processes are necessary when reproducing MPEG streams, these processes can be roughly classified into Audio-Video (AV) decoding core processing and asynchronous event processing.

The AV decoding core processing for MPEG reproduction is composed of processes such as inverse quantization, inverse discrete cosine transform (hereinafter, "DCT"), and motion compensation that are performed on macro blocks composed of 16 by 16 pixels. Since 4,050 (=30 frames*30 slices*45 macro blocks) macro blocks need to be processed every second, a huge amount of computation is required. The execution of the AV decoding core processing is well suited to pipeline processing, and when increases in the scale of the hardware are not a concern, a plurality of decoders and calculators can be provided to share the load of the AV decoding core processing.

The asynchronous event processing is composed of processing that should be intensively executed when a certain state (hereinafter, "phenomenon") is present due to the concurrence of a plurality of factors, and processing that should be cyclically performed with a given interval. In short, asynchronous event processing is a general name for processing that cannot be performed in synchronization with the AV decoding core processing.

For an AV decoder, the processing which corresponds to this asynchronous event processing has the following three types.

(1) Processing relating to input of MPEG streams from a recording medium or a communication medium.

(2) Processing relating to output from the AV decoder to an image reproduction device and an audio reproduction device.

(3) Processing relating to input and output between the AV decoder and an expansion memory provided externally to the AV decoder.

Of these, the asynchronous event processing (1) related to the input of streams from a recording medium includes (1-1) extraction processing whereby elementary streams are extracted from the MPEG streams taken from a recording medium such as an optical disc, or a communication medium, and (1-2) write processing whereby the extracted elementary streams are written into an SDRAM connected as an expansion memory.

The asynchronous event processing (2) related to output and reproduction includes (2-1) output processing whereby video streams and audio streams are decoded into video signals and audio signals and are outputted to a display and speakers, and (2-2) processing whereby sub-pictures outputted as the private stream in the MPEG stream are formed and combined with the video data to superimpose subtitles onto the image signal.

The asynchronous event processing (3) related to input and output between the AV decoder and the expansion memory includes (3-1) write processing whereby the accumulation of data that has been subjected to inverse quantization, inverse DCT, and motion compensation in the internal buffer is monitored until a certain amount of data has been reached, at which point the data is collectively written into the SDRAM, and (3-2) replenish processing whereby the internal buffer is intermittently replenished with unprocessed data from the externally connected SDRAM as the inverse quantization, inverse DCT, and motion compensation progress.

In addition to the kinds of processing described above, processing which needs to be performed in response to user operations is also classified as asynchronous event processing. For application systems where reproduction apparatuses not only reproduce MPEG streams but also allow the user to make interactive operations, or systems where control is performed in synchronization with a host computer, there is a greater need for such asynchronous event processing to be performed by the AV decoder.

Of the kinds of processing described above, processing (2-1) includes processing known as "audio out tasks" and is performed at intervals of 90 $\mu$sec, and processing known as "video out tasks" where the processing of one line of images needs to be completed within 50 $\mu$sec based on the interval of the horizontal synchronization signal of a display.

The reason the audio out tasks and video out tasks described above are given the execution cycles described above is that these tasks need to be completed within the given time for smooth, real-time reproduction of video and audio to be possible. This is to say, the completion of video out tasks and audio out tasks within the stated 50 $\mu$sec and 90 $\mu$sec cycles is the principle requirement for video and audio reproduction to be performed in real time.

Under conventional MPEG stream reproduction techniques, when asynchronous event processing is to be performed by a standard processor, the processor is informed of the appearance of the certain phenomenon for the asynchronous event or of the elapsing of the stipulated interval. Having been informed that asynchronous event processing is to be performed, the standard processor uses a branch instruction to branch to the asynchronous event processing.

However, under conventional methods where asynchronous event processing is executed by standard processor using an interrupt signal, there is the problem that there is no universal method for calculating the optimal minimum operation clock frequency which shows the minimum setting of the operation clock required for the processing of audio out tasks and video out tasks to be completed on time.

Since there is no way of calculating the optimal minimum number, the operation clock has to be determined by making a generous estimate, so that there is a general tendency for the operation clock frequency to be set too high.

The following is a description of the conventional calculation method used for calculating the operation clock. This description will focus on the case where processing with different intervals, which is to say audio out tasks with an execution interval of 90 μsec and video out tasks with an execution interval of 50 μsec have to be executed. In this case, the decoding of audio streams needs to be completed at 90 μsec intervals, which is to say by the 0 μsec, 90 μsec, 180 μsec, 270 μsec, 360 μsec, and 450 μsec marks, while the decoding of video streams needs to be completed at 50 μsec intervals, which is to say by the 0 μsec, 50 μsec, 100 μsec, 150 μsec, 200 μsec, and 250 μsec marks. Here, a conventional processor is informed of the elapsing of the two intervals by interrupt signals and then processes the video out tasks and audio out tasks.

On being informed of the time to execute by an interrupt signal and activating the video out task and audio out tasks, the time limit for completing the processing of each task is found as the time from the occurrence of the interrupt signal for activating the processor to the time at which the interrupt signal for activating the next task is issued.

FIG. 1 is a timing chart showing the case when a standard processor executes the tasks described above having been informed by the interrupt signals with the stated intervals of 50 μsec and 90 μsec. The following is an explanation of the time limits for the completion of the audio out tasks and video out tasks that are shown in FIG. 1.

After the pulse P1 and the pulse P5 have been issued to instruct the standard processor to activate the video out task and audio out task, the processing for the video out task and audio out task need to be performed by the 50 μsec mark at which the next pulse P2 that is the next interrupt signal is issued.

On the other hand, once the pulse P6 has been issued to instruct the standard processor to activate the next audio out task, there is only a 10 μsec interval before the issuance of the next pulse P3, with this marking the time limit by which the processing for the audio out task needs to be performed.

When the operation clock is calculated from such time limits, the operation clock frequency for executing audio out tasks and video out tasks has to be set for the worst case scenario for the time limit which is this extremely short time limit of 10 μsec. As a result, setting the operation clock at a high value is unavoidable. However, if the operation clock is set a high value, there will be a remarkable increase in power consumption, making such processors unsuitable for consumer products.

SUMMARY OF THE INVENTION

It is a first object of the present invention to provide a processor which, when there is a plurality of asynchronous event processes which have predetermined processing amounts and which need to be repeatedly performed with a given interval, can calculate an optimum minimum number of cycles that should be assigned to each asynchronous event task, and from these can calculate the optimum minimum operational clock frequency necessary for the execution of all of the tasks.

This first object can be achieved by A processor for processing n tasks, the processor including: an execution task indicating unit for outputting a task identifier for one of the n tasks and, when execution of instructions has been performed for a number of instructions assigned to a task corresponding to the outputted task identifier, outputting a next task identifier in a predetermined order; an instruction indicating unit for indicating one instruction at a time in order in the task corresponding to the outputted task identifier outputted by the execution task indicating unit; and an executing unit for executing the instruction indicated by the instruction indicating unit.

With the stated construction, n tasks that include audio out tasks and video out tasks can be successively executed a predetermined number of instructions at a time without having to wait for interrupt signals to be issued.

By having tasks successively executed in this way, the optimal lowest operational clock frequency for favorably executing audio out tasks and video out tasks can be fundamentally derived from the minimum number of instructions that need to be executed in a given interval, from the execution cycle, and from the total number of tasks. The optimal minimum operation clock frequency for executing all of the tasks can then be found from these values.

Since an optimal minimum value for the operation clock frequency is calculated, it is no longer necessary to set the operation clock signal at a higher value to guarantee that audio out tasks and video out tasks can be performed in real time. As a result, MPEG streams can be favorably decoded even if a lower-speed processor is used for mass-produced consumer products.

Here, the execution task indicating unit may include: a task switching signal generator for counting a count number which is a number of times instructions are issued and for issuing a task switching signal when the count number becomes equal to the number of instructions assigned to the task corresponding to the outputted task identifier; and a task identifier outputting unit for generating the next task identifier in the predetermined order when the task switching signal has been issued.

Here, the task identifier outputting unit may include: an order storing unit for storing an output order for outputting each task identifier as the predetermined order of the n tasks; and a selection outputting unit for outputting, when a task switching signal has been issued by the task switching signal generator, a task identifier which is next in the output order stored by the order storing unit to the instruction indicating unit.

Here, at least one of the n tasks may include an emergency announcement instruction that indicates that a present task requires emergency treatment, and the execution task indicating unit may include: a monitoring unit for monitoring whether a predetermined signal has been inputted from a periphery of the processor to judge whether the periphery of the processor is in an emergency state; an emergency task register for storing an identifier of an emergency task that should be given emergency treatment while the predetermined signal shows that the periphery of the processor is in an emergency state; and an output ratio control unit which (1) when no task identifier for an emergency task is stored in the emergency task register, forwards the task identifier outputted by the selection outputting unit to the executing unit when a task switching signal is issued, and (2) when a task identifier for an emergency task is stored in the emergency task register, forwards, at a ratio of once every m task switching signals (where m≧2), the task identifier for the emergency task stored in the emergency task register to the executing unit when a task switching signal is issued.

With the stated construction, an identifier for an asynchronous event task related to image output can be stored in the emergency task register and the output ratio control unit can have the task identifier stored in the emergency task register outputted at a ratio of once every m task switching signals during the emergency period. As a result, a bitstream can be executed during the horizontal blanking period and vertical blanking period of a display. By doing so, the decompression into an image signal can be definitely completed within the display period. Since the processing of reproduction-related hardware is synchronized so as to cyclically become "off", video data can be efficiently processed and the real-time nature of video data tasks can be improved.

Here, at least one of the n tasks may include a sleep-inducing instruction which sets an execution state of a task into a sleep state, wherein the executing unit may include a decoding unit for an instruction which is indicated by the instruction indicating unit as the next instruction to be executed, wherein the execution task indicating unit may further include a sleeping task register for storing, when a decoding result of the decoding unit is a sleep-inducing instruction, a task identifier of a task indicated by the sleep-inducing instruction as a task that should be treated as a sleeping task, and wherein when a next task identifier stored in the order storing unit is a task identifier for a sleeping task, the selection outputting unit may output a task identifier following the task identifier for the sleeping task.

In the decoding process for MPEG streams, tasks with vastly different execution intervals need to be executed in parallel. As one example, the transfer control tasks for the transfer of the luminance blocks and chrominance blocks included in a macro block between buffers need to be performed at least six times. Conversely, tasks which extract elementary streams from an MPEG stream may be performed infrequently.

The sleeping task register stores an identifier of a task that includes a sleep-inducing instruction as a task that should be treated as a sleeping task. The selection outputting unit outputs a following task when the next task identifier in the predetermined order is a sleeping task, so that tasks which do not require frequent execution can be omitted. By doing so, it is possible to improve the efficiency with which sets of all tasks can be executed by giving each asynchronous event task the chance to put itself to sleep in accordance with the differences in execution frequency between the various asynchronous event tasks.

Here, the object of the present invention can be achieved by a processor for executing n tasks, including: a task selecting unit for successively selecting one of the n tasks at intervals of a predetermined number of cycles; a instruction indicating unit, having n sets of instruction indicating information which each correspond to a different one of the n tasks, which validates a set of instruction indicating information that corresponds to the task selected by the task selecting unit and which dynamically generates information indicating which instruction should be read next according to the validated set of instruction indicating information; and an executing unit for reading the instruction indicated by the information generated by the instruction indicating unit and executing the read instruction.

Here, the instruction indicating unit may include: n address registers which each correspond to a different one of the n tasks, each address register storing an address value to be read next for a corresponding task as the set of instruction indicating information for the corresponding task; a register selecting unit for selecting an address register corresponding to the task selected by the task selecting unit and having an address value in the selected address register outputted; a count value register for storing, when an address register has been selected by the register selecting unit, the address value stored in the selected address register as a starting count value; an incrementor for incrementing the count value stored in the count value register in each cycle; and a read address storing unit for storing the count value incremented by the incrementor as an updated value for information that indicates an instruction to be read next.

Here, the instruction indicating unit may include: a first selector for forwarding the count value incremented by the incrementor to the read address storing unit to have the count value stored in the read address storing unit and, when a task has been selected by the task selecting unit, selectively outputting an address value in the address register corresponding to the selected task to have the address value stored in the read address storing unit; and a first rewriting unit which, when switching is performed to a next task, uses the count value stored in the count value register to rewrite the address value stored in the address register that was selected by the register selecting unit before the switching.

Here, at least one task may include a switching instruction that indicates a task switching should be performed, wherein the executing unit may include a decoding unit for decoding an instruction specified by the address stored in the read address storing unit, wherein instruction indicating unit may further include a second rewriting unit which, when a decoding result of the decoding unit is a task switching instruction, uses a set of instruction indication information stored in the read address storing unit to rewrite an address value stored in the address register selected by the register selecting unit before task switching, wherein when the decoding result of the decoding unit is a task switching instruction, the first selector may select a read address of an address register corresponding to a next task and have the read address stored in the read address storing unit.

It is common for asynchronous event processing to control input and output between an internal buffer and an SDRAM, with the operational state of the SDRAM changing in response to various external factors. As a result, it is preferable to have memory verify operations and memory access operations that have an access address in the same memory, which is to say operations which read a value from a memory, use the value to perform a calculation and then write the calculation result back into the same memory performed in a same thread. Conversely, if a read instruction which reads instructions from a memory and a write instruction which uses the value to perform a calculation and then writes the calculation result back into the same memory are arranged into different threads, there can be a change in the operational state of the memory between the thread that includes the first instruction and the thread which includes the second instruction. As a result, while the read instruction may be executed smoothly in the first thread, it may not be possible to execute the memory access instruction in the second thread.

With the stated construction, however, a task switching instruction can be positioned before the read instruction and the write instruction, so that the second rewriting unit can rewrite the content of the address register so as to include the address following the address of the task switching instruction, and the first selector can selectively output the address value of the address register corresponding to the next task to have this address value stored in the read address storing unit. As a result, the instruction execution for a present task can be canceled directly after the task switching instruction has been executed. As a result, when the task identifier of the next task is outputted, the read instructions and write instructions positioned directly after the task switching instruction can be performed within a same thread.

By operating in this way, four instructions for which cancellation midway due to task switching is not desired can be assigned to a same task, and the number of instructions assigned to each thread can be controlled separately using task switching instructions. By performing task switching without waiting for four instructions to be executed every time, the execution of other tasks can be proceeded to more quickly.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2A shows the configuration of an AV decoder;

FIG. 4B is an output logic table for the selector 25 shown in FIG. 10;

FIG. 7A shows the composition of the asynchronous event tasks stored in the instruction memory 100 in the first embodiment;

FIG. 7B shows the instruction format of arithmetic instructions which specifies registers as operands;

FIG. 7C shows the instruction format of the memory load instructions and restore instructions which set a read address and a write address using registers;

FIG. 7D shows the instruction format of the comparison instructions, arithmetic instructions, and branch instructions that can indicate 8-bit and 11-bit immediate values;

FIG. 10A shows which instructions compose the asynchronous event tasks stored in the instruction memory 100 in the second embodiment;

FIG. 14B is an output logic table of the selector 25 shown in FIG. 14A for the third embodiment;

FIG. 17 shows the bit construction of the state monitoring register in the third embodiment;

FIG. 24 is a timing chart showing the timing at which the different task identifiers are outputted in accordance with the emergency task transition permission signal, the task switching signal chg_task_ex, and the transition in the value cstate;

FIG. 25A shows how threads are assigned to the various tasks under normal operational conditions;

FIG. 25B shows how threads are assigned to the various tasks under emergency operational conditions;

FIG. 29A shows how sleep instructions and wake_task instructions can be distributed among the tasks in the fourth embodiment;

FIGS. 31A to 31D show threads are assigned to each task in the fourth embodiment

DESCRIPTION OF THE PREFERRED EMBODIMENTS

First Embodiment

Figure 1:
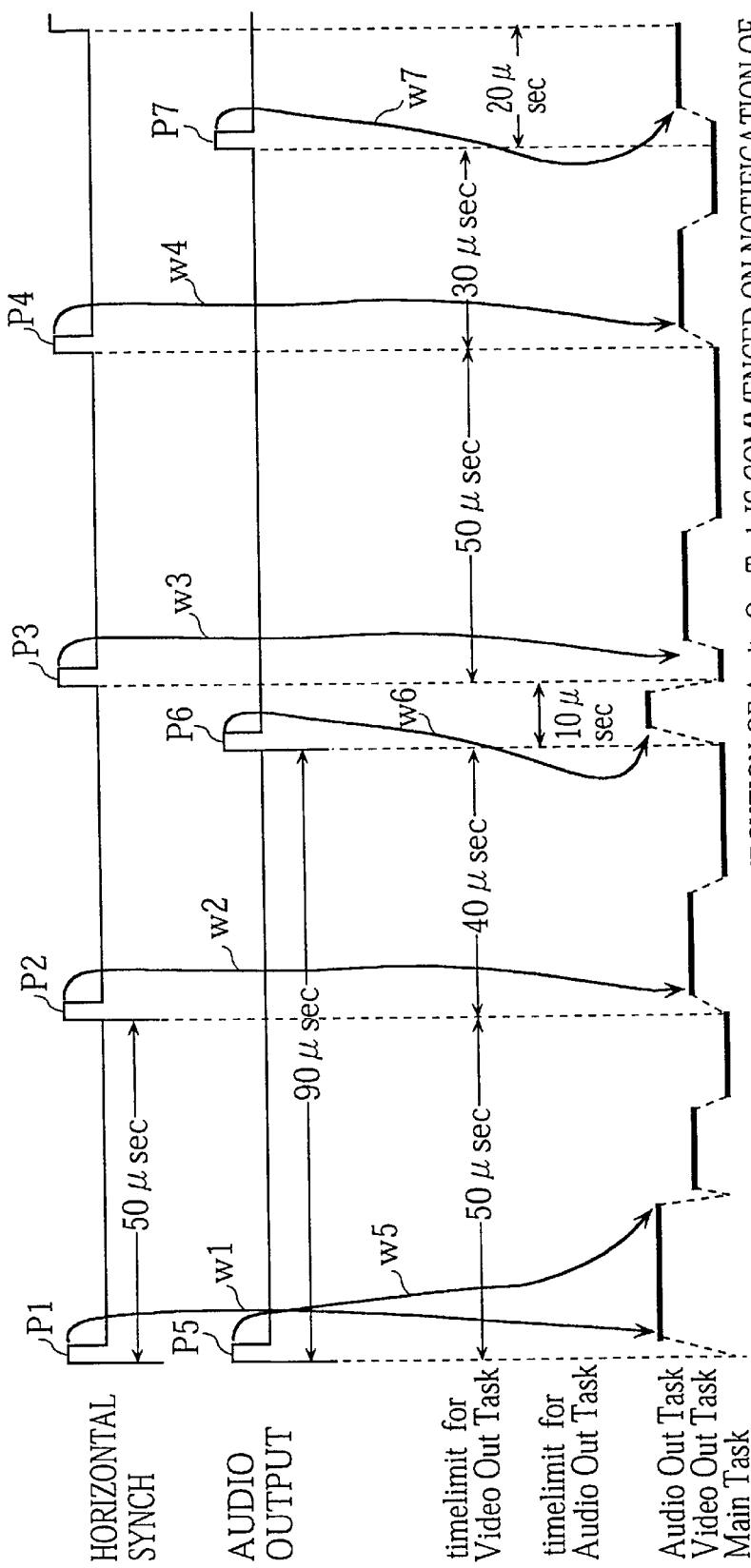
FIG. 1 is a timing chart showing the times by which the processing of video streams and audio streams needs to be completed when performing video out tasks and audio out tasks according to interrupt signals.

Before describing the I/O processor, the following explanation will first focus on the configuration of an AV decoder and on the role played by the I/O processor to which the present invention relates. The configuration of an AV decoder is shown in FIG. 2A.

The AV decoder of FIG. 2A is composed of a decoder core unit which executes the AV decoding core processing and an I/O unit which executes various asynchronous event tasks.

The decoder core unit includes a setup unit 104, a VLD unit 105, an IQ/IDCT unit 106, and a motion compensation unit 107, while the I/O unit includes a stream input unit 101, a buffer memory 102, a bitstream FIFO 103, a video output unit 108, an audio output unit 109, an I/O processor 113, a buffer memory controller 110, a RAM controller 111, a FIFO controller 112, and a host I/O unit 115. The I/O unit also includes a buffer memory bus 121, an SDRAM bus 122, a bitstream bus 123, and an IOP control bus 124 as buses, and is connected to an SDRAM 300 as an expansion memory.

1. Outline of the Decoding Process for an MPEG Stream

Figure 2B:
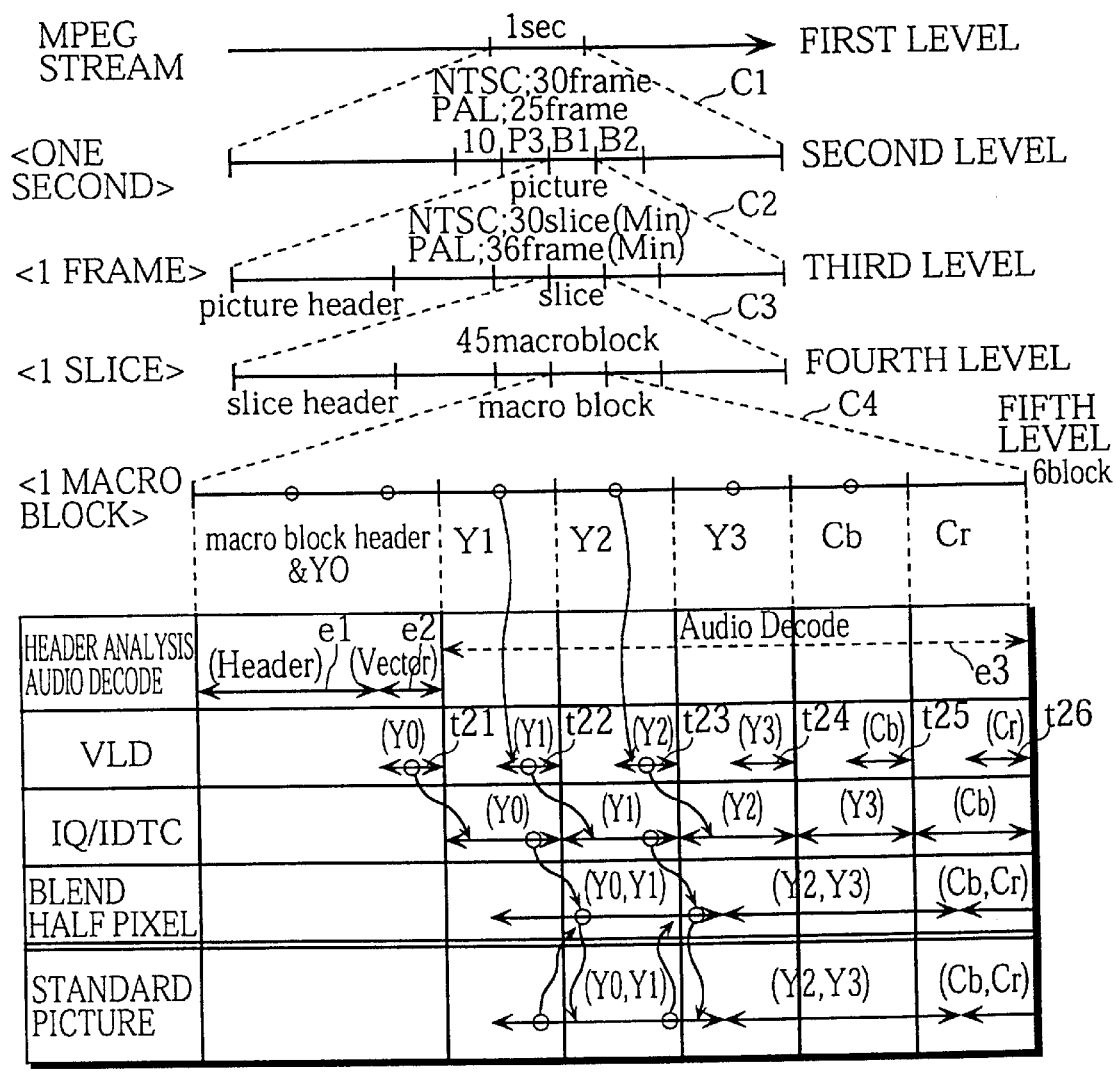
FIG. 2B is a timing chart showing the hierarchical structure of an MPEG stream and the operation timing of various components of an AV decoder.

The following is a simplified explanation of the decoding process for an MPEG stream with reference to FIG. 2B. The MPEG streams referred to in the present embodiment are composed of video streams, audio streams, and sub-picture streams. Of these, video streams are composed of compressed video data, with the video data being restored to video images by combining images that serve as reference images for differential calculation (hereinafter "standard pictures") and images where calculated differences are encoded (hereinafter "differential pictures").

In FIG. 2B, the data construction of the video stream in the MPEG stream is shown as a hierarchy. In this hierarchy, the MPEG stream is on the highest level, with one second of video images being shown as the second level. One frame is shown as the third level, while one slice is shown as the fourth level. Finally, one macro block is shown as the fifth level.

As can be seen from the correspondence between the first level and second level shown by the broken line C1, one second of video images in MPEG is composed of 30 frames of images under NTSC standard (or 25 frames under PAL standard). Also, the image in each frame can be seen to be one of three types which are namely I-pictures ("I0" in FIG. 2B), P-pictures ("P3" in FIG. 2B), and B-pictures ("B1" and "B2" in FIG. 2B).

The I-pictures (short for "Intra-pictures") shown in FIG. 2B are composed of compressed image data, but include luminance components and chrominance components for one entire frame. P-pictures (short for "Predicative-pictures") and B-pictures (short for "Bidirectionally Predicative-pictures"), meanwhile, are differential pictures that do not include such components. Here, P-pictures are differential pictures composed of the differences between the present frame and the preceding frame, while B-pictures are differential pictures composed of the differences between the present frame and the preceding and succeeding frames.

As shown by the broken line C2 between the second and third levels in FIG. 2B, B-pictures and P-pictures are composed of data for 30 slices under NTSC standard and data for 36 slices for PAL standard.

As shown by the broken line C3 between the third and fourth levels in FIG. 2B, each slice is composed of 45 macro blocks. Each macro block is composed of luminance components and chrominance components for a block that is 16 pixels high by 16 pixels wide. As shown by the broken line C4 between the fourth and fifth levels, each luminance block made up of 16 by 16 luminance elements includes a blue difference block (Cb block) composed of 8 by 8 blue difference elements and a red difference block (Cr block) composed of 8 by 8 red difference elements. These macro blocks are used by the AV decoder as the unit for image decoding.

In FIG. 2B, the area under the macro blocks includes a timing chart which shows how the luminance blocks and chrominance blocks included in macro blocks are processed by the various components of the AV decoder.

Macro blocks are decoded by performing variable length code decoding (hereinafter "VLD") on the compressed video data to obtain six sets of spatial frequency component data, header information, and motion vectors.

Following this, an inverse discrete cosine transform (hereinafter "DCT") is performed on the six sets of spatial frequency component data, and the spatial frequency components positioned in the low frequency area are separated from the spatial frequency components positioned in the high frequency area. The spatial frequency components positioned in the high frequency area are then discarded and the spatial frequency components positioned in the low frequency area are then subjected to inverse quantization.

Encoded macro blocks, on the other hand, are subjected to inverse quantization and an inverse DCT, before motion compensation is performed according to the motion vectors and the result is displayed as images. The motion vectors referred to here are information that specifies the positions in the present image that correlate most closely to the images in the preceding and succeeding frames. This is to say, motion vectors express how objects such as people move within the entire image with respect to the preceding and succeeding frames in block units.

The motion compensation referred to here means the addition (blending) of the appropriate differences to the standard pictures displayed before or after the present frame to form one frame that is a display image.

The compression and decompression techniques for video images under MPEG standard which are referred to by the present application are as described above. These are explained in more detail in a variety of publications, such as the Japanese publication "Pointo Zukaishiki Saishin MPEG Kyoukasho (Latest MPEG techniques—An Illustrated Reader)" by ASCII Publishing Inc.

The timing charts in FIG. 2B will be referred to later in this specification to show the timing with which the processing by the setup unit 104, a VLD unit 105, an IQ/IDCT unit 106, and a motion compensation unit 107 of the decoder core unit is performed. This completes the description of the outline processing for the decoding of MPEG streams, so that the explanation will now move onto the components of the AV decoder.

2. Components of the AV Decoder

Once an MPEG stream has been extracted from the recording medium or communication medium, the stream input unit 101 fetches the MPEG stream into the AV decoder unit and outputs the MPEG stream to the buffer memory bus 121 in accordance with the control by the I/O processor 113.

The buffer memory 102 stores the MPEG stream fetched by the stream input unit 101 in accordance with control by the buffer memory controller 110. On being instructed by the buffer memory controller 110 to output MPEG streams, the buffer memory 102 outputs the MPEG streams that it has hitherto stored to the SDRAM bus 122.

When an elementary stream included in an MPEG stream is outputted to the SDRAM bus 122, the bitstream FIFO 103 fetches the outputted elementary stream in accordance with control by the FIFO controller 112. The bitstream FIFO 103 stores the fetched elementary streams in first-in first-out format. The elementary streams stored in this way are outputted to the bitstream bus 123 in accordance with control by the FIFO controller 112.

The setup unit 104 waits for an elementary stream to be extracted from the MPEG streams stored in the bitstream FIFO 103 and, if the extracted elementary stream is a video stream or an audio stream, waits for the header part of the elementary stream to be decompressed by the VLD unit 105. Once the header part has been decompressed, the setup unit 104 performs the analysis processing e1 shown in FIG. 2B. If the elementary stream is a video stream, the setup unit 104 performs the extraction processing e2 for the motion vectors which is also shown in FIG. 2B. After this, while the inverse quantization, inverse DCT, and motion compensation are being performed, the setup unit 104 performs the decoding processing e3 for the audio stream.

When the elementary stream stored in the bitstream FIFO 103 is a video stream and macro blocks which compose the video stream are outputted to the bitstream bus 123, the VLD unit 105 performs the variable length code decoding t21, t22, t23, t24, t25, and t26 on the four luminance blocks included in the macro blocks and the two chrominance blocks Cb and Cr.

The IQ/IDCT unit 106 performs inverse quantization and an inverse DCT on the four luminance blocks and the two chrominance blocks that were subjected to the variable length code decoding.

Once the inverse quantization and inverse DCT have been performed by the IQ/IDCT unit 106, the motion compensation unit 107 reads the standard pictures (Y0,Y1), (Y2,Y3), (Cb,Cr) corresponding to the processed luminance blocks and chrominance blocks from the SDRAM 300 which is externally connected to the AV decoder unit and blends the processed luminance blocks and chrominance blocks with the read standard pictures. The result of this blending is then subjected motion compensation which is achieved by performing a half-pixel interpolation. Following this, the result of the motion compensation is written into the SDRAM 300 according to control by the RAM controller 111.

The video output unit 108 converts the single frame image which was blended with the standard picture and subjected to the half-pixel interpolation by the motion compensation unit 107 into an image signal which it outputs to a display apparatus, such as a television receiver, which is externally connected.

The audio output unit 109 converts the audio stream decoded by the setup unit 104 into an audio signal which it outputs to an externally connected speaker apparatus.

The buffer memory controller 110 (labeled as "BM controller" in the drawings) is composed of a buffer memory interface that performs access arbitration between the stream input unit 101, the video output unit 108, and the audio output unit 109 which are located around the I/O processor 113, and a DMA (Direct Memory Access) controller that has a DMA transfer function between the buffer memory 102 and the stream input unit 101, the video output unit 108, and the audio output unit 109.

The RAM controller 111 is composed of an SDRAM interface that is capable of burst reads and burst writes for the SDRAM 300, and a DMA controller that has a DMA transfer function between the SDRAM 300 and the buffer memory 102 and between the motion compensation unit 107 and the buffer memory 102.

The FIFO controller 112 has a dual port RAM, a controller that controls reads and writes for the dual port RAM, and a pointer management function for managing pointers that indicate access addresses for the bitstream FIFO 103.

The I/O processor 113 executes the asynchronous event tasks according to time sharing whereby six threads provided in the AV decoder are assigned to the asynchronous event tasks. The threads assigned to the asynchronous event tasks are expressed as numbers of cycles of the clock signals used for synchronized control by all of the components of the I/O processor 113, with the fundamental length of each of these threads being 4 cycles.

3. Processing Content for the Asynchronous Event Tasks Performed by the I/O Processor The following is a detailed description of the processing content for the asynchronous event tasks performed by the I/O processor 113.

Host I/O Tasks

These tasks are tasks related to communication with a host computer and tasks related to the generation of two-dimensional graphics in accordance with user interaction. In detail, these tasks are composed of communication processes for communication with a host computer via the host I/O unit 115 and processes that generate two-dimensional graphics in accordance with user interaction and output the result to the video output unit 108.

Paging Tasks

These tasks relate to paging processes for MPEG streams inputted into the buffer memory 102 and to extraction processes for extracting elementary streams, which is to say video streams, audio streams, and sub-picture streams, from the MPEG streams.

When executing paging tasks, the I/O processor 113 has the MPEG streams inputted from outside by the stream input unit 101 outputted onto the buffer memory bus 121 (labeled as the "IBM bus" in the drawings). By controlling the buffer memory controller 110, the I/O processor 113 has the MPEG streams outputted onto the buffer memory bus 121 written into the buffer memory 102. After this, the I/O processor 113 controls the buffer memory controller 110 to have the MPEG streams outputted onto the buffer memory bus 121 and extracts the elementary streams from the MPEG stream. The I/O processor 113 then has the extracted elementary streams written into the buffer memory 102 by again controlling the buffer memory controller 110. As a result, a bitstream, an audio stream and a sub-picture stream end up being stored in the buffer memory 102 as elementary streams.

Audio Stream Transfer Control Tasks

Audio stream transfer control tasks are tasks are composed of the various tasks performed for the transfer control of audio streams.

In accordance with audio stream transfer control tasks, the I/O processor 113 controls the buffer memory controller 110 to have the audio streams stored as elementary streams in the buffer memory 102 outputted to the SDRAM bus 122. After this, the I/O processor 113 controls the RAM controller 111 to have the audio stream outputted to the SDRAM bus 122 written into the SDRAM 300. Once the setup unit 104 has commenced the decoding of the audio stream stored in the bitstream FIFO 103, the I/O processor 113 monitors the progress of the decoding process and, when the remaining part of the audio stream is within a predetermined limit, controls the RAM controller 111 to have an audio stream stored in the SDRAM 300 read and outputted to the SDRAM bus 122. The I/O processor 113 then controls the FIFO controller 112 to have the outputted audio stream written into the bitstream FIFO 103.

By writing audio streams into the bitstream FIFO 103 in this way, the bitstream FIFO 103 can be replenished with an audio streams when the decoding of the present audio stream has progressed sufficiently.

When the decoding has been completed for an audio stream, the I/O processor 113 controls the FIFO controller 112 to have the decoded audio stream outputted to the SDRAM bus 122. By controlling the buffer memory controller 110, the I/O processor 113 then has the audio stream outputted to the SDRAM bus 122 written into the buffer memory 102.

Video Stream Transfer Control Tasks

Video stream transfer control tasks refer to the various tasks related to the transfer control of video streams.

By controlling the buffer memory controller 110, the I/O processor 113 has a video stream stored in the buffer memory 102 outputted to the SDRAM bus 122, before controlling the RAM controller 111 to have the video stream outputted to the SDRAM bus 122 written into the SDRAM 300. Once the VLD unit 105, IQ/IDCT unit 106 and motion compensation unit 107 have commenced the decoding of the video stream stored in the bitstream FIFO 103, the I/O processor 113 monitors the progress of the decoding process and, when the remaining part of the video stream is within a predetermined limit, controls the RAM controller 111 to have a video stream stored in the SDRAM 300 read. The I/O processor 113 then controls the FIFO controller 112 to have this video stream written into the bitstream FIFO 103. By writing video streams into the bitstream FIFO 103 in this way, the bitstream FIFO 103 can be replenished with a video stream when the decoding of the present video stream has progressed sufficiently.

Video Out Tasks

Video out tasks are tasks related to the output control performed for image output.

When executing asynchronous event tasks, the I/O processor 113 controls the buffer memory controller 110 to have a video stream that is stored in the SDRAM 300 having been processed by the VLD unit 105, IQ/IDCT unit 106, and motion compensation unit 107 outputted to the SDRAM bus 122. The I/O processor 113 then controls the buffer memory controller 110 to have the video stream outputted to the SDRAM bus 122 written into the buffer memory 102. The I/O processor 113 also controls the buffer memory controller 110 to have a video stream written into the SDRAM 300 outputted to the SDRAM bus 122 and then converted into an image signal by the video output unit 108. At the same time, the I/O processor 113 has the sub-picture produced from the sub-picture stream and the two-dimensional graphics mixed and outputted to the video output unit 108.

Setup I/O Tasks

These tasks are composed of processes that should be executed when the setup unit 104 has outputted a command to the I/O processor 113.

When the command is a command to have a read or write performed for a register provided in a host computer, these tasks are made up of processes for controlling the I/O processor 113 to perform the read or write, while when the command is an initialization command for the VLD unit 105 and the IQ/IDCT unit 106, these tasks are made up of processes for resetting the VLD unit 105 and IQ/IDCT unit 106.

The asynchronous event tasks described above do not have considerable processing loads but need to be repeatedly activated every so often. In particular, video out tasks need to be activated for every horizontal blanking cycle of 50 $\mu$sec and audio out tasks need to be activated every 90 $\mu$sec.

4. Construction of the I/O Processor 113

The following is an explanation of the construction of the I/O processor of the first embodiment, with reference to the drawings. As described above, the I/O processor monitors whether the various phenomena by which the asynchronous event tasks should be executed are present, and executes the asynchronous event tasks giving preference to the tasks whose phenomena are present. For ease of explanation of this first embodiment, the procedure for preferential execution will not be explained until the third embodiment. This first embodiment will instead focus on the basic structure of the I/O processor, which is to say the construction whereby six asynchronous event tasks are executed within the AV decoder according to time sharing.

Figure 3:
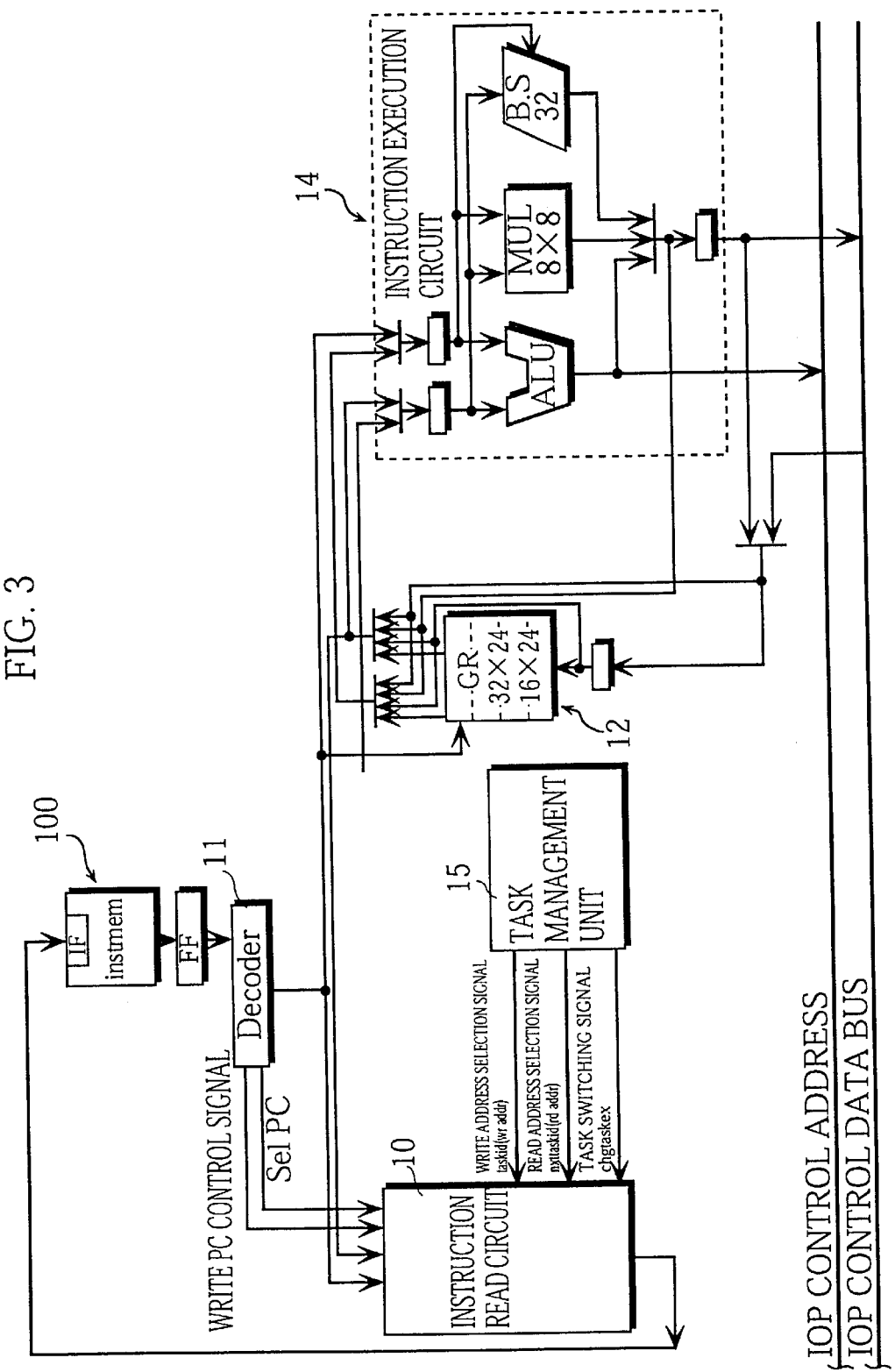
FIG. 3 shows the configuration of an I/O processor in the first embodiment.

FIG. 3 shows the internal structure of the I/O processor. As shown in the drawing, the I/O processor is composed of an instruction memory 100, an instruction read circuit 10, an instruction decode control unit 11, a general register 12, a calculation execution unit 14, and a task management unit 15.

The instruction memory 100 stores the instructions that compose the six asynchronous event tasks described above. FIG. 7A shows how instruction sequences are stored by the instruction memory 100. Each instruction in FIG. 7A has been labeled with an identifier such as "0-0", "0-1", or "0-2". The former figure in each identifier shows to which of the six asynchronous event tasks the instruction in question belongs, while the latter figure shows the position of the present instruction in the asynchronous event task to which it belongs. In the following explanation, the arrangement address of each instruction in the instruction memory 100 will be expressed using these identifiers.

The instructions stored in the instruction memory 100 all have an instruction format whereby all operations have a one-instruction word length. In the present embodiment, instruction word length is set at 16 bits and the instruction formats are as shown in FIGS. 7B to 7D.

FIG. 7B shows the instruction format of arithmetic instructions which specify registers as operands. In this instruction format, bit 2 to bit 4 indicate the register number of the register specified as the first operand scr1, while bit 5 to bit 7 indicate the register number of the register specified as the second operand scr2. Bit 8 to bit 10 specify the register number of the register specified as the storage address of the calculation result, while the five bits from bit 11 to bit 15 specify the content of the operation. The table in FIG. 7B shows the operation content which can be expressed by the five bits used to specify the content of the operation. These five bits are divided into a higher-order two bits and a lower-order three bits, with operation content being indicated by a combination of these two. As one example, when the higher-order two bits are "00" and the lower-order three bits are "000", an addition operation is specified, while when the higher-order two bits are "01" and the lower-order three bits are "000", a subtraction operation is indicated. When the higher-order two bits are "00" and the lower-order three bits are "001", a left-shift calculation is indicated (illustrated using a "<<" symbol in FIG. 7B), while when the higher-order two bits are "01" and the lower-order three bits are "001", a right-shift calculation is indicated (illustrated using a ">>" symbol in FIG. 7B).

FIG. 7C shows the instruction format of memory load and memory store instructions which specify registers as the read address and write address. In this instruction format, bit 2 to bit 4 indicate the register number of the register designated as the first operand, while bit 5 to bit 7 indicate the register number of a register that is specified as a read address or as the storage address for the calculation result. Bit 10 to bit 12 specify the content of the operation, while bit 13 to bit 15 specify an immediate value which is three bits long.

The table in FIG. 7C shows the different operations which can be expressed by the three bits used to specify the content of the operation. These three bits are divided into a higher-order single bit and a lower-order two bits, with operation content being indicated by a combination of these two.

As one example, when the higher-order bit is "1" and the lower-order two bits are "10", this indicates a store instruction which stores the value of the register designated by the read address operand src_REG into the memory address designated using the combination ("src1+im:3") of the first operand scr1 and the three-bit immediate value im:3.

When the higher-order bit is "0" and the lower-order two bits are "10", this indicates a load instruction which reads the value stored at the memory address designated in addressing mode by a combination ("src1+im:3") of the first operand scr1 and the three-bit immediate value im:3 and then stores the read value into the register dst_REG designated as the storage address.

FIG. 7D shows the instruction format of comparison instructions, calculation instructions, and branch instructions that can indicate an 8-bit or an 11-bit immediate value. When indicating an 8-bit immediate value in this instruction format, bit 5 to bit 7 can be used to designate a register that corresponds to the first operand and the storage address of the calculation result, while bit 8 to bit 15 are used to store the immediate value. Conversely, when indicating an 11-bit immediate value in this instruction format, bit 5 to bit 15 are used to store the immediate value. The four bits from bit 1 to bit 4 are used to designate the operation content as shown in the table in FIG. 7D.

As shown in the table in FIG. 7D, the operation content is designated by a combination of the higher-order two bits and the lower-order two bits in these four bits. As one example, when the higher-order two bits are "10" and the lower-order two bits are "01", a comparison instruction where the value of a register designated by the first operand is compared with an eight-bit immediate value indicated by the second operand is designated.

As other examples, when the higher-order two bits are "10" and the lower-order two bits are "10", a multiplication instruction where the value of the first operand is multiplied by an eight-bit immediate value is designated. Also, when the higher-order two bits are "11" and the lower-order two bits are "11", an absolute address indicating branch instruction which causes a branch to a branch address indicated by an eleven-bit immediate value is designated.

Since the operation content is expressed as 16 bits which is one instruction word length in the preceding explanation, the reading, decoding, and execution of one instruction will be uniform in each taking one cycle, regardless of the operation content of the instruction read from the instruction memory 100, or of which instruction is being decoded or executed. This is to say, the instruction format is defined so that each of the read, decode, and execute stage will be completed in the same time for each instruction. The effect of this limitation can be clearly seen in the eight-bit and eleven-bit widths of the immediate values shown in FIG. 7D. Here, there is the risk that if the designated immediate value is large, the instruction length will be end up being extended to 24 or 32 bits, so that to prevent such extension of the instructions, the utilized immediate values are limited to 8 or 11 bits depending on the instruction. If the unit for the number of cycles which are required for the processing of one instruction processing is set as the "CPI" (short for Cycles Per Instruction), then the CPI for the present I/O processor is quite simply "1", with values such as the "number of instruction reads" or "number of instruction decodes and executions" being expressed as numbers of cycles.

The instruction read circuit 10 outputs a read address in the instruction memory 100 to the instruction memory 100.

The instruction decode control unit 11 (labeled as "decoder 11" in the drawings" decodes the instruction outputted by the instruction memory 100 and controls the instruction read circuit 10 and calculation execution unit 14 in accordance with the result of the decoding.

The register set 12 is composed of 24 32-bit general registers (GR) and 24 16-bit general registers. The reason 24 of each kind of register are provided is so that four of each kind of register can be assigned to each of the six asynchronous event tasks. By assigning a total of eight registers to each asynchronous event task, it is no longer necessary to save and restore the values of registers every time task switching is performed.

The calculation execution unit 14 is composed of an ALU, a multiplier, and a barrel shifter, and performs a calculation according to control by the instruction decode control unit 11 using the stored values of the general registers in the register set 12. When there is a task switching from an asynchronous event task to a different task, the calculation execution unit 14 uses the four 32-bit general registers and the four 16-bit registers corresponding to the switched-to task and performs calculation for an instruction included in the switched-to task.

The task management unit 15 monitors the execution of instructions in the instruction decode control unit 11 and, when the time of the thread assigned to each task has expired, informs the instruction read circuit 10 of the identifier of the next task to be assigned a thread.

4.1 Updating of the Read Address by the Instruction Read Circuit 10

Figure 4A:
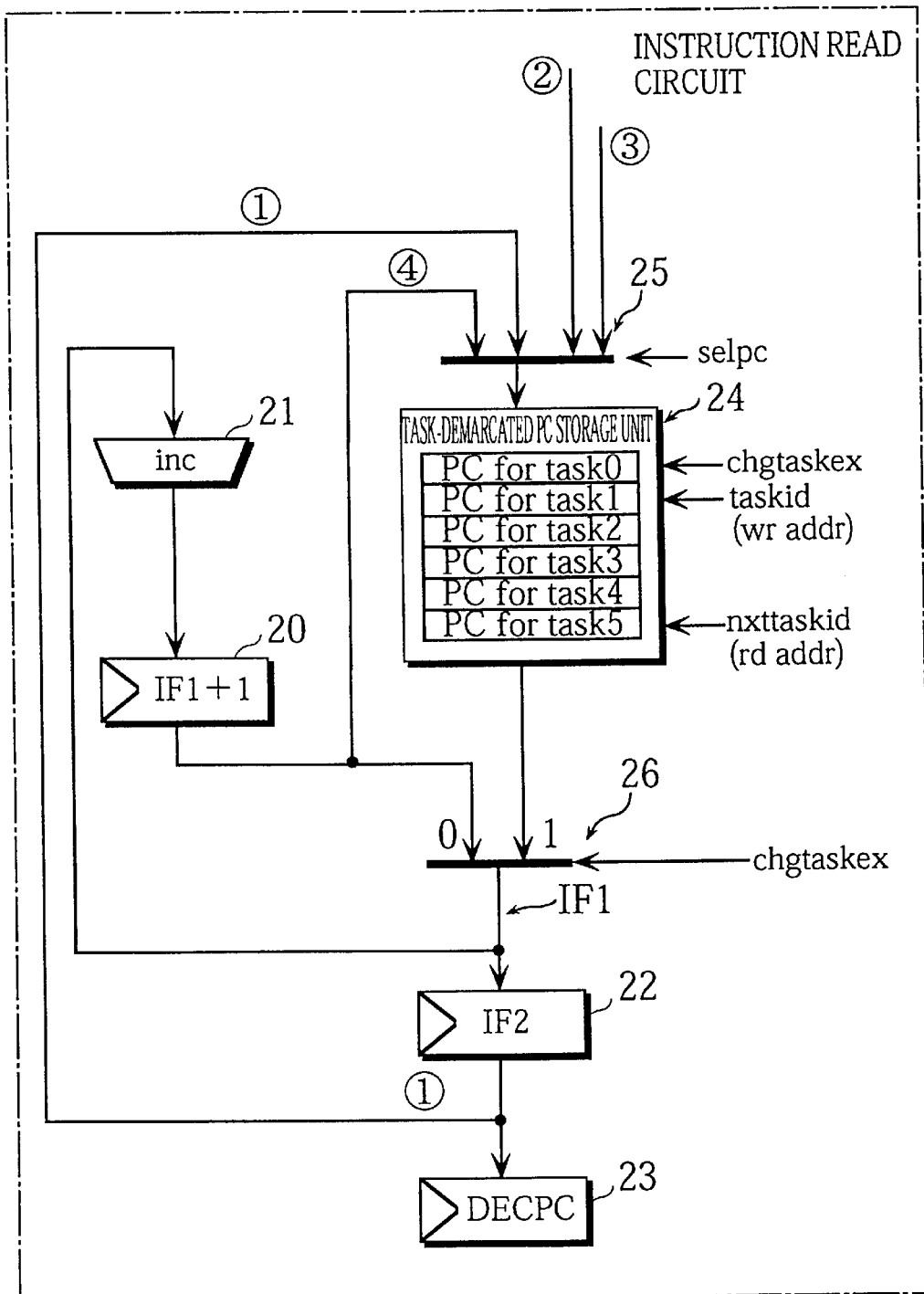
FIG. 4A shows the configuration of the instruction read circuit 10 of the first embodiment.

The following is an explanation of the configuration by which the instruction read circuit 10 updates the read address, with reference to FIG. 4A which shows the configuration of the instruction read circuit 10.

As shown in FIG. 4A, the instruction read circuit 10 is composed of an IF1+1 storage unit 20, an increment circuit 21, an IF2 storage unit 22, a DECPC storage unit 23, a task-demarcated PC storage unit 24, a selector 25, and a selector 26. This instruction read circuit 10 is constructed to perform pipeline processing whereby a two-stage read process is executed before the decode stage. In this two-stage read process, the respective read addresses are called the first read address IF1 and the second read address IF2.

Figure 8:
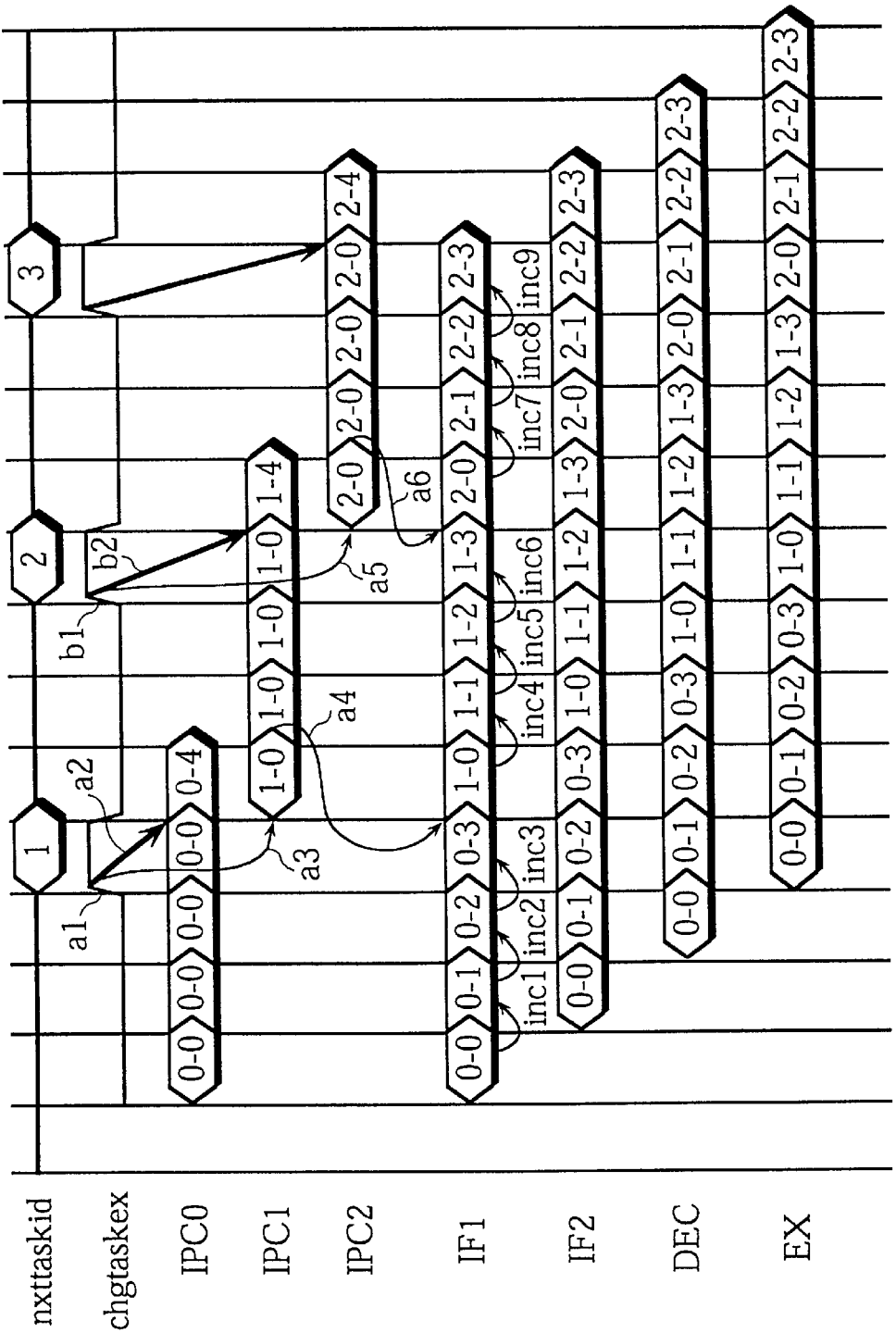
FIG. 8 is a timing chart showing how IPC, IF1, IF2, and DECPC are updated in the first embodiment.

In FIG. 4A, the first read address IF1 is the address outputted by the selector 26, while the second read address IF2 is the address stored by the IF2 storage unit 22. FIG. 8 is a timing chart showing the pipeline processing executed by the instruction read circuit 10. The components of the instruction read circuit 10 are described below with reference to this timing chart.

The IF1+1 storage unit 20 is used as a count value register that stores a count value. When a read address is outputted by the task-demarcated PC storage unit 24, this address is stored as an initial count value. When this count value has been incremented by the increment circuit 21, the IF1+1 storage unit 20 stores the incremented address as the latest count value. When a newly incremented address is outputted by the increment circuit 21, the IF1+1 storage unit 20 outputs the hitherto stored address to the selector 25 and to the selector 26 via the address signal line ④.

The increment circuit 21 increments the IF1 outputted by the selector 26 in accordance with the clock signal. The incremented address is then stored by the IF1+1 storage unit 20. The IF1 outputted by the selector 26 is the value that was hitherto stored by the IF1+1 storage unit 20, so that by having the increment circuit 21 increment this value, the count value stored in the IF1+1 storage unit 20 can be incremented for each clock signal.

In the timing chart in FIG. 8, the read address of the instruction 0-0 outputted as the read address is incremented by the increment circuit 21 (see the labels "inc1", "inc2", and "inc3" in FIG. 8). By doing so, the read address stored by the IF1+1 storage unit 20 is updated in steps to become the address of instruction 0-1, then the address of instruction 0-2, and then the address of instruction 0-3.

The IF2 storage unit 22 stores the address previously outputted by the IF1+1 storage unit 20 in synchronization with the clock signal as the second read address for an instruction to be read. As can be seen from the timing chart of FIG. 8, the addresses of the instructions 0-0, 0-1, 0-2, and 0-3 are successively outputted. These addresses in the IF2 storage unit 22 are one cycle behind the first addresses. When a new address is outputted by the IF1+1 storage unit 20, the IF2 storage unit 22 outputs the address it is currently storing to the DECPC storage unit 23 and to the selector 25 via the signal line ①. After outputting the stored address, the IF2 storage unit 22 stores the new address outputted by the IF1+1 storage unit 20.

The DECPC storage unit 23 stores the address outputted by the IF2 storage unit 22. This address matches the address of the instruction which is being subjected to decoding control by the instruction decode control unit 11. When a new address is outputted by the IF2 storage unit 22, the DECPC storage unit 23 updates its stored address to this new address to update the address of the instruction being subjected to decoding control.

The address stored by the DECPC storage unit 23 is the address which was hitherto stored by the IF2 storage unit 22 and the address stored by the IF2 storage unit 22 is the address that was hitherto stored by the IF1+1 storage unit 20, so that compared to the other addresses, the address stored by the DECPC storage unit 23 is two cycles behind the address stored by the IF1+1 storage unit 20 and one cycle behind the address stored by the IF2 storage unit 22.

The task-demarcated PC storage unit 24 is a memory circuit that internally includes regions for storing a read address for each task, or a group of address registers that store a read address for each task. Each region or address register in the task-demarcated PC storage unit 24 is assigned a three-bit task identifier as an address. It should be noted here that the read address for task(0) is called IPC0, and the read address for task(1) is called IPC1. The same is true for the remaining tasks, task(2) to task(5).

Read operations for the read addresses in the task-demarcated PC storage unit 24 are performed when an indication for a task switching operation (specifically, when the value of the task switching signal chg_task_ex is High) is outputted from the task management unit 15. When the value of the task switching signal chg_task_ex is High, the three-bit identifier (the read address selection signal nxttaskid(rd_adr)) of the task whose execution has just been performed by the task management unit 15 as the task switching signal chg_task_ex changed is outputted, with the task-demarcated PC storage unit 24 writing a value into one of its internal regions in accordance with this signal. This is to say, the task-demarcated PC storage unit 24 interprets the write address selection signal taskid(wr_adr) as an address in the task-demarcated PC storage unit 24, and stores the read address outputted by the selector 25 in the indicated internal region. In the timing chart of FIG. 8, at the timing a1, b1 where there is a rise in the task switching signal chg_task_ex, the write operations a2, b2 are performed for the indicated read addresses.

When the write operation a2 is performed, the IF2 storage unit 22 stores the address of the instruction 0-3, and the IF1+1 storage unit 20 outputs the address of the instruction 0-4, which is the address of this instruction 0-3 incremented by "1", to the selector 25 via the signal line ④. By being outputted in this way, the address 0-4 is stored in the task-demarcated PC storage unit 24. As a result, when a next thread is available for task(0) in the task-demarcated PC storage unit 24, the read operation for task(0) will be performed starting from instruction 0-4.

When the write operation b2 is performed, the IF2 storage unit 22 stores the address of the instruction 1-3, and the IF1+1 storage unit 20 outputs the address of the instruction 1-4, which is the address of this instruction 1-3 incremented by "1", to the selector 25 via the signal line ④. By being outputted in this way, the address 1-4 is stored in the task-demarcated PC storage unit 24. As a result, when a next thread is available for task(1) in the task-demarcated PC storage unit 24, the read operation for task(1) will be performed starting from instruction 1-4.

On receiving a read address selection signal nxttaskid (rd_adr) from the task management unit 15, the task-demarcated PC storage unit 24 interprets the identifier as an address in the task-demarcated PC storage unit 24, and outputs a read address of an asynchronous event task from the indicated internal region of the task-demarcated PC storage unit 24 to the selector 26.

In the timing chart in FIG. 8, when identifier(1) is supplied by the task management unit 15 as the read address selection signal nxttaskid and there is a rise in the task switching signal chg_task_ex (see reference number a3), the task-demarcated PC storage unit 24 interprets task(1) indicated by the identifier as a region in the task-demarcated PC storage unit 24, and outputs the read address (1-0) stored in this region to the selector 26 (see reference number a4).

At the timing when the address of instruction 2-0 is outputted as the read address IF1, if the identifier (2) is supplied by the task management unit 15 as the read address selection signal nxttaskid and there is a rise in the task switching signal chg_task_ex (see reference number a5), the task-demarcated PC storage unit 24 outputs the read address (2-0) as the read address of the task(2) indicated by the identifier to the selector 26 (see reference number a6).

When the read addresses have been outputted as described above, four instructions of task(0) will be executed, followed by the execution of four instructions of task(1). In this way, four instructions of each of the following tasks, tasks (2) to (5), will be executed.

The selector 25 is a selector that has five inputs and one output, and outputs one of the addresses transferred via the signal lines ①, ②, ③, ④ to the task-demarcated PC storage unit 24. The selection of one of the signal lines ①, ②, ③, ④ is performed in accordance with the output logic table shown in FIG. 4B, and is based on the selpc signal outputted by the instruction decode control unit 11 in accordance with the decoding result of an instruction. As one example, the signal line ④ is the output of the IF1+1 storage unit 20 and is selected by the selector 25 when the value of the task switching signal chg_task_ex is switched to "High" by the task management unit 15.

The signal lines ②, ③ are respectively connected to the instruction decode control unit 11 and the calculation execution unit 14. When a branch instruction that indicates an absolute address is decoded, the signal line ② is selected to obtain the immediate value of the branch instruction from the instruction decode control unit 11 as the branch address. When a branch instruction that uses indirect addressing is decoded, the signal line ③ is selected when an address calculated by the calculation execution unit 14 is used as the branch address.

The selector 26 is a selector with two inputs and one output, and selects an address that has been incremented by the increment circuit 21 when the task switching signal chg_task_ex is Low and outputs it to the increment circuit 21 and IF2 storage unit 22 as the address IF1. When the task switching signal chg_task_ex is High, the selector 26 selects the address of the next task to be executed from the task-demarcated PC storage unit 24 and outputs it to the increment circuit 21 and the IF2 storage unit 22 as the address IF1.

With the instruction read circuit described above, when task switching is performed, the read address of the task that was hitherto being executed is written into the task-demarcated PC storage unit 24 by the selector 25, and the address of the next instruction which is to be executed is outputted from the task-demarcated PC storage unit 24 as the address IF1. This switching of the read addresses is performed within one cycle, so that no extra processing needs to be executed by the I/O processor. There is also no invalidation of previously read addresses, such as an address for a branch that is being performed when an interrupt signal is received. As a result, the storing and restoring of read addresses by the instruction read circuit 10 can be performed without generating overheads.

4.2 Determination of the Next Asynchronous Event Task to be Performed by the Task Management Unit 15

Figure 5:
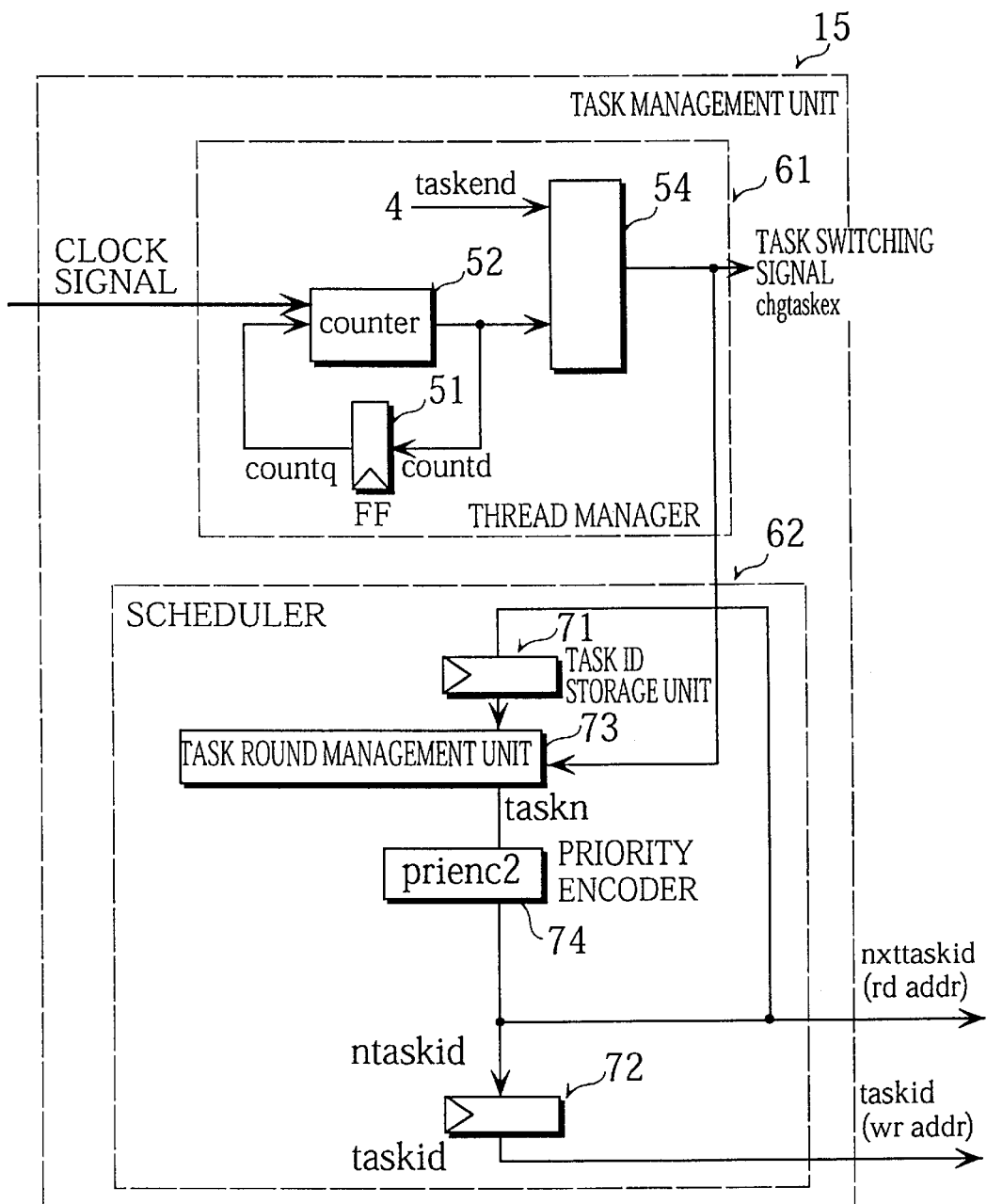
FIG. 5 shows the configuration of the task management unit 15 in the first embodiment.

The following is an explanation of how a next asynchronous event task to be performed is determined by the components of the task management unit 15, with reference to FIG. 5 which shows the configuration of the task management unit 15.

As shown in FIG. 5, the task management unit 15 is composed of a thread manager 61 and a scheduler 62. Of these, the scheduler 62 is composed of a flip-flop 51, a counter 52, and a comparator 54, while the thread manager 61 is composed of a task ID storage unit 71, a task ID storage unit 72, a task round management unit 73, and a priority encoder 74.

The flip-flop 51 stores an integer value that shows the number of the instruction which is to be executed next. This integer value is called the count value i.

The counter 52 has an initial value of "1", and is a counter whose maximum count value is set at "4". This counter 52 counts 1, 2, 3, 4, 1, 2, 3, 4 for the count value i in the flip-flop 51 in synchronization with the clock signal.

The comparator 54 compares the count value counted by the counter 52 with the integer value "4", and, when this count value counted by the counter 52 matches the integer value "4", sets the task switching signal chg_task_ex at "High" and outputs it to the selector 26 and the task-demarcated PC storage unit 24.

By having the task switching signal chg_task_ex set at "High" every time the count value of the counter 52 is "4", the selection of the task-demarcated PC storage unit 24 by the selector 26 is performed once every four cycles. By doing so, the read address of the next task to be assigned a thread is outputted from the task-demarcated PC storage unit 24 to the selector 26, so that the output of a read address from the task-demarcated PC storage unit 24 can also be seen to be performed once every four cycles.

Figure 6A:
FIG. 6A shows the bit composition of the task identifier taskid.

The task ID storage unit 71 stores an identifier of a task for which the counter 52 is counting the instruction execution. This value is called the task identifier taskid. Examples of task identifiers are shown in FIG. 6A. As shown in FIG. 6A, the task identifier taskid is a three-bit value which specifies one out of the six tasks stored in the instruction memory 100. When four instruction executions have been counted, the task identifier of the task to be assigned the next thread is outputted from the priority encoder 74 in the scheduler 62, and at this point the task ID storage unit 71 outputs its presently stored task identifier taskid to the task round management unit 73 and stores the task identifier taskid newly outputted from the priority encoder 74.

Figure 6B:
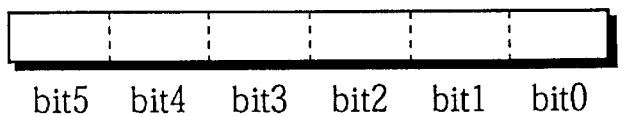
FIG. 6B shows the bit composition of the round value.

The task round management unit 73 monitors how the task identifier taskid in the task ID storage unit 71 is updated, as well as monitoring to which of the six tasks a thread has been assigned using a 6-bit register. When four instruction executions have been counted by the counter 52, a task identifier taskid is outputted by the task ID storage unit 71, so that the task round management unit 73 outputs a value (this value is called the round value taskn) showing the tasks that have been assigned a thread to the priority encoder 74. An example of the round value taskn is shown in FIG. 6B. As shown in FIG. 6B, the bit0 of the round value taskn represents task(0), so that when this bit0 is "1", this means that a thread has been assigned to task(0), while when this bit0 is "0", this is not the case. In the same way, bit1 represents task(1), so that when this bit1 is "1", this means that a thread has been assigned to task(1), while when this bit1 is "0", this is not the case.

As an example, when threads have only been assigned to task(0) and task(1), the task round management unit 73 outputs the value "000011" to the priority encoder 74. When threads have been assigned to task(0), task(1), and task(2), the task round management unit 73 outputs the value "000111" to the priority encoder 74.

When threads have been assigned to all of the tasks task(0), task(1), task(2), and task(3), the task round management unit 73 outputs the value "001111" to the priority encoder 74.

When threads have been assigned to all of the tasks task(0) to task(5), the task round management unit 73 outputs the value "111111" to the priority encoder 74, before resetting the value stored in the 6-bit register to "000000".

The priority encoder 74 receives the round value taskn outputted from the task round management unit 73 and detects the bit in the round value taskn at which the bit value switches from "1" to "0". After detecting the bit where the bit value switches from "1" to "0", the priority encoder 74 outputs the task identifier taskid of the task assigned to the detected bit to the task ID storage unit 71. At the same time, this task identifier taskid is outputted to the task-demarcated PC storage unit 24 as the read address selection signal nxttaskid(rd_adr).

As one example, on receiving "000011" as the round value taskn from the task round management unit 73, the priority encoder 74 detects that the second bit from the LSB (Least Significant Bit) side of the round value taskn is the first bit that has the bit value "0" (note here that the LSB itself is referred to as the $0^{th}$ bit from this side). In FIG. 6B, the second bit is assigned to task(2), so that the priority encoder 74 outputs the task identifier taskid for task(2) to the task ID storage unit 71.

As a different example, on receiving "000111" as the round value taskn from the task round management unit 73, the priority encoder 74 detects that the third bit from the LSB side of the round value taskn is the first bit that has the bit value "0". In FIG. 6B, the third bit is assigned to task(3), so that the priority encoder 74 outputs the task identifier taskid for task(3) to the task ID storage unit 71. Since the round value taskn shows which tasks have already been assigned a thread, the bit in the round value taskn where the bit value changes from "1" to "0" denotes the task which is to be assigned the next thread. By converting this bit where the bit value changes from "1" to "0" to the task identifier taskid, the next task to be assigned a thread can be stored in the task ID storage unit 71.

The task ID storage unit 72 outputs its presently stored task identifier taskid to the task-demarcated PC storage unit 24 as the write address selection signal taskid(wr_adr), when a task identifier taskid is newly outputted by the priority encoder 74.

Figure 9:
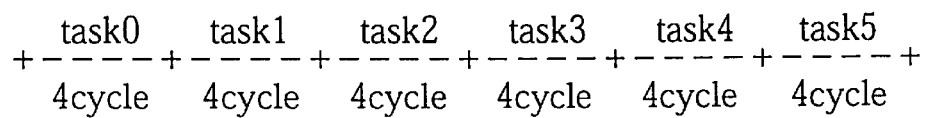
FIG. 9 shows how threads are allocated to tasks (0) to (5)

The assignment of threads in the I/O processor of the first embodiment described above is shown in FIG. 9. FIG. 9 shows that the threads assigned to the tasks from task(0) to task(5) in a unit called a frame which is formed by arranging the threads into a time series.

Since a thread containing four cycles is assigned to each of task(0) to task(5), one frame is composed of twenty-four cycles. Using such frames, the instruction sequences shown in FIG. 7 are uniformly executed four instructions at a time.

5. Regarding the Calculation of the Operation Clock Value

Figure 44:
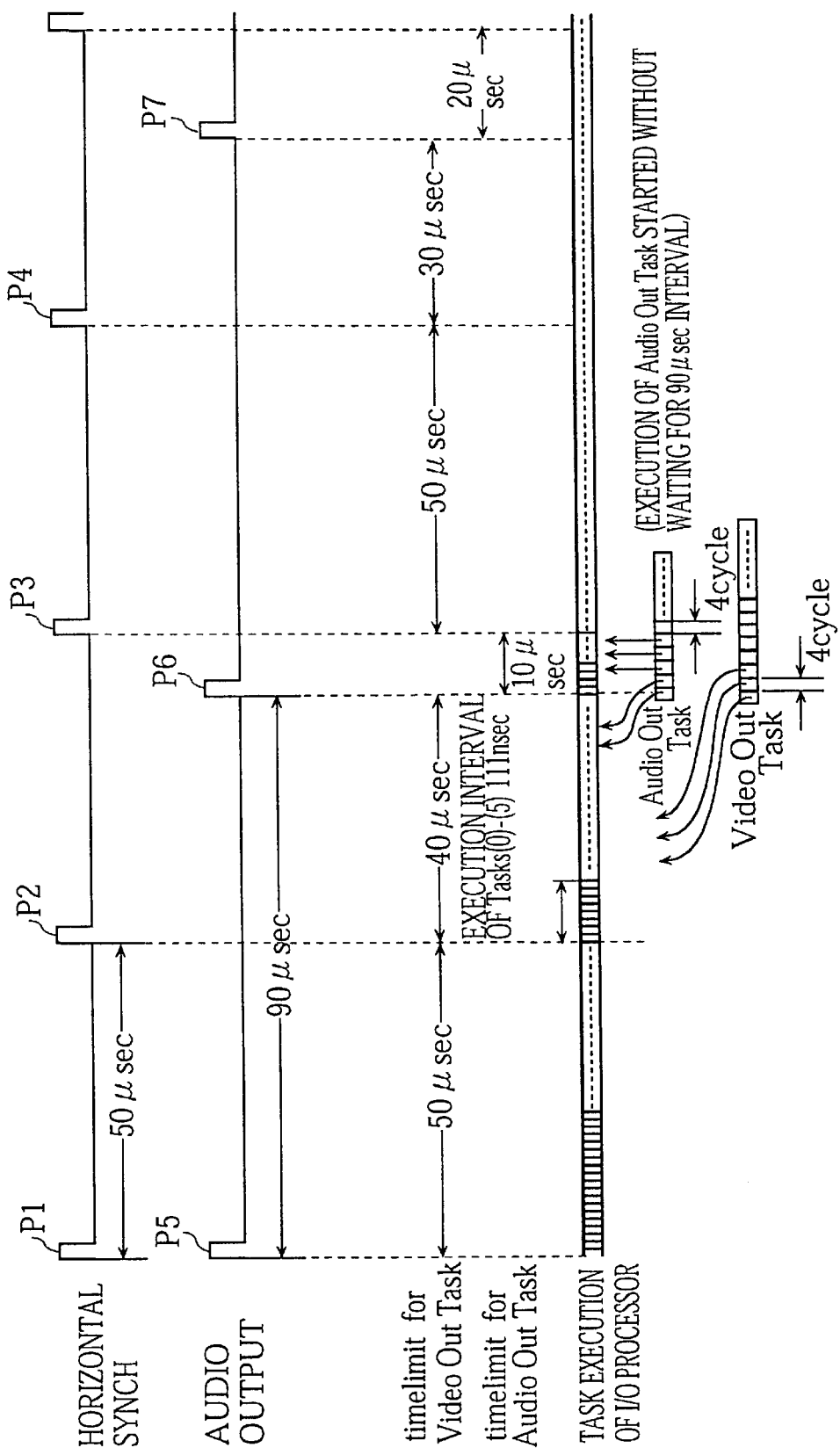
FIG. 44 is a timing chart which shows how video streams and audio streams are processed when video out tasks and audio out tasks are processed using the thread assignment of the first embodiment.

The following is an explanation of the calculation of the operation clock value of the I/O processor in this first embodiment, with reference to FIG. 44. FIG. 44 is a timing chart which shows how video streams and audio streams are processed when video out tasks and audio out tasks are executed in the first embodiment by being assigned threads. In order to maintain the real-time aspect of these video out tasks and audio out tasks, the video out tasks for converting a video stream into an image signal need to have one line of images processed in 50 µsec based on the cycle for the horizontal synchronization signal of a display, while the audio out tasks for converting an audio stream into an audio signal need to have an appropriate amount of the audio stream processed in a 90 µsec cycle.

In accordance with the prerequisites described above, the minimum number of instructions which need to be processed in such cycles can be derived.

The decoding of one line of image data requires a minimum of 448 instruction executions for the video out task, while the decoding of audio data for one cycle requires a minimum of 808 instruction executions for the audio out task. In the present embodiment CPI=1, so that the number of instructions is equal to the number of cycles. From the minimum number of instructions that need to be executed, it can be seen that the number of cycles for video out tasks and audio out tasks are respectively 448 (=4*112) and 808 (=4*202) cycles.

Task(0) to task(5) were previously described as being executed four cycles at a time. Since the switching of the program counter by the selector 25 and the selector 26 in the instruction read circuit 10 does not generate overheads, the total time required for processing task(0) to task(5) is effectively 24 cycles.

When this is the case, the times S1 and S2 for one cycle must satisfy the equations given below $$50 \,\mu sec > 6*4*112*S1 \text{ nsec}$$

$$90 \,\mu sec > 6*4*202*S2 \text{ nsec}$$

$$\therefore S1 < 50 \,\mu sec/(6*4*112) = 18.6 \text{ nsec}$$

$$\therefore S2 < 90 \,\mu sec/(6*4*202) = 18.56 \text{ nsec}$$

When the operation clock value is set from 1÷S2.

$$54 \text{ MHz} = 1 \div 18.56 \text{ nsec}$$

According to the above calculation, the optimal minimum clock frequency for completing the processing for the video out tasks and audio out tasks can be derived.

With the present embodiment, a optimal minimum operation clock frequency can be universally determined from the minimum number of instructions that need to be completed in a predetermined cycle and the total number of tasks. Since the optimal minimum operation clock frequency is found, the real-time nature of the audio out tasks and video out tasks can be ensured without having to provide a processor with a needlessly high operation clock frequency. As a result, favorable decoding of MPEG streams is possible even when a processor with a slower operation clock is provided in mass-produced consumer AV products.

By providing an I/O processor which executes a plurality of asynchronous event tasks by time sharing, processing of an asynchronous event task does not need to be performed when there is an interrupt, so that the setup unit 104, the VLD unit 105, and the IQ/IDCT unit 106 can be devoted to processing such as the inverse quantization, the inverse DCT, and motion compensation. The I/O processor is also able to perform task switching at high speed without generating overheads for the storing and restoring of the value of the program counter, so that the real-time aspect of the reproduction of MPEG streams can be maintained without having to use a processor with a high operation clock frequency.

It should be noted that in the present embodiment, the threads assigned to each task are described as composing four cycles, although it is equally possible for a different number of cycles to be assigned to each task depending on the processing content of the various tasks.

Figure 19A:
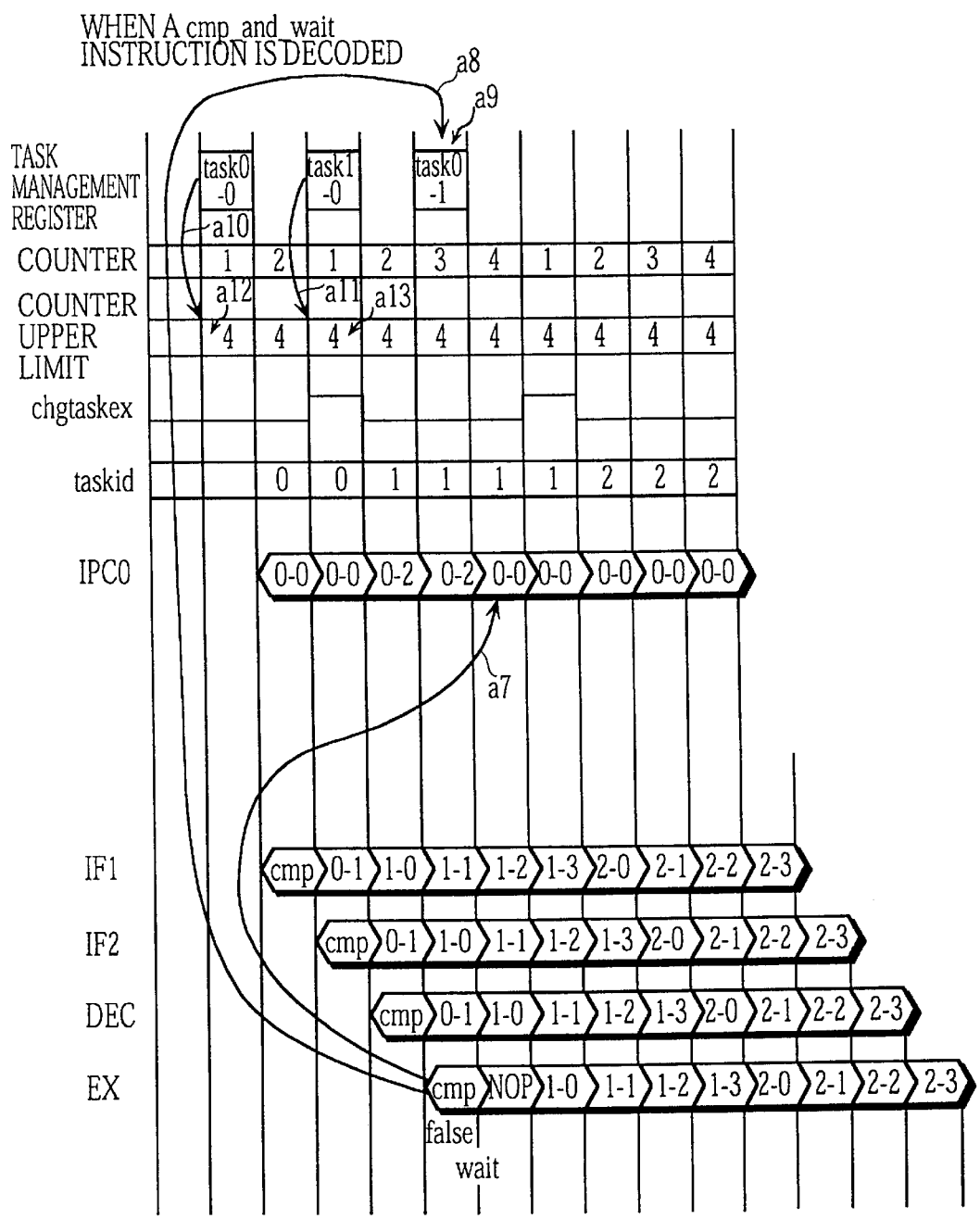
FIG. 19A is a timing chart showing how IPC, IF1, IF2, and DECPC are updated, and how the bits in the task management register 13 and the upper limit of the counter are set when a cmp_and_wait instruction is decoded.
Figure 45:
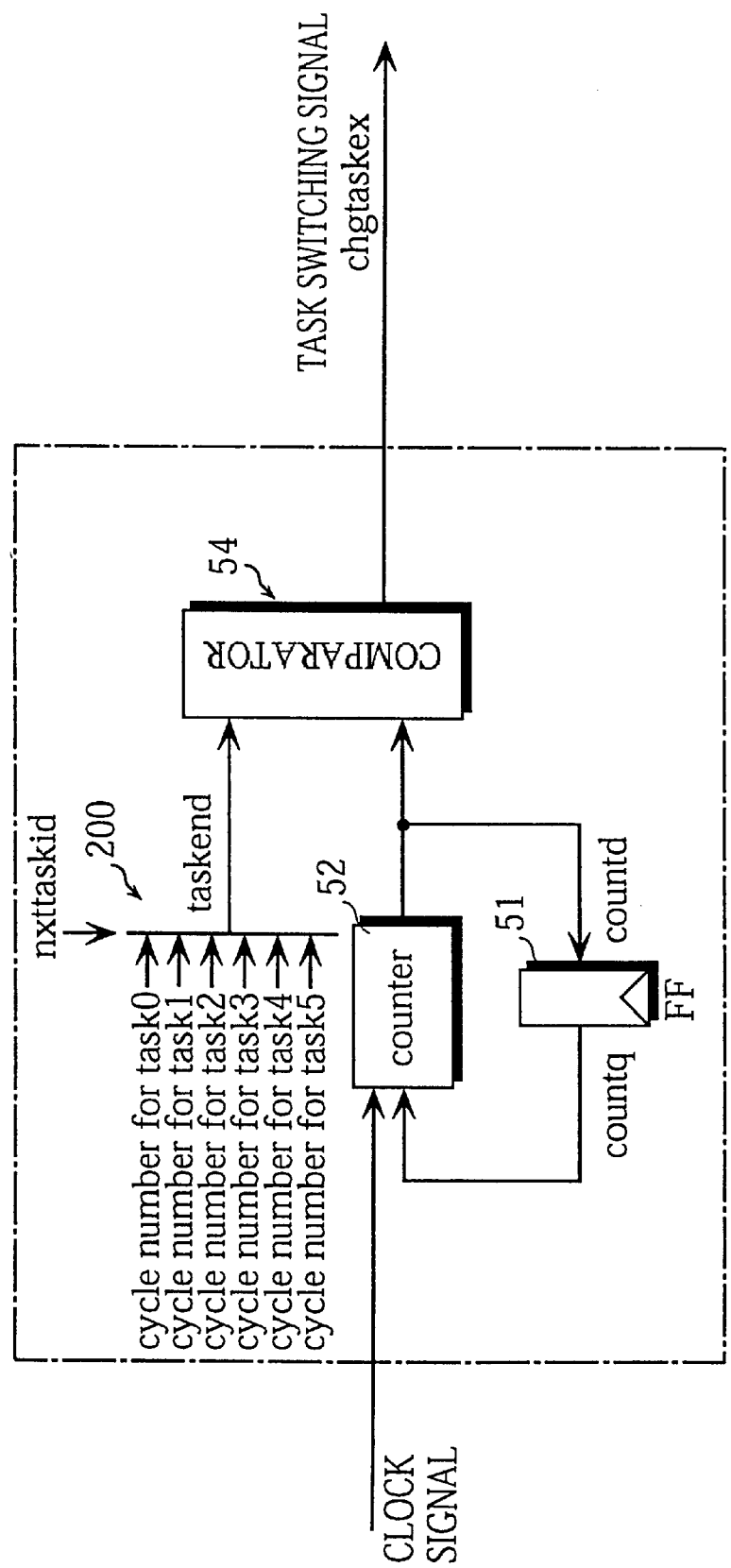
FIG. 45 shows the configuration of the thread manager when there is a variable number of cycles for each task.

When the number of tasks in a thread is variable, the thread manager shown in FIG. 5 can be configured as shown in FIG. 45. In FIG. 45, the selector 200 is connected to the six inputs "cycle number for task0" to "cycle number for task5" which are the separate cycle numbers for the various tasks from task(0) to task(5) and is designed to selectively output the cycle number which corresponds to the nxttaskid outputted by the scheduler 62 to the comparator 54. In FIG. 19A, if the task which is to be assigned the next thread is task(0), the selector 200 outputs the "cycle number for task0" to the comparator 54. By doing so, an optimal cycle number for the processing load of each of task(0) to task(5) can be used for each task. Here, the optimal numbers of cycles for each task may be stored beforehand in a memory or register, with it being possible to change the cycle numbers at a later date.

The explanation of this first embodiment has focused on the case where the tasks to be executed are asynchronous event tasks, although it is equally possible for these tasks to be other kinds of task.

Second Embodiment

While number of instructions in each thread assigned to a task is always four in the first embodiment, this second embodiment is characterized by having an independently variable number of cycles assigned to each task. This assigning of the number of cycles in each threads is performed according to wait_until_next_thread instructions. In this embodiment, a wait_until_next_thread instruction is an instruction that indicates that the execution of instructions for the present thread should be terminated, and that the sequence of instructions positioned after the wait_until_next_thread instruction in the present task should be executed in the next thread. It should be noted here that a read address is stored when a wait_until_next_thread instruction is decoded, and at this point the four input-one output selector 25 shown in FIG. 4 selects the output of the IF1+1 storage unit 20 received via the signal line ① and stores the output in the task-demarcated PC storage unit 24.

FIG. 10A shows a wait_until_next_thread instruction (labeled as a "WUN instruction" in the drawings) as instruction 0-1 and an example of an asynchronous event task including in this instruction. FIG. 11, meanwhile, is a timing chart that shows how the asynchronous event tasks in FIG. 10A are executed. When a wait_until_next_thread instruction is stored as the first instruction of an asynchronous event task as shown by instruction 0-1 in FIG. 10A, this instruction 0-1 is stored in the DECPC storage unit 23 and is decoded by the instruction decode control unit 11, at which point the selector 25 has the read address of the instruction 0-2 that was received via the signal line ① stored in the task-demarcated PC storage unit 24 (in the same way as ① in FIG. 11). After this, the instruction decode control unit 11 invalidates the instructions 0-2 and 0-3 (denoted by the label "NOP" in FIG. 11).

The instruction 0-2 referred to here is an instruction that writes the value of the address mem1 of the local memory of the I/O processor into the register r0 in the register set 12, while the instruction 0-3 is an instruction which writes the value of the address buf1 in the buffer memory 102 into the register r1. The instruction 0-4 is an instruction which multiplies the value of the register r0 by the value of the register r1 and stores the multiplication result in the register r2. The instruction 0-5, meanwhile, is an instruction which stores the value of the register r2 in the address mem1 in the local memory of the I/O processor.

The four instructions described above all have a read address and a write address that is in the IOP local memory, so that since the instruction 0-1 is a wait_until_next_thread instruction, the instructions whose read address or write address is the IOP local memory can be seen to be included in one thread.

Figure 10B:
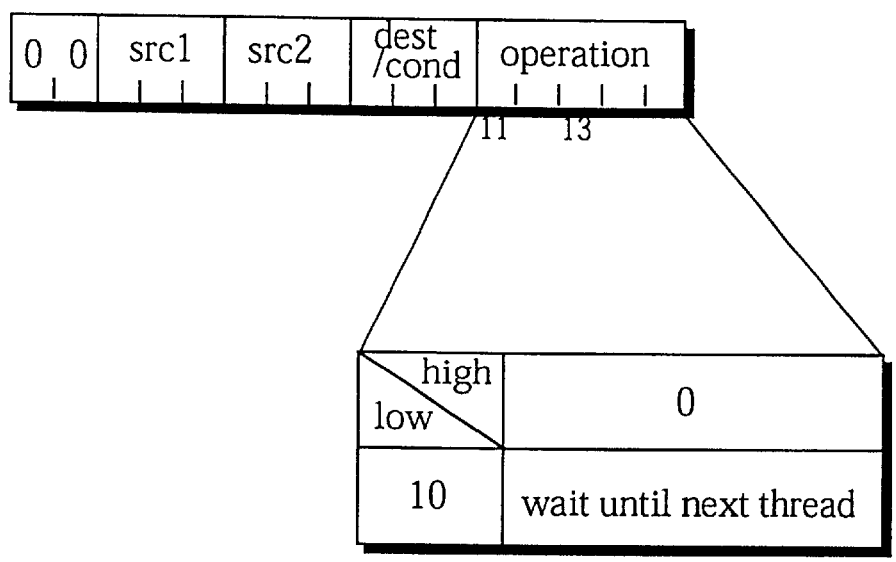
FIG. 10B shows an example of the instruction format of a wait_until_next_thread instruction.
Figure 11:
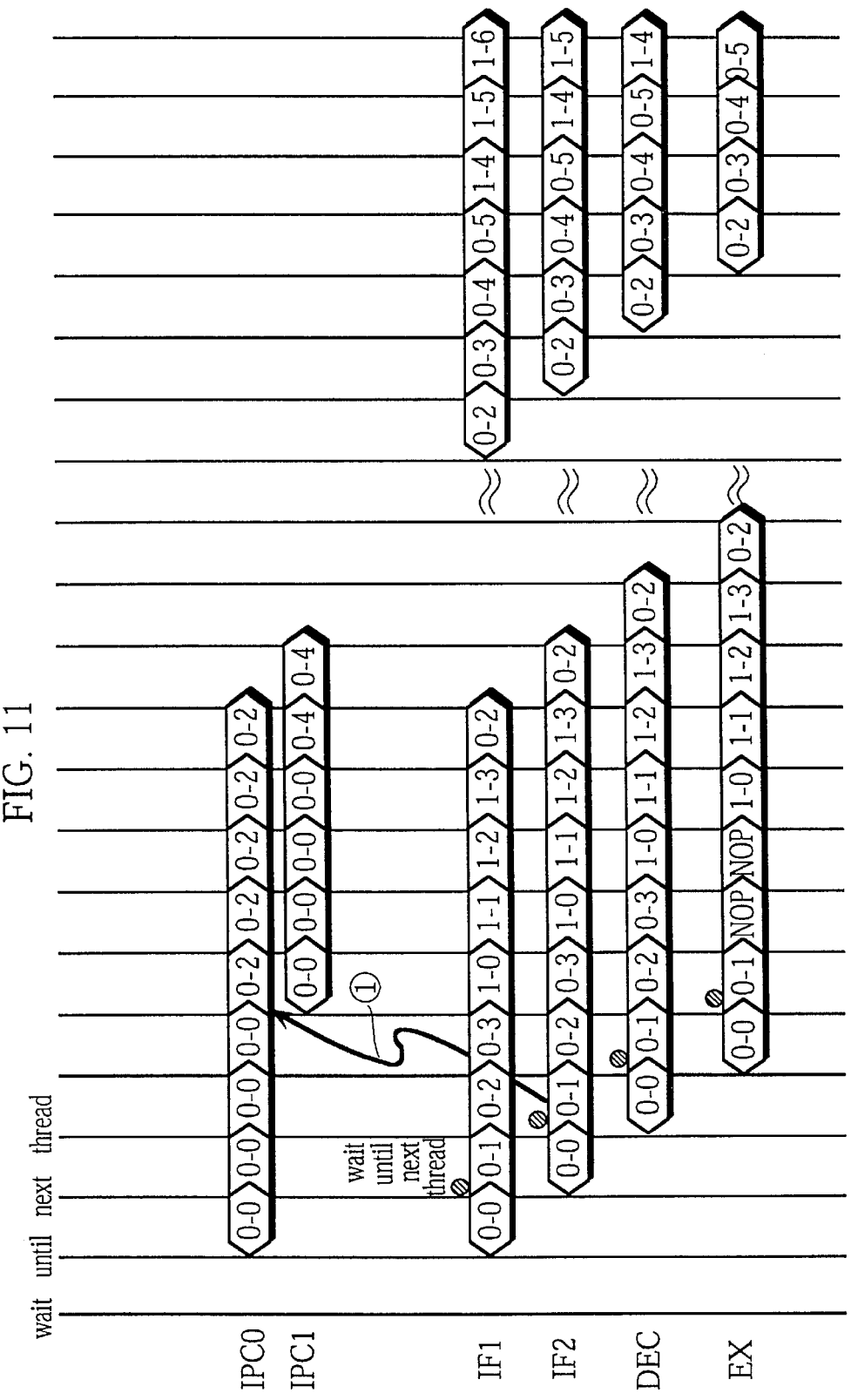
FIG. 11 is a timing chart showing how IPC, IF1, IF2, and DECPC are updated in the second embodiment.

FIG. 10B shows an example of the instruction format of a wait_until_next_thread instruction. As shown in FIG. 10B, the present instruction has the same instruction format as an arithmetic instruction that specifies registers which was shown in FIG. 7B. When the value "010" is indicated by bit11 to bit13 of this format, the operation of the wait_until_next_thread instruction is executed by the I/O processor.

Figure 12:
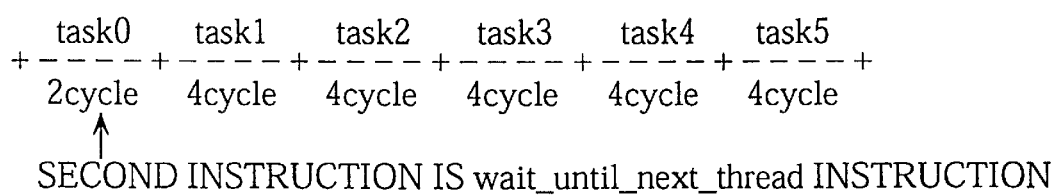
FIG. 12 shows how threads are allocated to tasks (0) to (5) in the second embodiment.

The following is an explanation of how threads are assigned by the I/O processor of the second embodiment which is constructed as described above, with reference to FIG. 12.

Task(1), task(2), task(3), task(4), and task(5) are each assigned a thread of four cycles. However, since task(0) includes a wait_until_next_thread instruction, the thread assigned to task(0) only lasts until the wait_until_next_thread instruction, so that only two cycles are assigned to task(0).

In a frame which following a first execution of task(0) to task(5), task(1) is assigned 4 cycles in the same way as the other tasks.

With the present embodiment described above, a group of memory access instructions which access the same memory can be grouped together into one thread and executed.

Third Embodiment

In the first embodiment, the six asynchronous event tasks are equally assigned threads regardless of whether the phenomena according to which the asynchronous event tasks should be activated are present or not, so that asynchronous event tasks that do not need to be activated and asynchronous event tasks that need to be activated are effectively given the same amount of processing time, making the execution as a whole rife with misapplied equality. In this third embodiment, a check as whether the phenomena according to which asynchronous event tasks should be activated are present is performed before the asynchronous event tasks are activated, with control being performed so that tasks whose activating phenomena are not present are assigned reduced numbers of cycles.

Figure 13:
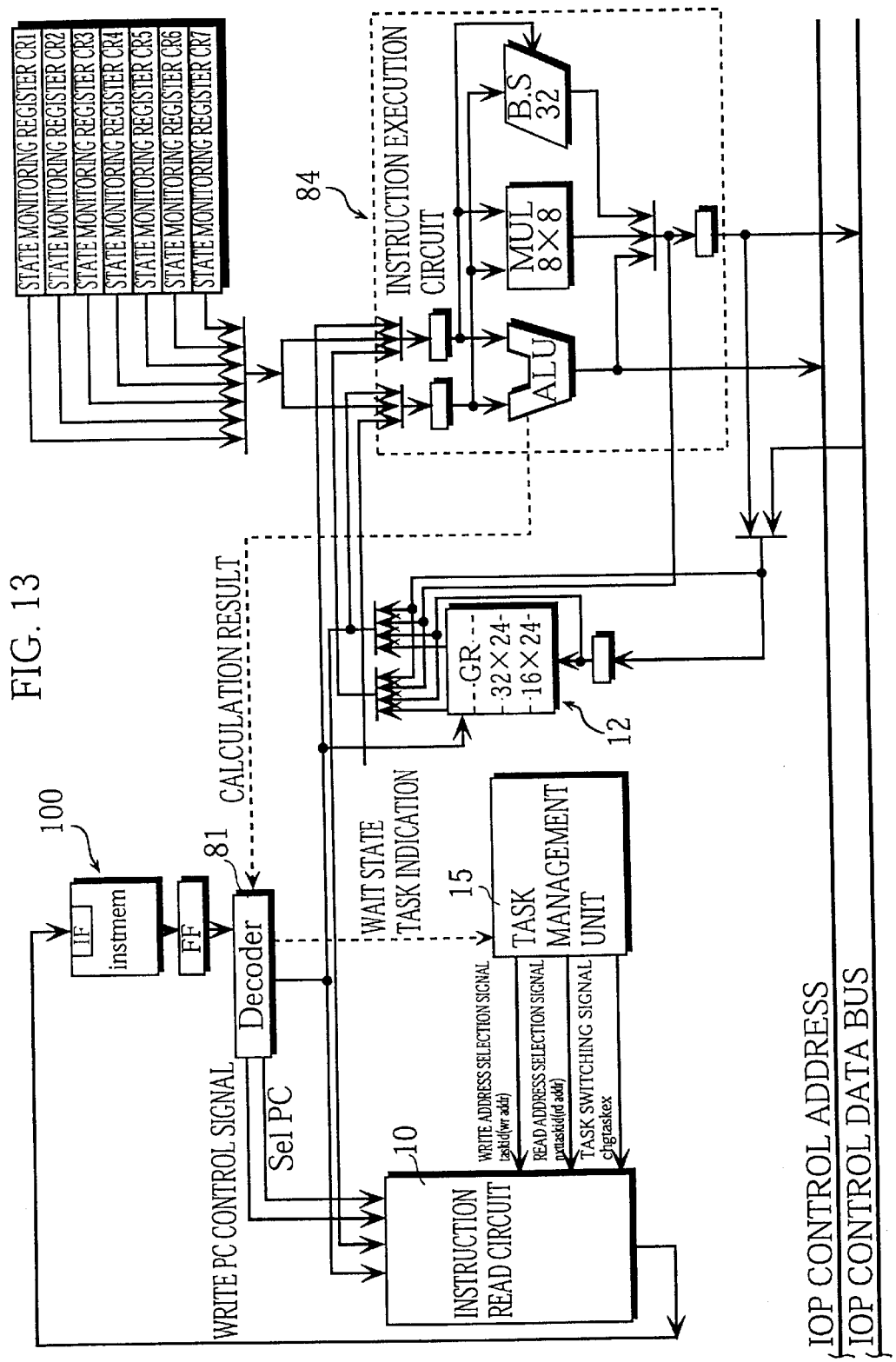
FIG. 13 shows the configuration of the AV decoder in the third embodiment.

The configuration of the I/O processor in this third embodiment is shown in FIG. 13. In FIG. 13, the I/O processor resembles the I/O processor of the first embodiment in that it includes an instruction memory 100 and an instruction read circuit 10. The new aspect of this third embodiment is that the instruction decode control unit 11 and the calculation execution unit 14 have been respectively replaced by the instruction decode control unit 81 and the calculation execution unit 84. Seven state monitoring registers have also been added, so that the task management unit 15 internally includes a task management register 13.

The seven state monitoring registers CR1–CR7 are each composed of a five-bit register, and are connected to the components of the AV decoder that are located around the I/O processor, which is to say, components such as the video output unit 108, the buffer memory controller 110, the RAM controller 111, the FIFO controller 112. Each of these seven state monitoring registers CR1–CR7 has five bits that are used to indicate whether each of five phenomena has occurred in the periphery of the I/O processor. It should be noted here that since the connections to the video output unit 108, the buffer memory controller 110, the RAM controller 111, and the FIFO controller 112 are complicated, they have been omitted from the drawings.

The following is an explanation of the state monitoring register CR1, the state monitoring register CR2, and the state monitoring register CR3 as examples of the seven state monitoring registers CR1–CR7, with reference to FIG. 17. FIG. 17 shows the bit composition of the state monitoring register CR1, the state monitoring register CR2, and the state monitoring register CR3.

The bit0 in state monitoring register CR1 is normally set at "0", and is only set at "1" when a predetermined number of data transfers have been performed to the buffer memory 102 via the buffer memory bus 121.

The bit1 in the state monitoring register CR1 is normally set at "0", and is only set at "1" when a start code of an MPEG stream outputted to the buffer memory bus 121 has been detected.

The bit2 in the state monitoring register CR1 is normally set at "0", and is only set at "1" when it has been confirmed that there is at least one byte of valid data in the MPEG stream outputted to the buffer memory bus 121.

The bit3 in the state monitoring register CR1 is normally set at "0", and is only set at "1" when there are at least three bytes of valid data in the buffer. This bit is used in communication between a paging task and an audio stream transfer control task or a video stream transfer control task.

The bit0 in state monitoring register CR2 is normally set at "0", and is only set at "1" when a request that supports transfer to the SDRAM 300 has been issued. This bit is used for communication between a paging task an audio stream transfer control task or a video stream transfer control task.

The bit1 in state monitoring register CR2 is normally set at "0", and is only set at "1" when DMA transfer has been completed.

The bit2 in state monitoring register CR2 is normally set at "0", and is only set at "1" when there is a transfer request from the bitstream FIFO 103.

The bit3 in state monitoring register CR2 is normally set at "0", and is only set at "1" when the control register in the FIFO controller 112 has been updated.

The bit0 in state monitoring register CR3 is normally set at "0", and is only set at "1" when the buffer memory 102 is in a DMA_READY state.

The bit1 in state monitoring register CR3 is normally set at "0", and is only set at "1" when DMA transfer to the SDRAM 300 has been completed.

The bit2 in state monitoring register CR3 is normally set at "0" and is only set at "1" when there is a drop in the horizontal return signal of a display device that is externally connected.

The bit3 in state monitoring register CR3 is normally set at "0", and is only set at "1" when the horizontal blanking period of the video signal is reached in the display device.

The bit4 in state monitoring register CR3 is normally set at "0", and is only set at "1" when there has been a processing request for a video out task.

The three state monitoring registers described above express the control states of each buffer and controller in the AV decoder unit. This is also the case for the remaining state monitoring registers, so that the I/O processor is able to monitor the various phenomena which are factors in the activation of the different asynchronous event tasks using these seven state monitoring registers.

The calculation execution unit 84 is constructed so as to have the same functions as the calculation execution unit 14. When compared with the calculation execution unit 14, the calculation execution unit 84 differs in that it receives a number assigned to one of the state monitoring registers CR1–CR7 and performs a subtraction to compare the immediate value and the stored value of the state monitoring register. The calculation execution unit 84 then sets or resets the zero flag and carry flag in accordance with the result of this subtraction and informs the instruction decode control unit 81 whether the stored value of the state monitoring register is equal to, not equal to, or greater or smaller than the immediate value.

When being so informed, the instruction decode control unit 81 may output a signal indicating the invalidation of the calculation presently being performed, and on receiving such a signal, the calculation execution unit 84 cancels the storage of a value into the general registers.

The instruction decode control unit 81 is constructed so as to have the same functions as the instruction decode control unit 11, although the instruction decode control unit 81 differs from the instruction decode control unit 11 in that it reads instructions that may induce a phenomenon-wait loop from the instruction memory 100, and after decoding such an instruction, outputs the number in each of the state monitoring registers CR1–CR7 and an immediate value to the calculation execution unit 84. It should be noted here that instructions that may induce a phenomenon-wait loop are shown by {Example 1} below. After outputting the stored values of the state monitoring registers and the immediate value to the calculation execution unit 84, calculation execution unit 84 then sets or resets the zero flag and carry flag to inform the instruction decode control unit 81 whether the stored value of the state monitoring register is equal to, not equal to, or greater or smaller than the immediate value. On being informed that an immediate value does not match the stored value of a state monitoring register, the instruction decode control unit 81 outputs a signal showing that the phenomenon is not present to the task management register 13. The instruction decode control unit 81 also informs the instruction read circuit 10 to prevent an advance in the read address. Conversely, when informed that an immediate value matches the stored value of a state monitoring register, the instruction decode control unit 81 outputs a signal showing that the phenomenon is present to the task management register 13.

EXAMPLE 1

Instruction

Presence of phenomenon i judged, if not present, read address does not advance.

EXAMPLE 2 cmp_and_wait cr_statei, Immediate Value

In {Example 2}, the first operand is cr_statei (where i=0, 1, 2, 3, 4 . . . 7), which means that any of the seven state monitoring registers in the I/O processor can be indicated.

When the first operand indicates a state monitoring register and the second operand indicates an immediate value, the existence of any out of the thirty-five possible phenomena can be checked. Such instructions will be referred to as cmp_and_wait instructions in this specification. It should be clear here that when the first operand and second operand of such a cmp_and_wait instruction are such that the presence of an indicated phenomenon is repeatedly judged a large number of times, a phenomenon-wait loop will occur.

Figure 14A:
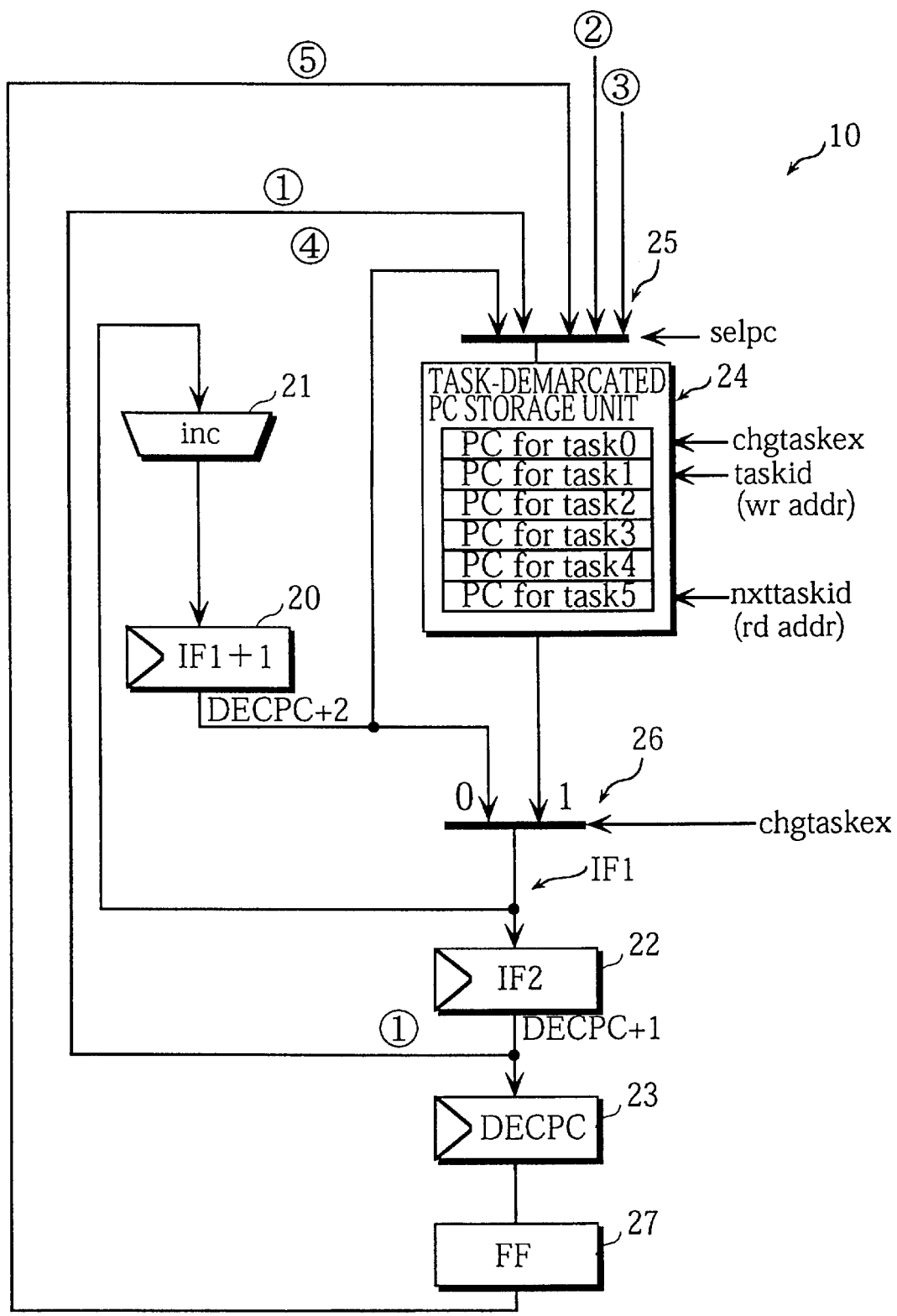
FIG. 14A shows the configuration of the instruction read circuit 10 in the third embodiment.

The instruction read circuit 10 of the third embodiment with its various modifications is shown in FIG. 14A. As can be seen from FIG. 14A, the instruction read circuit 10 of the third embodiment is the same as the instruction read circuit 10 of the first embodiment in including an IF1+1 storage unit 20, an increment circuit 21, an IF2 storage unit 22, a DECPC storage unit 23, a task-demarcated PC storage unit 24, a selector 25, and a selector 26. However, the instruction read circuit 10 of this third embodiment also includes a flip-flop 27 that is connected to the output stage of the DECPC storage unit 23.

The flip-flop 27 is provided in readiness for when the phenomenon indicated by a cmp__and__wait instruction is not present, and stores a value of the DECPC storage unit 23 so that the instruction decode control unit 81 can output the read address of the instruction being decoded to the selector 25. When given an indication to return the program counter value by the instruction decode control unit 11, the flip-flop 27 outputs its stored value via the signal line ⑤ to the selector 25. The selector -then switches the input of the task-demarcated PC storage unit 24 to the signal line ⑤ so that the stored value of the flip-flop 27 is stored in the task-demarcated PC storage unit 24. The output logic table for the instruction read circuit 10 of this third embodiment is shown in FIG. 14B.

FIG. 19A is a timing chart for the components of the I/O processor in a frame when a cmp__and__wait instruction has been decoded. The following is an explanation of the role of the flip-flop 27 with reference to this timing chart.

When the address of the instruction 0-0 which equates to the address of the cmp__and__wait instruction is outputted by the flip-flop 27 as its stored value, as shown by the reference numeral a7 in FIG. 19A, the address of the instruction 0-0 is stored in the task-demarcated PC storage unit 24 as IPCO. By doing so, the address of the cmp__and__wait instruction is stored in the task-demarcated PC storage unit 24 as IPC0.

Figure 15:
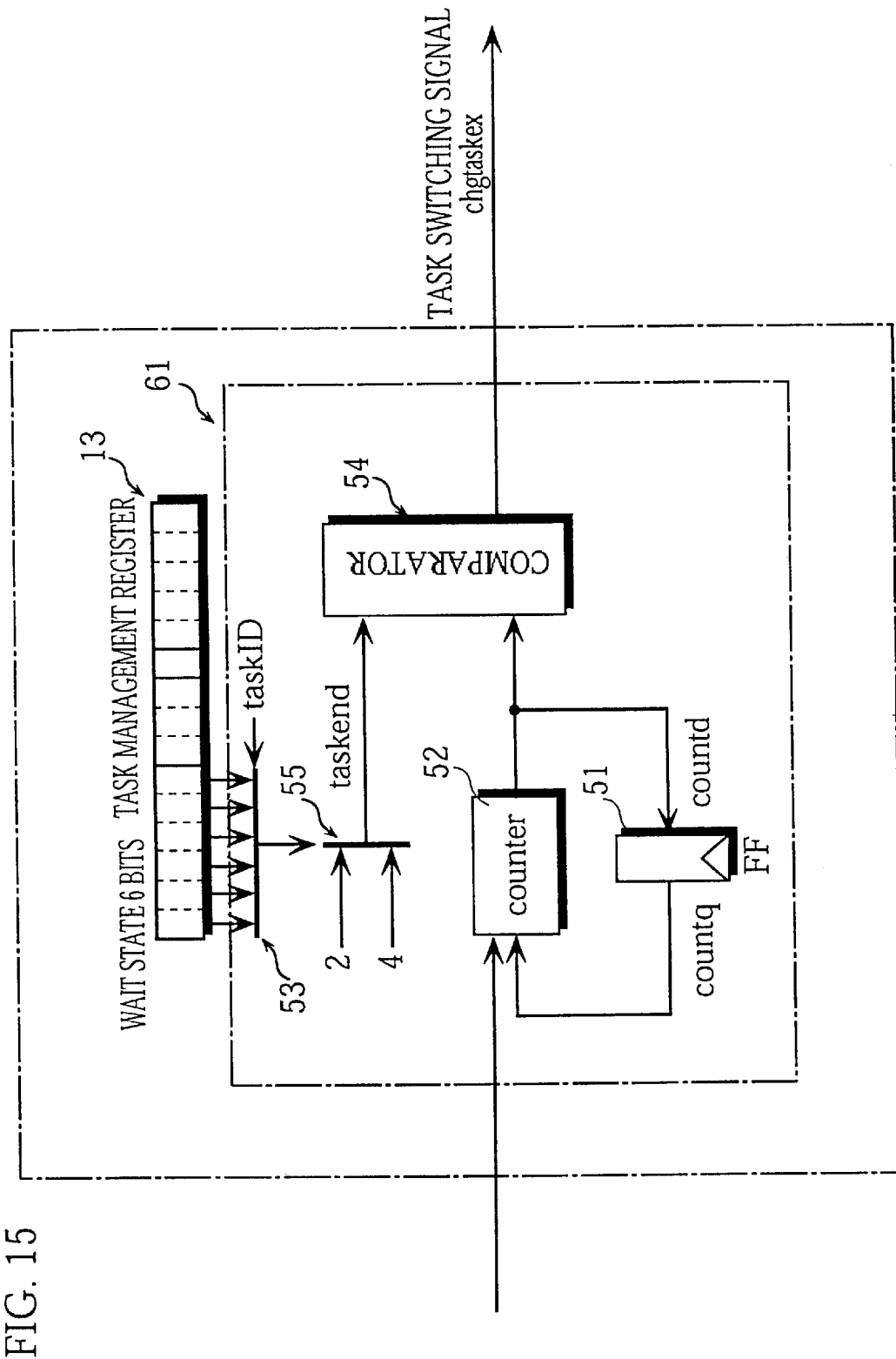
FIG. 15 shows the configuration of the thread manager 61 in the third embodiment.

FIG. 15 shows the configuration of the task management unit 15 in this third embodiment.

As shown in FIG. 15, the task management register 13 is a register where bits are assigned to monitor each of the tasks that may induce a phenomenon-wait loop (hereinafter, simply referred to as a "wait state"). On receiving a signal showing from the instruction decode control unit 81 showing that the phenomenon is not present, the task management register 13 refers to the task identifier stored by the task ID storage unit 72 and switches the bit corresponding to this task identifier taskid to "1". Conversely, on receiving a signal showing that the phenomenon is present, the task management register 13 refers to the task identifier stored by the task ID storage unit 72 and switches the bit corresponding to this task identifier taskid to "0".

Figure 16:
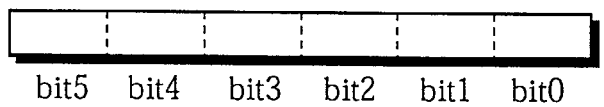
FIG. 16 shows the bit construction of the six bits that are assigned for wait state management in the task management register 13.

FIG. 16 shows the bit composition in the task management register 13 for the monitoring of wait state tasks. In FIG. 16, when bit0 is "1", this shows that the task(0) is in a wait state, while when bit0 is "0", this shows that this is not the case.

In FIG. 16, when bit1 is "1", this shows that the task(1) is in a wait state, while when bit1 is "0", this shows that this is not the case. In the same way, when bit2 in the task management register 13 is "1", this shows that the task(2) is in a wait state, while when bit2 is "0", this shows that this is not the case. By monitoring phenomenon-wait loops using this task management register 13, phenomenon-wait loops that may simultaneously occur in a plurality of tasks can be monitored.

In the timing chart of FIG. 19A, the instruction 0-0, is a cmp__and__wait instruction and when this is decoded, the phenomenon is judged as not being present. In this case, the instruction decode control unit 81 gives notification that task(0) is in a phenomenon-wait state, as shown by the reference numeral a8. By doing so, the task management register 13 sets the bit corresponding to the task identifier of task(0) to "1", as shown by the reference numeral a9.

The following is an explanation as to how each of the assigned bits in the task management register 13 are set for a "phenomenon-wait state", "when the phenomenon occurs", and "after the phenomenon occurs", when reference to these timing charts.

Figure 19B:
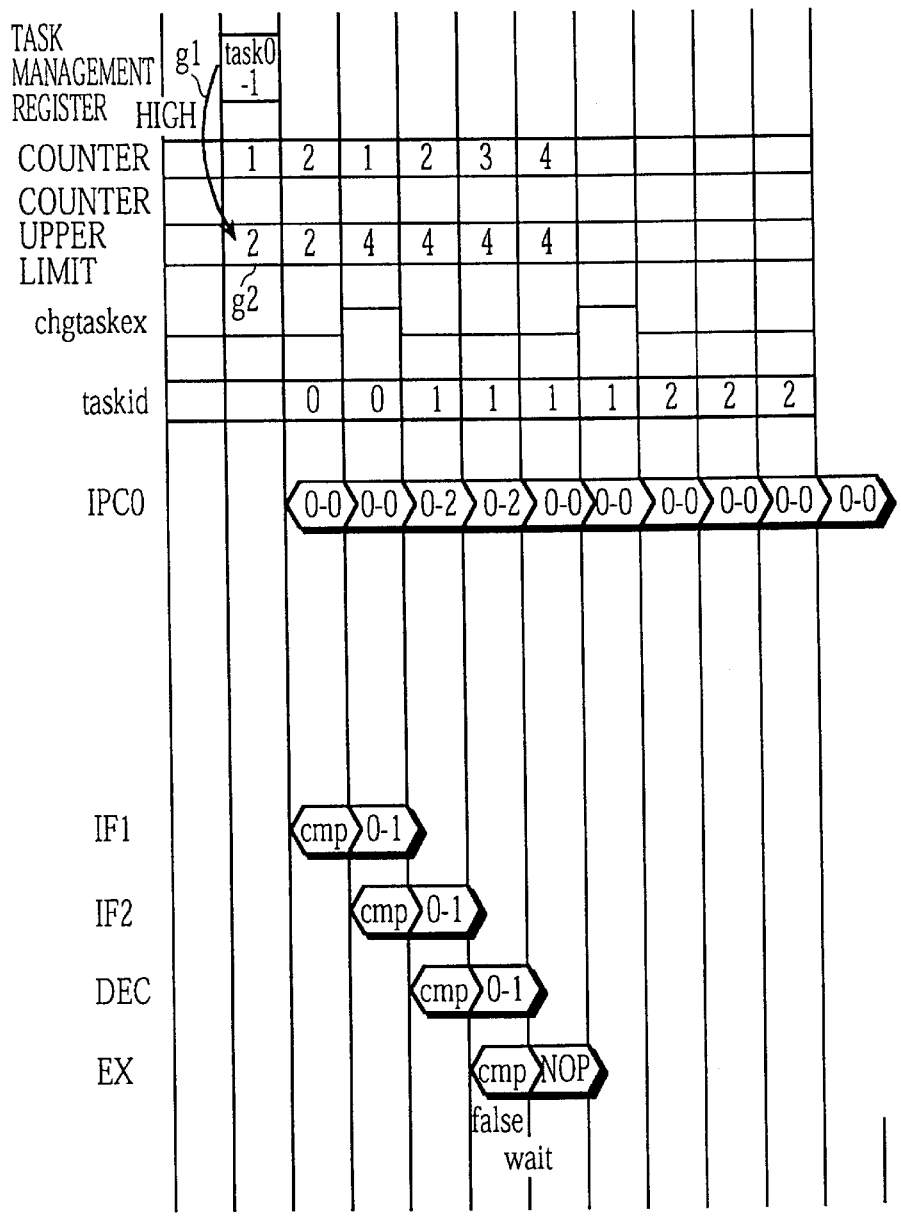
FIG. 19B is a timing chart showing how IPC, IF1, IF2, and DECPC are updated, and how the bits in the task management register 13 and the upper limit of the counter are set for a frame where the phenomenon awaited by the cmp_and_wait instruction is not present.
Figure 19C:
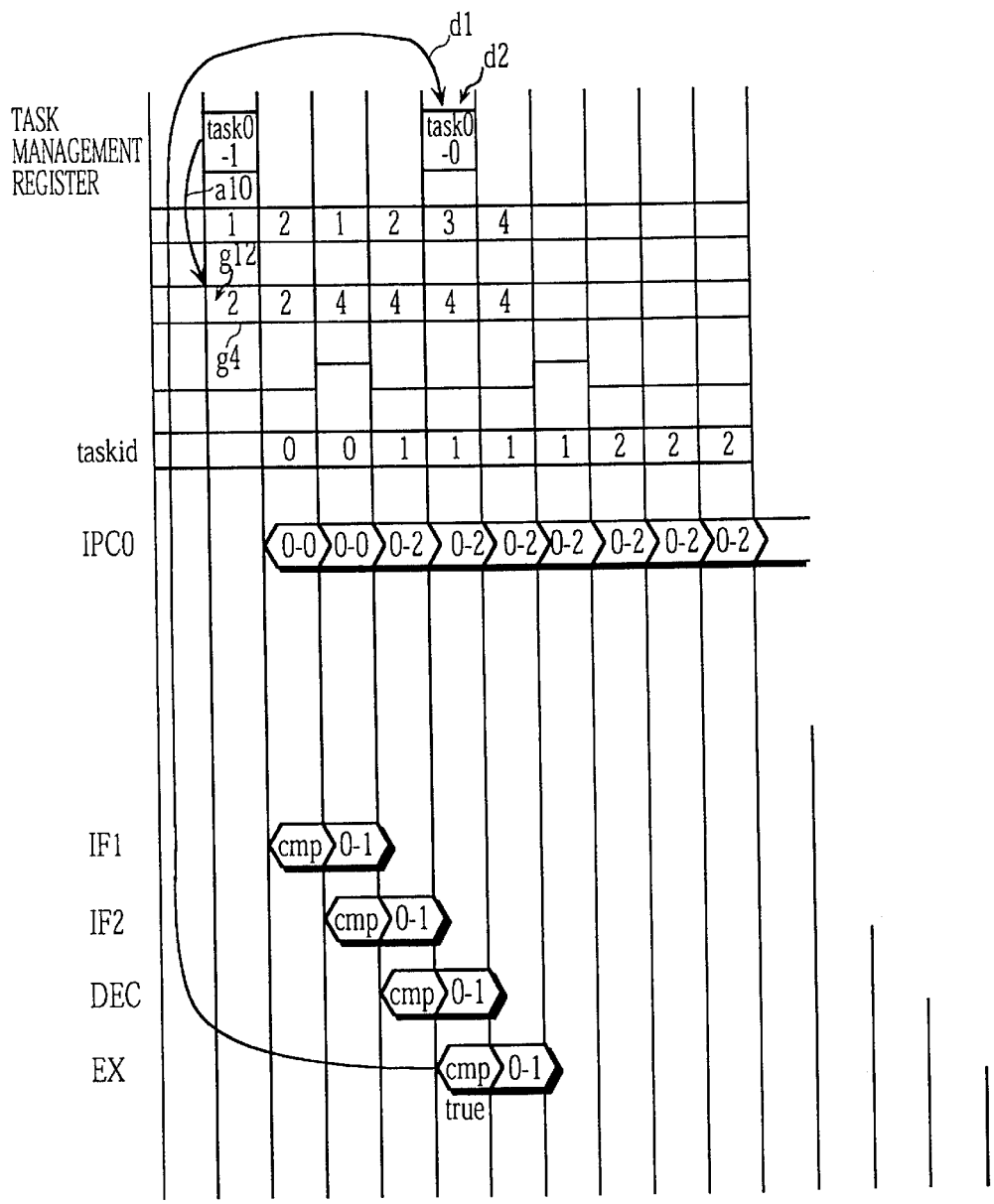
FIG. 19C is a timing chart showing how IPC, IF1, IF2, and DECPC are updated and how the bits in the task management register 13 and the upper limit of the counter are set for a frame where the phenomenon awaited by the cmp_and_wait instruction appears.
Figure 19D:
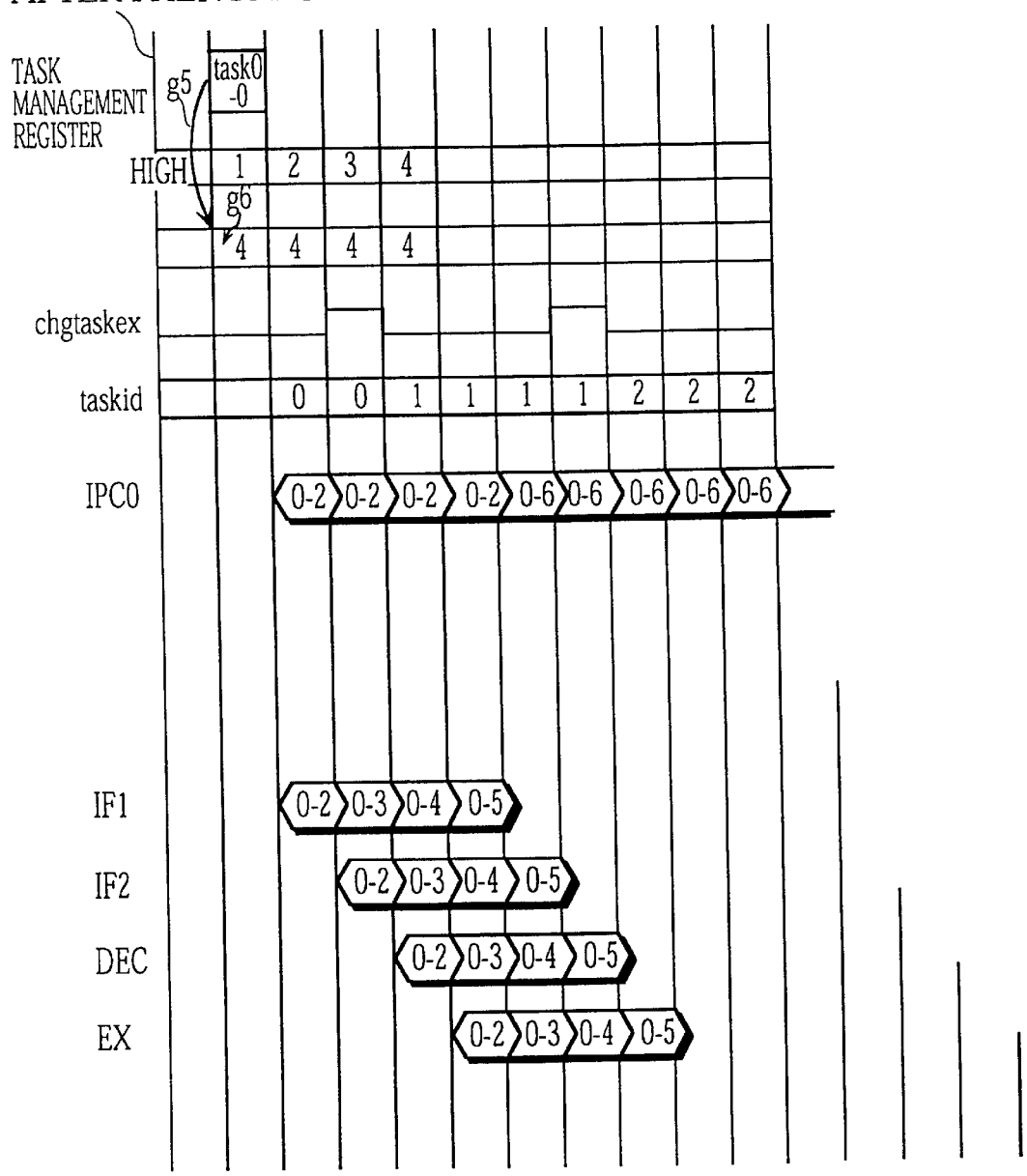
FIG. 19D is a timing chart showing how IPC, IF1, IF2, and DECPC are updated and how the bits in the task management register 13 and the upper limit of the counter are set for frames following the appearance of the phenomenon.

FIG. 19B shows a timing chart for a phenomenon-wait state, FIG. 19C a timing chart for when the phenomenon occurs, and FIG. 19D a timing chart for after the phenomenon has occurred.

In FIG. 19C, the phenomenon whose occurrence was awaited by the cmp__and__wait instruction in task(0) has occurred. As a result, the instruction decode control unit 81 reports that the phenomenon has occurred, as shown by the reference numeral d1. By doing so, the task management register 13 sets the bit corresponding to the task identifier of the task(0) to "0", as shown by the reference numeral d2.

The following is an explanation of the configuration of the thread manager 61 in this third embodiment. This thread manager 61 includes a flip-flop 51, a counter 52, and a comparator 54 in the same way as the thread manager of the first embodiment, although the present thread manager 61 differs in that it further includes an ID convertor 53 and a selector 55.

The ID convertor 53 judges whether a task that is set in a wait state in the task management register 13 matches the task identifier taskid of the task that should be assigned the next thread when an identifier of a task that should be assigned the next thread is outputted to the task ID storage unit 72. When these match, the ID convertor 53 outputs a "High" value to the selector 55, while when the tasks do not match, the ID convertor 53 outputs a "Low" value to the selector 55.

The selector 55 selectively outputs one of the values "2" and "4" to the comparator 54 in accordance with the "High" or "Low" value of the signal outputted by the ID convertor 53. If the next task to be assigned a thread is task(0) in FIG. 19A, a "Low" value is outputted to the selector 55 as shown by the reference numeral a10, so that the selector 55 outputs the value "4" to the comparator 54, as shown by the reference numeral a12. However, in FIG. 19A, if the bit for task(0) is set at "1" as shown by the reference numeral a9, and a "High" value is outputted to the selector 55 as shown by the reference numeral g1 in FIG. 19B, the selector 55 outputs the value "2" to the comparator 54, as shown by the reference numeral g2.

As shown by the reference number d2 in FIG. 19C, when the bit for task(0) is set at "0" and a "High" value is outputted to the selector 55 as shown by the reference numeral g5 in FIG. 19D, the selector 55 outputs the value "4" to the comparator 54, as shown by the reference numeral g6.

By having the selector 55 output one of the numerical values "2" and "4" to the comparator 54, each task can be assigned a thread which can be made up of 2 or 4 cycles. When the selector 55 outputs the value "2", the second instruction will be invalidated, so that a one-cycle thread will be assigned to the present task.

The following is an explanation of the operation of the various components of the instruction read circuit 10 and the various components of the task management unit 15 in accordance with the time axis of the timing charts in FIGS. 19A to 19D.

The initial state of all of the bits in task management register 13 is zero. In FIG. 19A, when an instruction read is performed starting from task(0), the bit corresponding to task(0) in the task management register 13 is "0", so that the selector 55 outputs the maximum value "4" of the counter as shown by the reference numeral a12. Since the maximum value of the counter is set at "4", an attempt is made at executing task(0) for four cycles. However, instruction 0-0 is a cmp_and_wait instruction, so that the read address of this cmp_and_wait instruction is written into the task-demarcated PC storage unit 24, as shown by the reference numeral a7. At the same time, bit0 in the task management register 13 is set to "1" when the cmp_and_wait instruction is executed, as shown by the reference numerals a8 and a9. By making such setting, task(0) is set into a phenomenon-wait state. After setting the bit in this way, task(1), task(2), task(3), task(4), and task(5) are executed, so that the processing advances to the next frame.

Here, the only bit in the task management register 13 which is set to "1" for a phenomenon-wait state is the bit corresponding to task(0). Accordingly, when an instruction read operation is commenced for task(0) in FIG. 19B, the bit for task(0) in the task management register 13 will be "1", so that the selector 55 will output the value "2" as the maximum value of the counter as shown by the reference numeral g2. Since the maximum value of the counter is set at "2", an attempt is made at executing task(0) for two cycles. However, instruction 0-0 is a cmp_and_wait instruction, so that the read address of this cmp_and_wait instruction is written into the task-demarcated PC storage unit 24. After this, task(1), task(2), task(3), task(4), and task(5) are executed, so that the processing advances to the next frame.

Suppose here that the phenomenon awaited by the cmp_and_wait instruction occurs during the next frame. When an instruction read operation is commenced for task(0) in FIG. 19C, the bit for task(0) in the task management register 13 will be "1", so that the selector 55 will output the value "2" as the maximum value of the counter as shown by the reference numeral g4. Since the maximum value of the counter is set at "2", an attempt is made at executing task(0) for two cycles.

When the cmp_and_wait instruction which is instruction 0-0 is executed, it is confirmed that the phenomenon has occurred, so that as shown by the reference numerals d1 and d2, bit0 in the task management register 13 is set at "0". By making this setting, task(0) is freed from its phenomenon-wait state. After setting the bits in this way, task(1), task(2), task(3), task(4), and task(5) are executed, so that the processing advances to the next frame.

FIG. 19D shows the frame after the phenomenon has occurred, so that the bit in the task management register 13 which represents task(0) is "0". As a result, the selector 55 will output the value "4" as the maximum value of the counter as shown by the reference numeral g6. Since the maximum value of the counter is set at "4", an attempt is made at executing task(0) for four cycles.

The following is a description, with reference to FIG. 18A to FIG. 18D, of the assignment of threads by the I/O processor of the third embodiment which is constructed as described above.

Figure 18A:
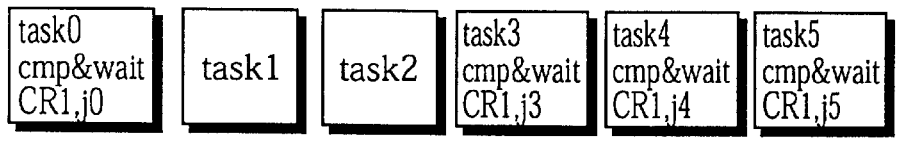
FIG. 18A shows what kinds of task include a cmp_and_wait instruction in the third embodiment.
Figure 18B:
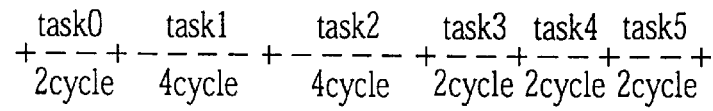
FIG. 18B shows how threads are assigned to each of the tasks shown in FIG. 18A, when the phenomena j0, j3, j4, and j5 are not present.

In FIG. 18A, task(0), task(3), task(4), and task(5) are memory transfer control tasks whose first instruction is a cmp_and_wait instruction. In FIG. 18B, the phenomena awaited by these cmp_and_wait instructions have not yet occurred, so that threads of two cycles are assigned to each of task(0) and task(3) to task(5). Here, the second instruction in each task is invalidated, and only task(1) and task(2) are assigned four cycles.

Figure 18C:
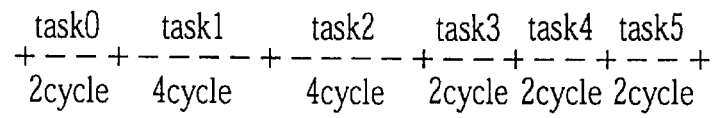
FIG. 18C shows how threads are assigned to each of the tasks shown in FIG. 18A, for a frame where only the phenomenon j0 is present.

In FIG. 18C, task(0) to task(5) are cyclically performed a number of times before the phenomenon awaited by the cmp_and_wait instruction of task(0) occurs. In the frame when this phenomenon occurs, task(3) to task(5) will be assigned a thread of two cycles as before, with their second instructions being invalidated, although the second instruction of task(0) will be executed due to the occurrence of the awaited phenomenon.

Figure 18D:
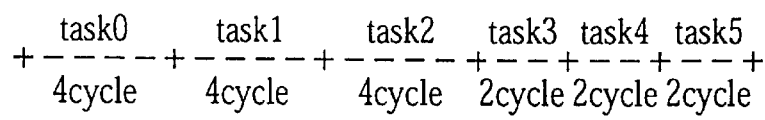
FIG. 18D shows how threads are assigned to each of the tasks shown in FIG. 18A following the frame where phenomenon j0 appears.

FIG. 18D shows the frames following the occurrence of the phenomenon awaited by the cmp_and_wait instruction of task(0). In these frames, task(0) is assigned a thread of four cycles in the same way as the task(1) and task(2).

Figure 18E:
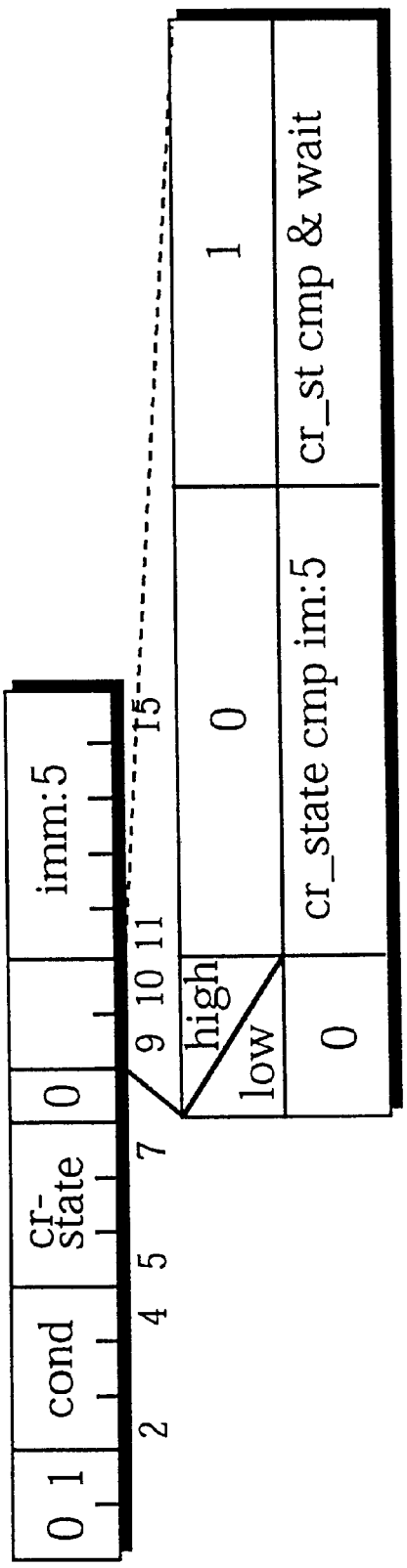
FIG. 18E shows an example of the instruction format of a cmp_and_wait instruction.

FIG. 18E shows an example of the instruction format of a cmp_and_wait instruction. As shown in FIG. 18E, the three bits between bit5 and bit7 are used to specify one of the seven state monitoring registers, while the five bits from bit11 to bit15 are used to specify a five-bit immediate value. In this format, bit9 and bit10 can be used to specify the content of the operation. When these two bits are set at "10", the operation for a cmp_and_wait instruction is executed by the I/O processor. Conversely, when these two bits are set at "00", the operation of a comparison instruction where one of the seven state monitoring registers is compared with a five-bit immediate value is executed by the I/O processor.

With the present embodiment described above, memory transfer control tasks which wait for a state where memory access is possible are assigned shorter time threads, so that the execution of other tasks will proceed faster.

Fourth Embodiment

This fourth embodiment relates to a technique where video out tasks are assigned more threads during the horizontal blanking period and vertical blanking period of the display.

Figure 20:
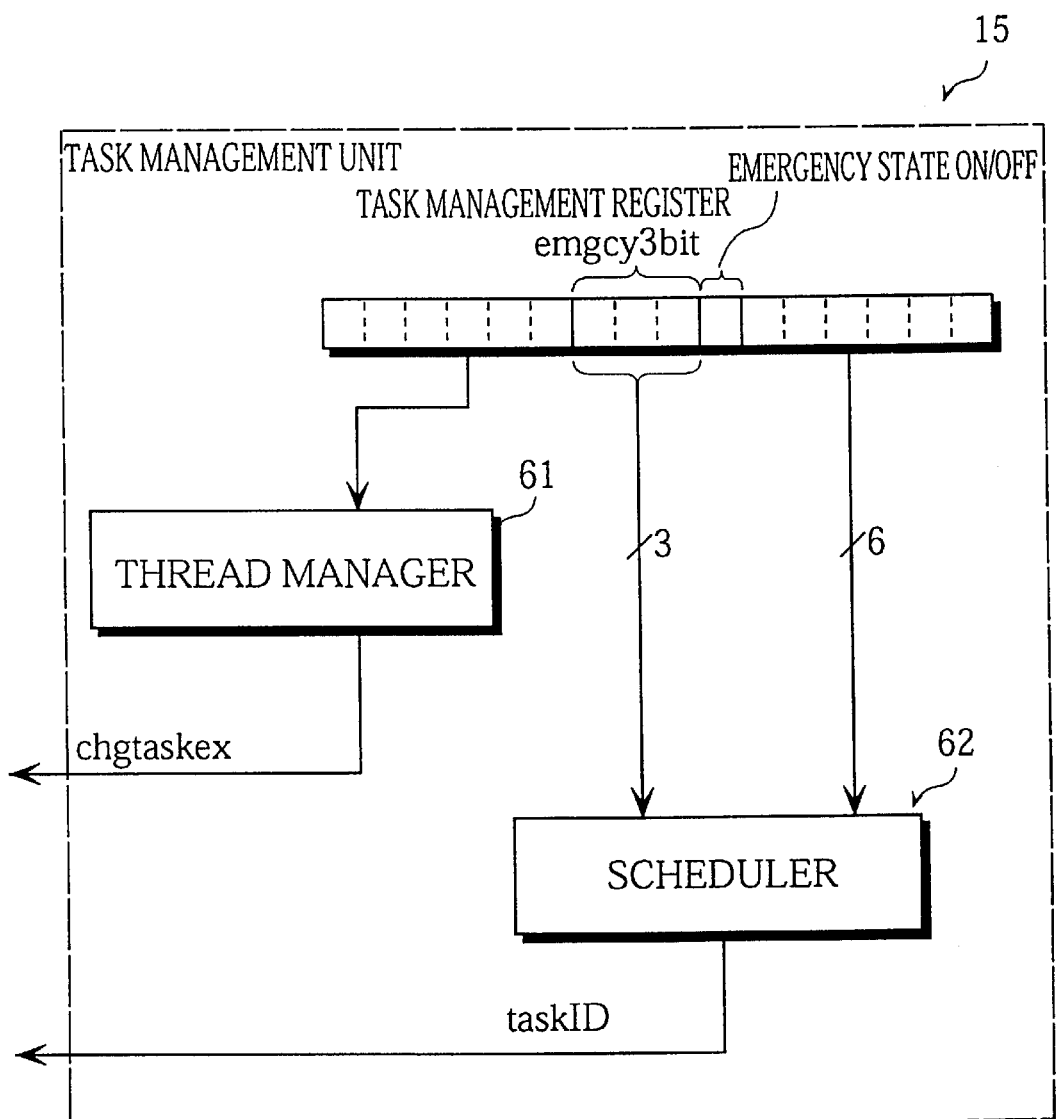
FIG. 20 shows the configuration of the task management unit 15 in the third embodiment.
Figure 21:
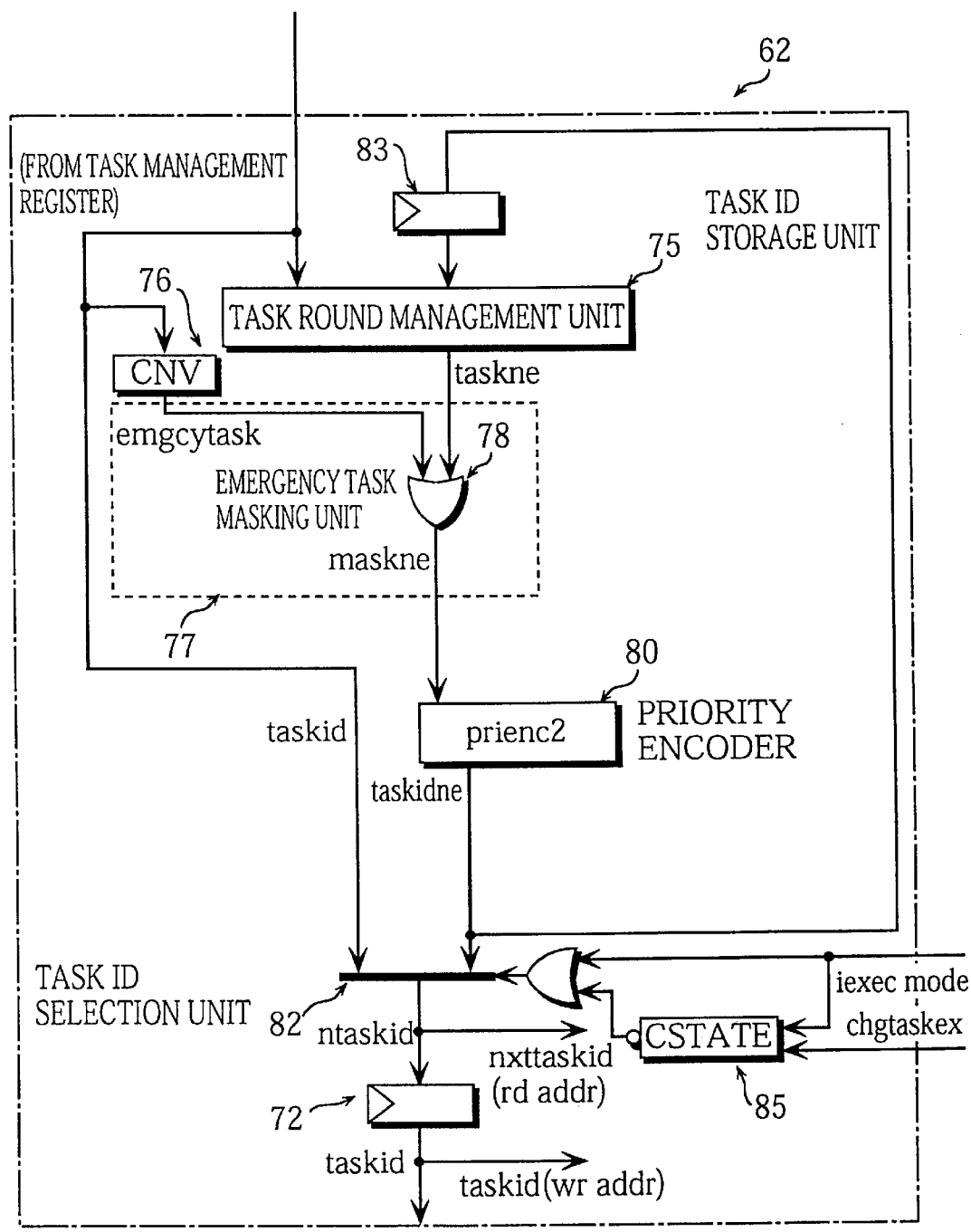
FIG. 21 shows the configuration of the scheduler 62 in the third embodiment of the present invention.

The I/O processor which increases the number of threads is realized by amending the task management unit 15 of the first embodiment as shown in FIGS. 20 and 21.

The I/O processor of this fourth embodiment includes an instruction memory 100, an instruction read circuit 10, an instruction decode control unit 81, a calculation execution unit 84, and a task management unit 15, in the same way as the I/O processor of the third embodiment. However, the I/O processor of this fourth embodiment differs in that the task management register 13 monitors an emergency state transition permission signal iexecmode.

FIG. 20 shows the configuration of the task management unit 15 in this fourth embodiment. As shown in FIG. 20, three bits in the task management register 13 specify the identifier of a task that needs to be given emergency treatment. These three bits that show which of the six tasks requires emergency treatment are set according to the signal content of the emergency state transition permission signal iexecmode. In the present embodiment, the emergency state transition permission signal iexecmode corresponds to the horizontal blanking period and the vertical blanking period, and the identifier of video out tasks is indicated by the three bits in the task management register 13.

The task which requires emergency treatment and is registered in these three bits in the task management register 13 is determined by the task management register 13 referring to the task in which the emergency instruction is included. When the instruction decode control unit 81 has decoded the instruction to be executed next and this next instruction is an emergency instruction, the task management register 13 stores the identifier of the task which includes this instruction as the task which requires emergency treatment.

FIG. 21 shows the configuration of the scheduler 62 in this fourth embodiment. In FIG. 21, the scheduler 62 includes a task ID storage unit 72 in the same way as the scheduler in the first embodiment. The scheduler 62 in the fourth embodiment differs, however, in that the task round management unit 73 and the priority encoder 74 have been respectively replaced with a task round management unit 75 and a priority encoder 80. This scheduler 62 also further includes a convertor 76, an emergency task masking unit 77, and a taskid storage unit 83.

The task round management unit 75 differs from the task round management unit 73 in that while the task round management unit 73 monitors how the task identifiers in the task ID storage unit 71 have been updated and uses a six-bit register to manage which of the six tasks have been assigned threads, the task round management unit 75 performs task management distinguishing between a standard state where tasks are managed according to whether they have been assigned a thread and an emergency state where standard tasks are managed differently. As one example, when task(1) is executed using interleaving by the task management register 13, five out of the six tasks are cyclically performed as task(0), task(2), task(3), task(4), and task(5).

When five tasks are cyclically performed as described above, the round value that shows which tasks have been executed needs to be expressed as a numerical value which ignores the emergency task which is being managed by the task management register 13. In order for the round value to be managed without the emergency task, the task round management unit 75 outputs a round value taskne without the emergency task to the emergency task masking unit 77 aside from the round value taskn. Incidentally, the "ne" in the identifier "taskne" is an abbreviation for "Not Emergency".

The convertor 76 converts the identifier of the emergency task managed by the task management register 13 into a six-bit round value emgcytask.

The emergency task masking unit 77 includes an OR circuit 78 which takes a six-bit logical OR for the six-bit round value emgcytask outputted by the convertor 76 and the round value taskne outputted by the task round management unit 75.

The taking of a logical OR by the OR circuit 78 refers to the calculation of a six-bit round value that includes both the round value taskne and the round value that expresses the emergency task. As one example, when the round value taskne is "001101" to show that threads have been assigned to task(0), task(2), and task(3) and the round value emgcytask is "000010" to show that task(1) is the emergency task, the output of the OR circuit 78 is "001111" to show that threads have been assigned to task(0), task(1), task(2), and task(3).

In addition to the functions of the priority encoder 74, the priority encoder 80 receives the round value taskne (the round value maskne) outputted by the task round management unit 75 and judges at which bit in the round value taskne (the round value maskne) of the task round management unit 75 the bit value switches from "1" to "0". On detecting the first bit from the LSB side to have a bit value of "0", the priority encoder 80 has the task identifier taskid of the task assigned this bit stored in the task ID storage unit 83.

As one example, when the round value maskne "000111", which is the logical OR of the round value of the emergency task and the round value taskne, is outputted from the emergency task masking unit 77, the priority encoder 80 detects that the third bit from the LSB side is where the bit value switches from "1" to "0". As shown in FIG. 6B, this bit is assigned to task(3), so that the priority encoder 80 outputs the task identifier taskid of task(3) to the selector 82.

Figures 22, 23:
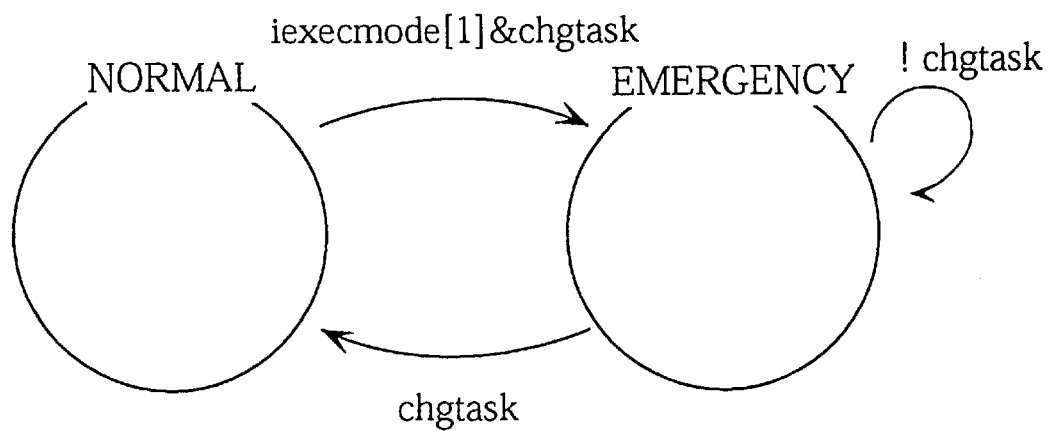
FIG. 22 shows the conditions under which the selector 82 outputs the identifier of an emergency task.
FIG. 23 is a state transition figure showing the changes in the modes stored by the cstate storage unit 85.

The cstate storage unit 85 stores the cstate flag which shows whether the I/O processor is in a normal state or an emergency state. FIG. 23 shows the transition in the state of the flag stored by the cstate storage unit 85. In this figure, the transition from a normal state to an emergency state is performed when the emergency state transition permission signal iexecmode is "High" and the task switching signal chg_task_ex is also "High". Conversely, the transition from an emergency state to a normal state is performed when the task switching signal chg_task_ex next becomes "High". FIG. 24 is a timing chart which shows the timing of the changes in the emergency state transition permission signal iexecmode, the task switching signal chg_task_ex, and the flag cstate.

As shown by the reference numeral a30, the emergency state transition permission signal iexecmode becomes "High" and as shown by the reference numeral a31, the task switching signal also becomes "High". As a result, the flag cstate also becomes "High" as shown by the reference numeral a32 so that the I/O processor changes to being in an emergency state. When the task switching signal next becomes "High" as shown by the reference numeral a33, the flag cstate becomes "Low" as shown by the reference numeral a34 so that the I/O processor changes back to a normal state. Such transitions from a normal state to an emergency state and from an emergency state back to a normal state are repeatedly performed.

When the inputted emergency state transition permission signal iexecmode is "High" and the value of the cstate flag shown by the reference numeral a32 is also "High" (which is to say, the inverse logic state cstate! of the flag cstate is "Low"), the selector 82 selects the task identifier taskide stored in the task management register 13 and outputs it to the task ID storage unit 72. In other cases, the selector 82 selects the task identifier taskidne converted from the round value maskne which is the output of the priority encoder 80 and outputs it to the task ID storage unit 72. FIG. 22 shows the logic table in the selector 82 for this taskide.

The switching of the output of the selector 82 between the task identifier taskidne converted from this round value maskne and the identifier of the emergency task depending on the "High" or "Low" state of the emergency state transition permission signal iexecmode means that depending on the "High" or "Low" state of the emergency state transition permission signal iexecmode, either the task identifier of the emergency task or the task identifier of one of the other tasks will be stored in the task ID storage unit 72.

As one example, when task(1) is the emergency task, a task identifier for one of task(0), task(2), task(3), task(4), task(5) is selectively outputted by the selector 82.

As shown in FIG. 25A, a task identifier for one of the tasks aside from the emergency task will be outputted by the selector 82 in a normal state, which is to say one of task(0), task(2), task(3), task(4), and task(5). The thread assigned to task(1) is composed of zero cycles.

As shown in FIG. 25B, a task identifier for one of the tasks aside from the emergency task and a task identifier for the emergency task will be selectively outputted by the selector 82 in an emergency state. As a result, the emergency task, task(1), will be assigned a thread once every two threads as shown by the progression, task(0), task(1), task(2), task(1), task(3), task(1), task(4), task(1), task(5), task(1). As a result, the output of the task identifiers in the emergency state is such that the task identifier of task(1) is outputted once every two outputs, or in other words with a probability of 1/2.

This probability of 1/2 means that the emergency task will have three times the normal execution probability, so that this emergency task can be executed at very high speed.

With the present embodiment, video out tasks can be given special priority during the horizontal blanking period and vertical blanking period of a display. If video data is converted into image signals during this period, the processing of image signals can be favorably completed within the display period of the display.

It should be noted here that in this fourth embodiment, emergency tasks are given priority in execution, so that there is the drawback that the execution frequency of other tasks falls. However, this can be prevented by further providing a maintenance structure. Such maintenance structure may have the identifiers of tasks (called "exceptional tasks") for which a minimum execution frequency needs to be maintained stored in the task management register, and outputting a signal to the thread manager 61 indicating that these tasks are to be excluded from task switching every four instructions.

On receiving such a signal, the comparator 54 in the thread manager 61 delays the output of the task switching signal by a predetermined time. The length of this delay is the time required to rectify the delay to the execution of each task caused by the prioritization of the emergency task. By delaying the output of the task switching signal by only the predetermined time, the processing of exceptional tasks can be performed for at least four instructions, meaning that the processing delays caused by the emergency task can be recovered.

The present embodiment states that specified tasks are executed at high speed in synchronization with a specifying signal that is inputted from outside the device, although it is also possible for such tasks to be specified by specifying instructions. Here, bit3 in the state monitoring register CR2 is normally set at "0" and may be set to "1" only during the return period of the video signal in a display device which is externally connected. Video out tasks can then be given a CMP instruction that indicates the state monitoring register CR2 and an immediate value as operands and judges whether the two match. Video out tasks can then be executed at high speed only when the result of such CMP instruction is a match. It is also possible to specify a task to be given emergency treatment using the operands of an instruction.

Fifth Embodiment

This fifth embodiment is aimed at improving the efficiency with which tasks are cyclically processed by linking the tasks together.

The linking of tasks referred to here refers to the entrusting of a given task with the role of ending a sleep state for another task, a sleep state being a state entered into by the other task where the assignment of a thread until a specified time is reached will be futile. Here, the task which is entrusted with ending the sleep state waits for the specified time to be reached, at which point it removes the sleep state for the task in question.

There can be cases when a plurality of tasks are simultaneously in sleep states, or when no tasks are in a sleep state. In order to manage tasks that have entered into a sleep state differently, a bit for managing the tasks in the sleep state is assigned in the task management register 13 in this fifth embodiment.

Figure 26:
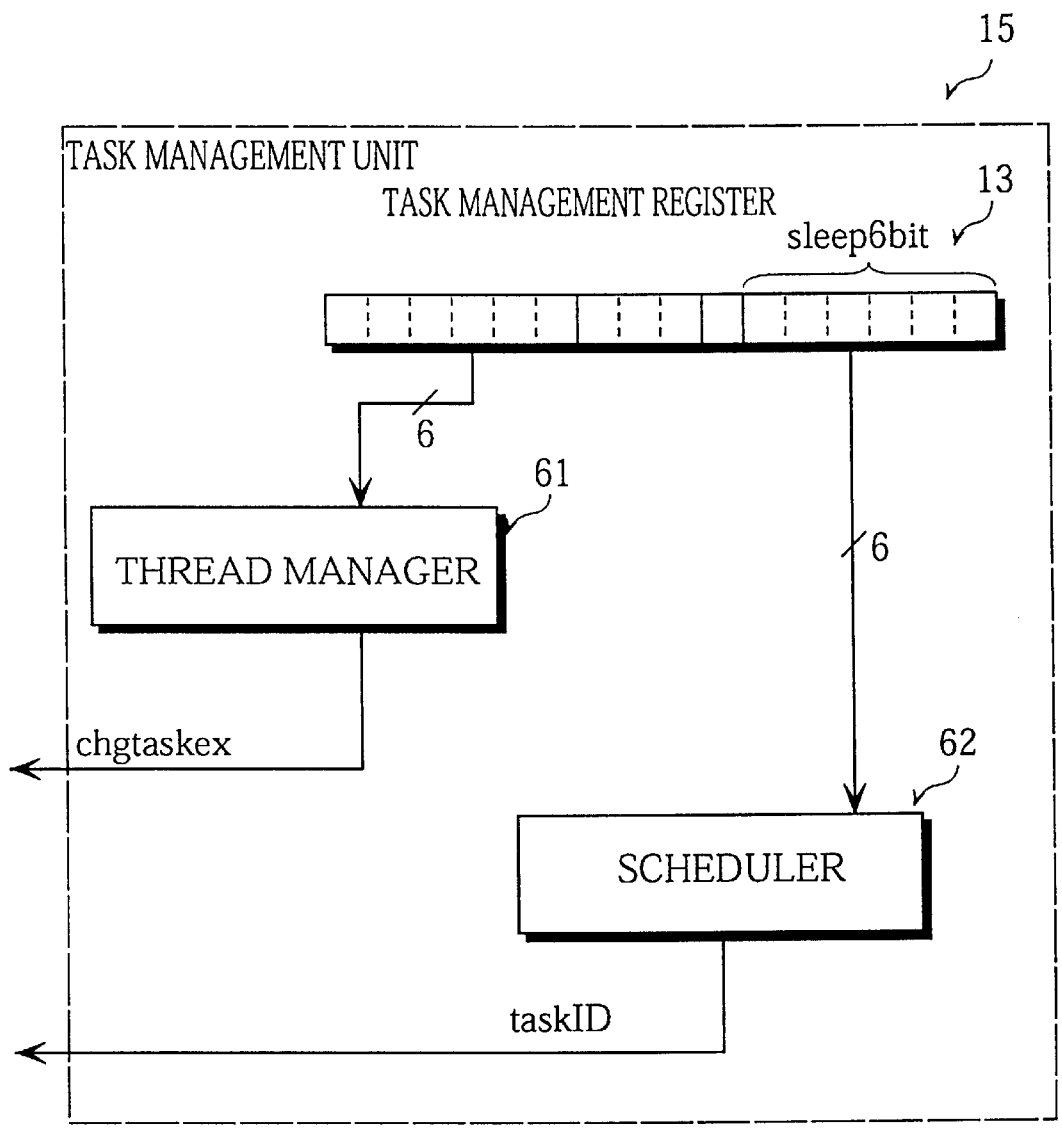
FIG. 26 shows the configuration of the task management unit 15 in the fourth embodiment.
Figure 27:
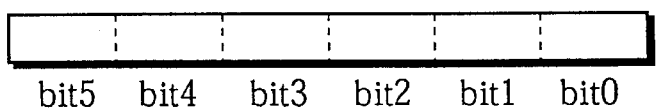
FIG. 27 shows the assignment in the task management register 13 of the bits assigned to the sleep state.

FIG. 26 shows the configuration of the task management unit 15 in this fifth embodiment, while FIG. 27 shows the bit composition of the task management register 13 and how the various bits function as flags. In FIG. 27, when the value of bit0 of the task management register 13 is "0", this shows that task(0) is being processed in a sleep state, while the value "1" shows that this is not the case.

When the value of bit1 of the task management register 13 is "0", this shows that task(1) is being processed in a sleep state, while the value "1" shows that this is not the case. In the same way, when the value of bit2 of the task management register 13 is "0", this shows that task(2) is being processed in a sleep state, while the value "1" shows that this is not the case. By changing these bits, tasks can put themselves in a sleep state, or can end a sleep state for other tasks.

The bit operations for the task management register 13 are performed by instructions which are shown by mnemonics in {Example 3} and {Example 4} below.

EXAMPLE 3 sleep_task

EXAMPLE 4 wake_task task(k)

The sleep_task instruction in {Example 3} above is an instruction for putting the present task into a sleep state. The wake_task instruction in {Example 4} above, meanwhile, has a first operand which indicates a task identifier of one of the six tasks. By providing these two types of instructions in the various tasks, each task can put itself into a sleep state which is then removed by another task.

Figure 28:
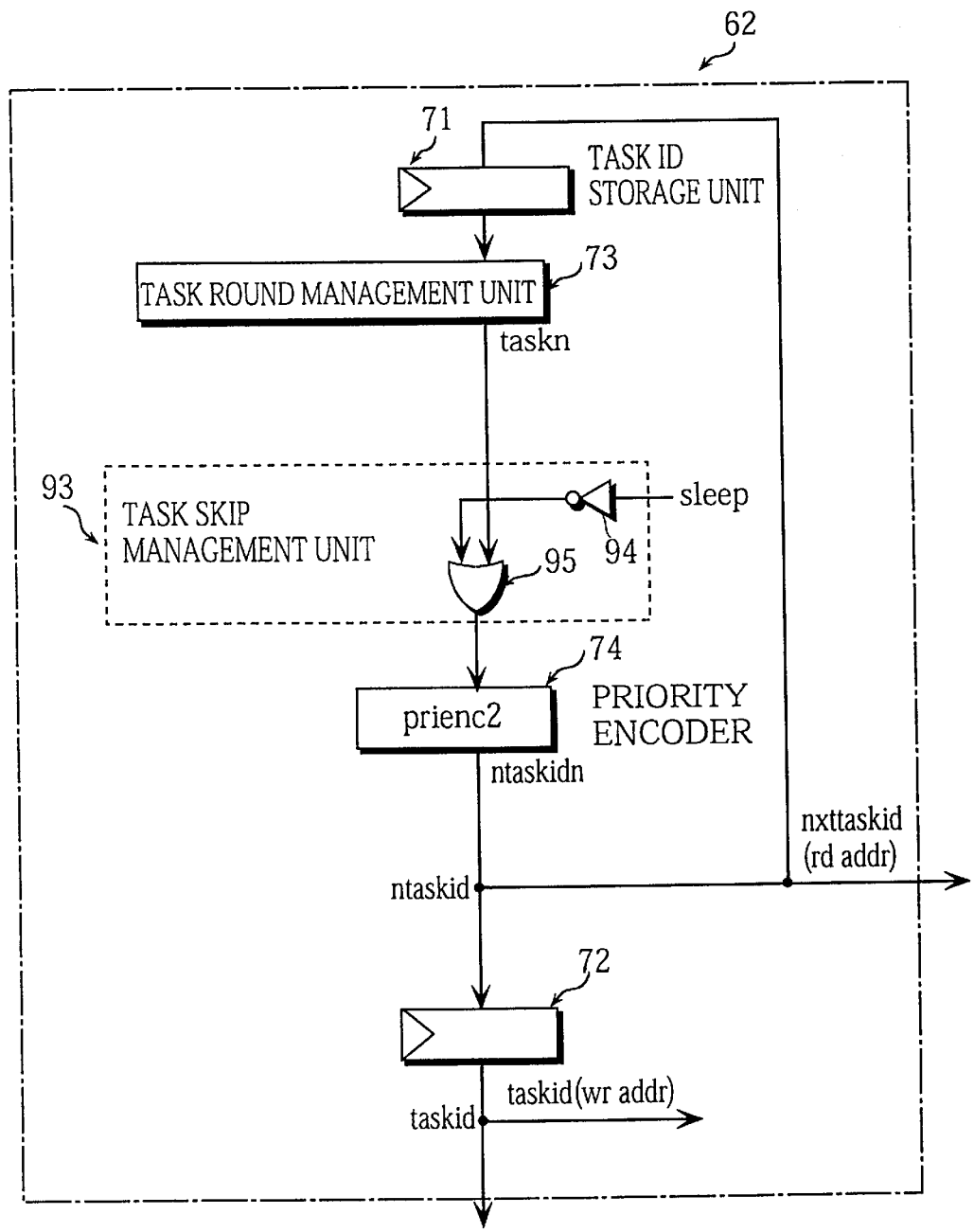
FIG. 28 shows the configuration of the scheduler 62 in the fourth embodiment.

FIG. 28 shows the configuration of the scheduler 62 in this fifth embodiment. As shown in FIG. 28, the scheduler 62 includes a task ID storage unit 71, a task ID storage unit 72, a task round management unit 73, and a priority encoder 74 in the same way as the scheduler in the first embodiment. The scheduler 62 in this fifth embodiment differs, however, in that it includes a task skip management unit 93 that is composed of an inverter 94 and an OR circuit 95.

The task skip management unit 93 is composed of an inverter 94 which inverts the six bits assigned to sleep states in the task management register 13 and an OR circuit 95 that takes a logical OR of the inverted six bits and round value taskn outputted by the task round management unit 73. Here, suppose that the round value taskn "000111" showing that threads have been assigned to task(0), task(1), and task(2) is outputted from the task round management unit 73, and that task(3) has been set into a sleep state in the task management register 13. In this case, the sleep bits in the task management register 13 are "110111", so that the inverted value "001000" is outputted by the inverter 94. The logical OR taken by the OR circuit 95 for this round value taskn "000111" and the inverted value "001000" results in the value "001111". When this value is outputted to the priority encoder 74, the priority encoder 74 detects that the bit value switches from "1" to "0" 1 at the fourth bit from the LSB side, so that the priority encoder 74 outputs the task identifier for task(4) to the task ID storage unit 71 and the task ID storage unit 72. If the task identifier taskid for task(4) is outputted here, the execution of tasks will proceed as task(0), task(1), task(2), and task(4).

FIG. 29A shows an example of asynchronous event tasks that include sleep instructions as instructions 1-1, 2-1, and 3-1. FIG. 30, meanwhile, is a timing chart that shows how the asynchronous event tasks in FIG. 29A are executed. When a sleep instruction is stored as the first instruction in an asynchronous event task such as instruction 1-1 in FIG. 29A, when this instruction 1-1 is stored in the DECPC storage unit 23 and decoded by the instruction decode control unit 11, the selector 25 stores the read address of the instruction 1-2 in the task-demarcated PC storage unit 24 via the signal line ①. Following this, the instruction decode control unit 11 invalidates the instructions 1-2 and 1-3 (as shown by the label "NOP" in FIG. 30).

Figure 29B:
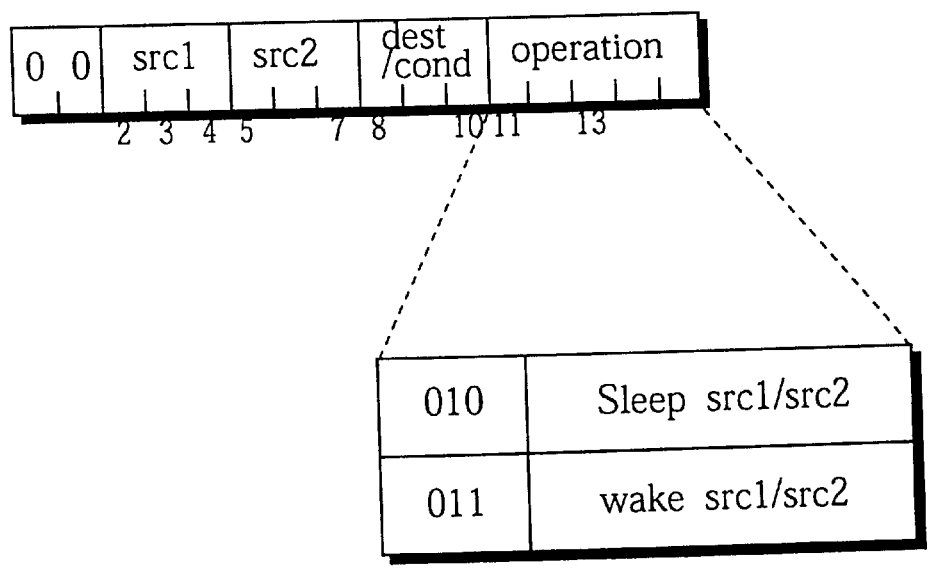
FIG. 29B shows an example of the instruction format of a wake_task instruction and of a sleep instruction.
Figure 30:
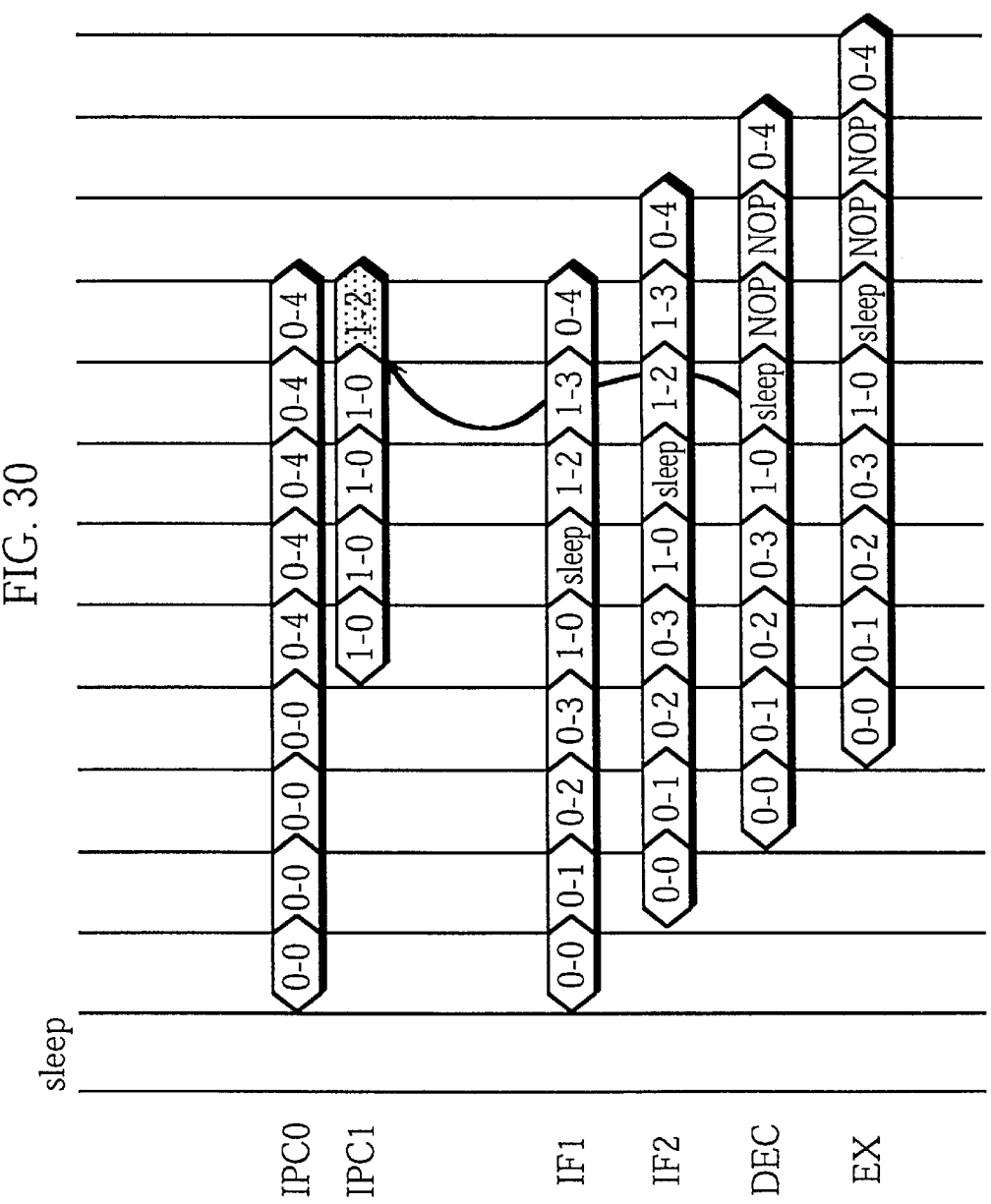
FIG. 30 is a timing chart showing how IPC, IF1, IF2, and DECPC are updated in the fourth embodiment.

FIG. 29B shows an example instruction format for a sleep instruction and a wake_task instruction. In FIG. 29B, the present instructions have the same instruction format as an arithmetic instruction that specifies registers which was shown in FIG. 7B. In this format, the three bits from bit11 to bit13 can be set at "010" to have the operation for a sleep instruction executed by the I/O processor. Alternatively, the same three bits can be set at "011" have the operation for a wake_task instruction executed by the I/O processor.

The following is an explanation of how threads are assigned by the I/O processor of this fifth embodiment, with reference to FIGS. 31A to 31D.

In this example, task(1) is a paging task and task(3) is a host I/O task, with the first instruction in each of task(1), task(2), and task(3) being a sleep instruction. In such case, task(0), task(4), and task(5) are each assigned a thread of four cycles, while task(1), task(2), and task(3) which each include a sleep instruction are each assigned a thread of two cycles, as shown in FIG. 31A.

After the sleep instructions have been executed, task(1), task(2), and task(3) will be assigned threads containing zero cycles in the following frames, as shown in FIG. 31B.

In this example, task(0) is a bit stream transfer control task which has a long activation period, and first includes a wake_task instruction for task(3). Accordingly, when this wake_task instruction is decoded and executed in the following frame, task(3) will be assigned a thread containing 4 cycles as a result of the decoding.

In the present example, suppose that a wake_task instruction for task(1) is stored as the $14^{th}$ instruction in task(0). When this is the case, the decoding and execution of this wake_task instruction will result in task(1) thereafter being assigned a thread of four cycles, as shown by FIG. 31D.

With the present embodiment described above, tasks for which the activation period is limited, such as paging tasks and host I/O tasks, can put themselves into a sleep state, with the removal of the sleep state for these tasks being entrusted to tasks with longer activation periods, such as transfer control tasks. Accordingly, the throughput of cyclical execution of tasks can be improved.

Sixth Embodiment

This sixth embodiment relates to a technique for combining the wait state control described in the third embodiment, the emergency task control described in the fourth embodiment, and the sleeping task control described in the fifth embodiment.

Figure 32:
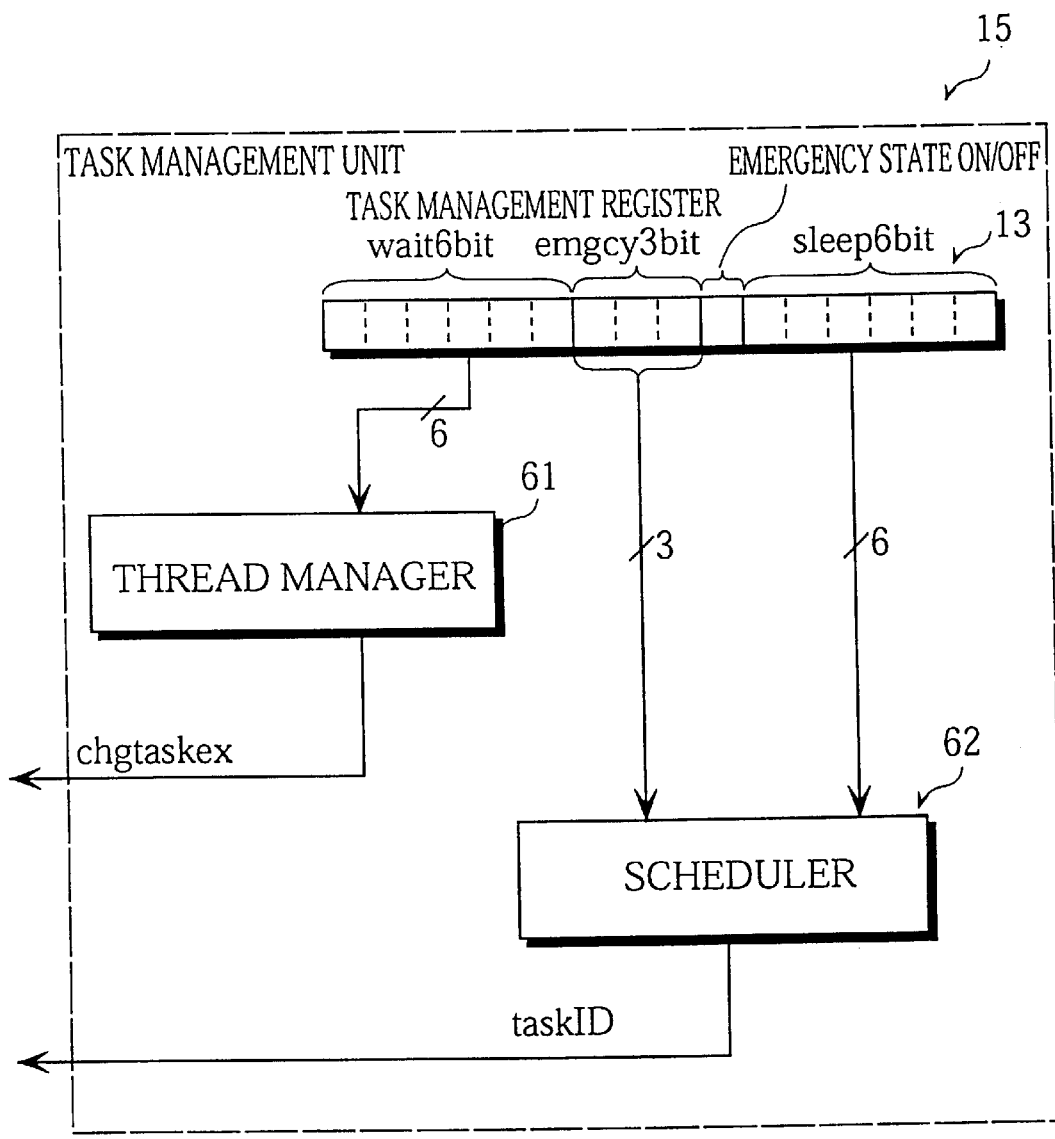
FIG. 32 shows the configuration of the task management unit 15 in the fifth embodiment of the present invention.

FIG. 32 shows this combination of the wait state, the emergency bits and the sleep bits in the bits in the task management register 13. In this sixth embodiment, the thread manager 61 and the scheduler 62 refer to this combination of the wait state, the round value taskne, and the round value taskn to determine the next task to be assigned a thread and to adjust the number of instructions in this next thread.

Figure 33:
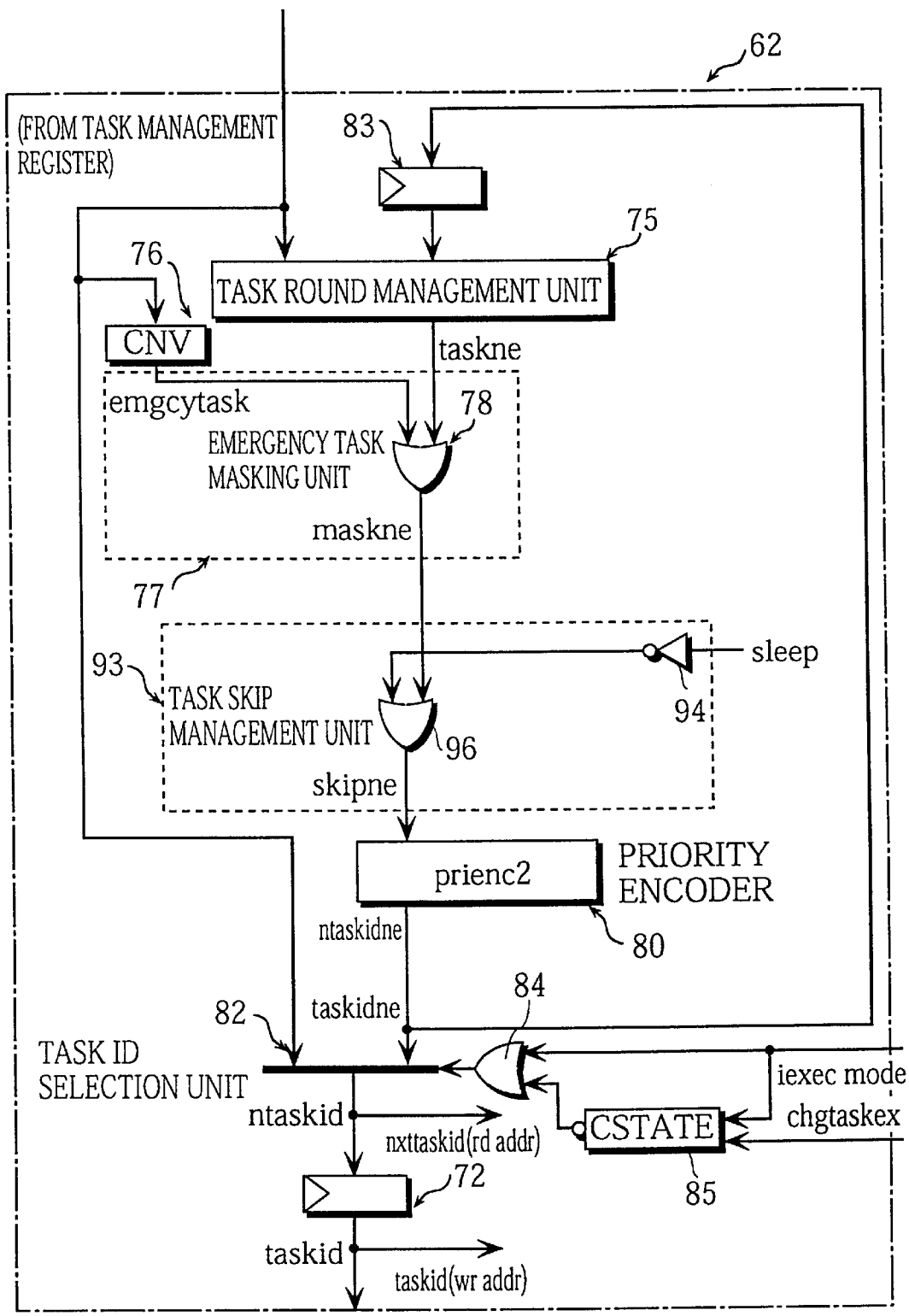
FIG. 33 shows the configuration of the scheduler 62 of the present embodiment.

FIG. 33 shows the configuration of a scheduler 62 which can perform both emergency task control and round value taskne task control. As shown in FIG. 33, this scheduler 62 includes a task ID storage unit 72, a task round management unit 75, a convertor 76, an emergency task masking unit 77, a priority encoder 80, a selector 82, and a task ID storage unit 83 in the same way as in the fourth and fifth embodiments. An OR circuit 96 is also provided to take a logical OR of the output of the task round management unit 75 and the round value taskne inverted by the inverter 94, and to then output the result of the logical OR to the priority encoder 80.

The priority encoder 80 converts the round values outputted by the OR circuit 95 and the OR circuit 96 into task identifiers which it outputs to the task ID storage unit 72 and the task ID storage unit 83.

With the present embodiment, the control of emergency tasks described in the fourth embodiment can be performed alongside the control for the round value taskne tasks described in the fifth embodiment, meaning that highly flexible task scheduling is possible.

Overall Control Performed in the First to Sixth Embodiments

The following is an explanation of the overall control of the I/O processors shown in the first to fifth embodiments, with reference to flowcharts.

Figure 34:
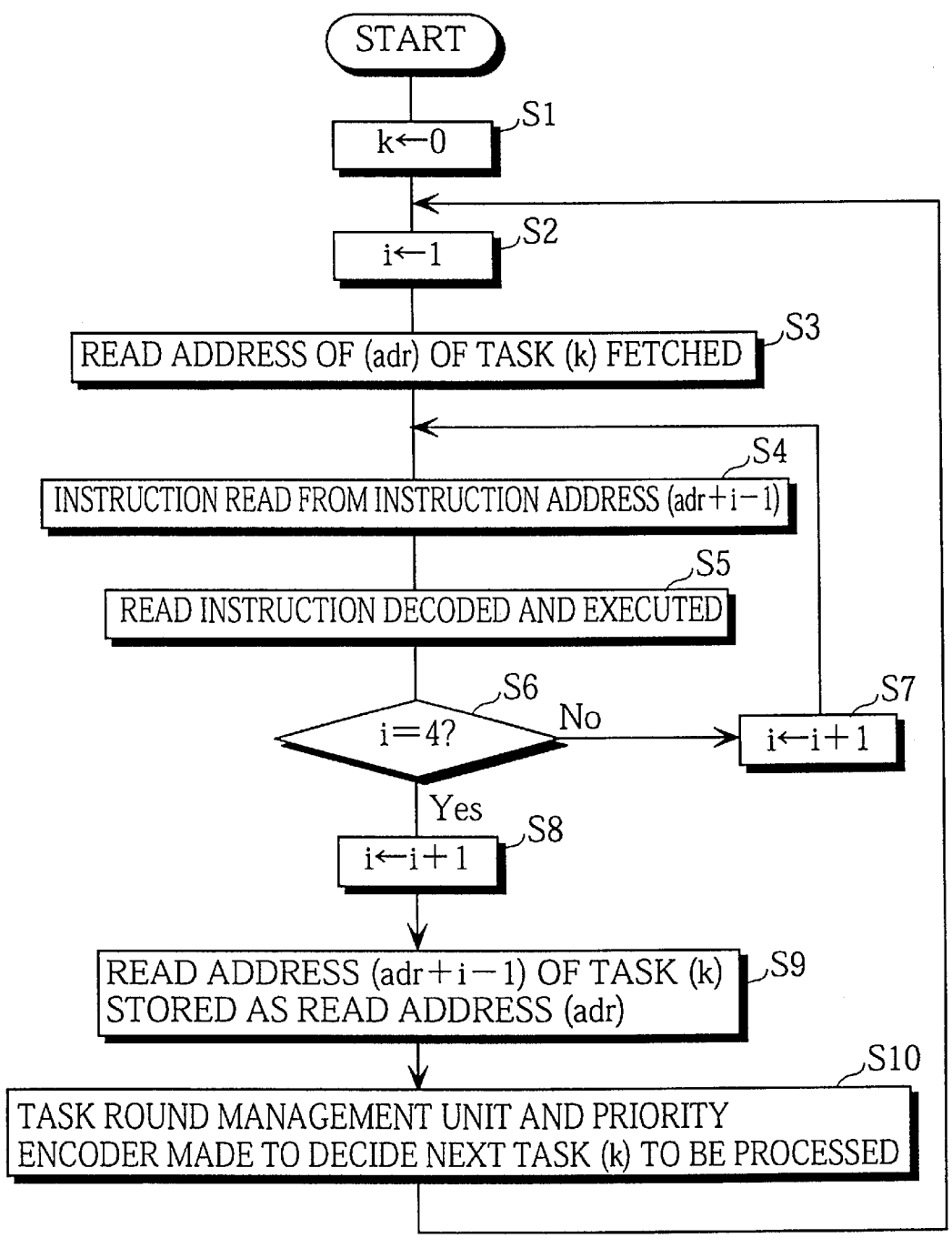
FIG. 34 is a flowchart showing the overall control of the I/O processor in the first embodiment.

FIG. 34 is a flowchart which shows the overall control of the I/O processor in the first embodiment. In this flowchart, the variable k is a variable which is stored in the instruction memory 100 to specify one of the asynchronous event tasks, and corresponds to the task identifier taskid stored by the task ID storage unit 71 and the task ID storage unit 72. The variable i is a variable which specifies the number of an instruction in a thread when the instructions in the various tasks are being executed, and corresponds to the count value counted by the counter 52. The variable adr, meanwhile, is a variable which specifies the read address of each task stored in the task-demarcated PC storage unit 24.

Figure 39:
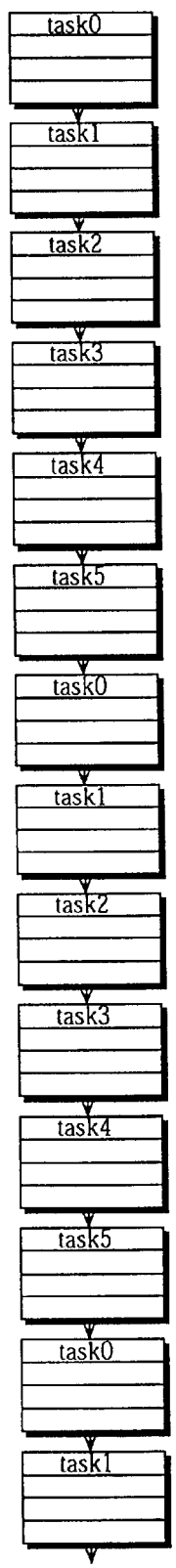
FIG. 39 shows how threads are assigned to tasks in the first embodiment.

FIG. 39 shows the transition between threads in the flowchart of FIG. 34. In FIG. 39, the vertical axis represents time, with time progressing in the downward direction. Each square containing four rectangles represents a thread. Each of these threads can be specified by the variable k in FIG. 34. Each rectangle in each thread represents a cycle in which one instruction is executed, with one of these instructions being specified by the variable i in FIG. 34. In step S1, the task ID storage unit 71 outputs zero as the task identifier taskid. When doing so, the variable k is reset to zero, and the processing advances to step S2. In step S2, the variable i is initialized to "1" by initializing the counter 52. In step S3, the task ID storage unit 72 outputs a read address selection signal nxttask_id(rd_adr) to the task-demarcated PC storage unit 24 to have the read address for task(k) read from the task-demarcated PC storage unit 24. In step S4, the read address for task(k) is used to fetch an instruction from the instruction memory 100. In step S5, the instruction decode control unit 11 decodes and executes the fetched instruction.

In step S6, the comparator 54 compares the variable i with the maximum value "4". Since i=1 at this point, the processing advances to step S7. In step S7, the variable i is incremented by the counter 52 and the incrementing of the read address is performed by the increment circuit 21, which means that a switching is performed from the present instruction in task k to the next instruction. Here, the variable i is incremented to "2", so that a switching is performed to the execution of the second instruction in the present t ask.

After the variable i is incremented, the processing returns to step S4. After incrementing, variable i is "2", so that the read address advances to the next instruction and in step b4 the instruction read circuit 10 reads an instruction from the read address (adr+1) in the instruction memory 100. In step S5, the instruction decode control unit 11 decodes and executes this instruction.

The loop process in steps S4 to S7 is repeated executed with the variable i being incremented each time. As a result, the instructions stored in the regions adr, adr+1, adr+2, and adr+3 of the instruction memory 100 are successively read.

The processing in steps S4 and S5 is repeated until the result "Yes" is obtained in step S6, at which point the processing advances to step S8. By having the processing in steps S4 to S7 repeated until the variable i becomes "4", the execution of an instruction will be performed four times for task(0). This is illustrated by the four rectangles in the top block in the FIG. 39 which represent the execution of four instructions in the first thread for task(0). The procedure in step S8 to step S10 performs a task switching, so that the judgement in S6 means that task switching will be performed every time four instructions have been executed.

When the variable i is judged to have reached its upper limit in step S6, the variable i is incremented by the increment circuit 21 in step S8 and in step S9 the read address (adr+i−1) of the task k is stored as the read address (adr) in the task-demarcated PC storage unit 24. The processing then advances to step S10 where the task round management unit 73 and the priority encoder 74 determine which task(k) is to be assigned the next thread. At this point, the value "000000" is outputted by the task round management unit 73 as the round value taskn and the value "001" is outputted as the task identifier taskid by the priority encoder 74. Since the task identifier taskid is "001", which is to say k=1, switching is performed from task(0) to task(1). After this task switching, the processing returns to step S2 where the variable i is once again initialized to "1", before the repeated procedure in steps S3 to S7 is commenced.

As before, in step S4 one instruction included in task(1) is fetched from the appropriate read address in the instruction memory 100 and in step S5 the fetched instruction is decoded and executed.

In step S6, the variable i is compared with its upper limit of "4". In this case, i=1 so that the processing advances to step S7. In step S7, the variable i is incremented and the processing returns to step S4. After incrementing, the value of the variable i is "2", so that in step S4, access is performed to the region in the instruction memory 100 indicated by the read address (adr+1). The instruction stored at the region in the instruction memory 100 indicated by the read address (adr+1) is then read and in step S5 is decoded and executed.

The loop process in steps S4 to S7 is repeated, so that the instructions stored in the regions adr, adr+1, adr+2, and adr+3 of the instruction memory 100 are successively read.

The processing in steps S4 and S5 is repeated until the result "Yes" is obtained in step S6, at which point the processing advances to step S8. By having the processing in steps S4 to S7 repeated until the variable i becomes "4", the execution of an instruction will be performed four times for task(1). This is illustrated by the four rectangles in the second top block in the FIG. 39 which represent the execution of four instructions in the first thread for task(1). In step S8, the variable i is incremented, and in step S9 the read address (adr+i−1) of the task k is stored as the read address (adr) in the task-demarcated PC storage unit 24. The processing then advances to step S10 where the task round management unit 73 and the priority encoder 74 determine which task(k) is to be assigned the next thread. At this point, the variable k is set at "2", so that switching is performed from task(1) to task(2). After this task switching, the processing returns to step S2 where the variable i is again initialized to "1", before the repeated procedure in steps S3 to S7 is commenced.

As a result of this processing, each of task(0), task(1), task(2), task(3), task(4), and task(5) is executed four instructions at a time, so that the tasks are successively processed.

Overall Control Performed in the Second Embodiment

Figure 35:
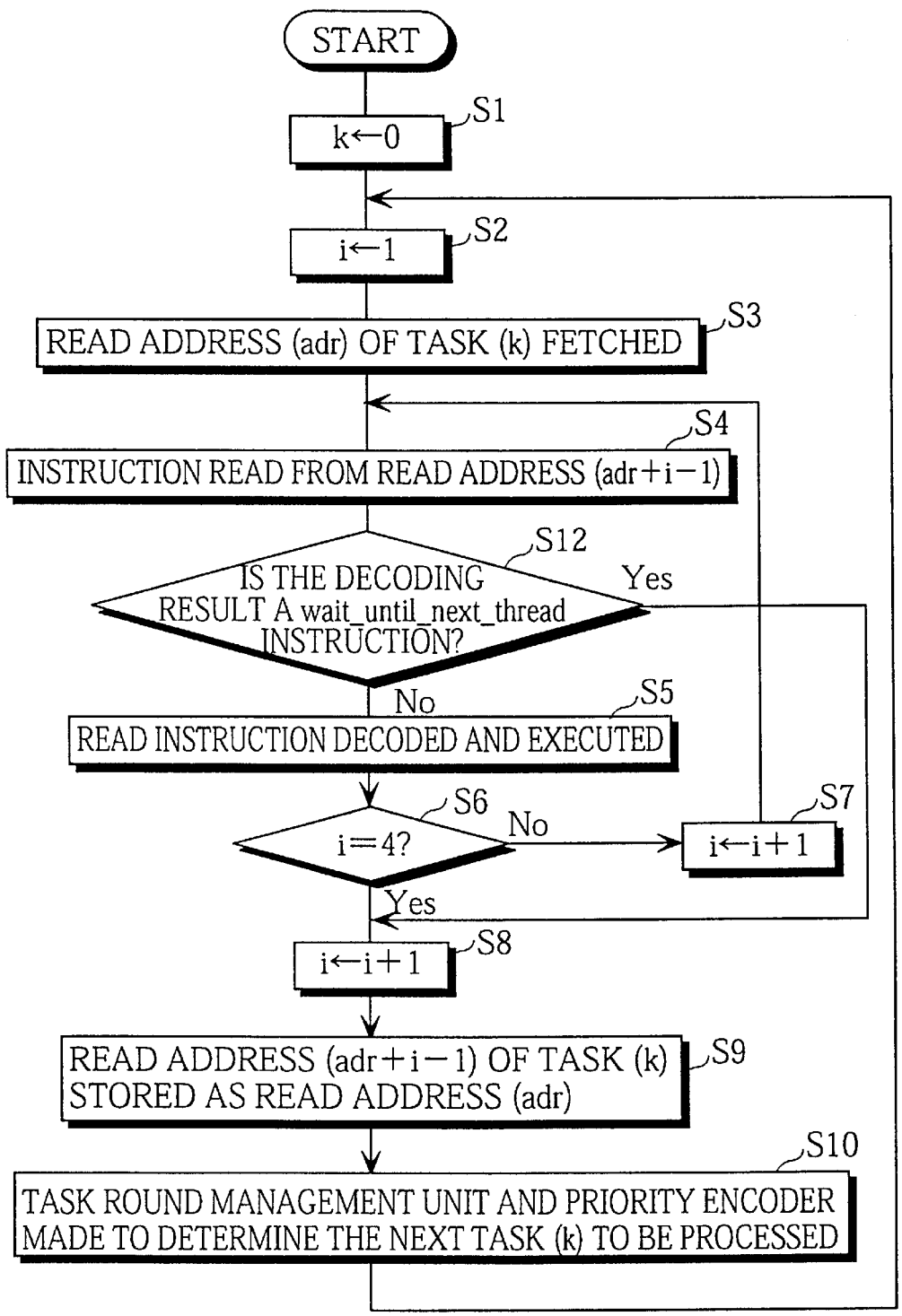
FIG. 35 is a flowchart showing the overall control of the I/O processor in the second embodiment.

The overall control executed by the I/O processor in the second embodiment is performed in accordance with the flowchart in FIG. 35. The flowchart in this FIG. 35 is composed of steps S1 to S10 which are based on the flowchart in FIG. 34. The characteristic operation of the flowchart in FIG. 35 is step S12 which has been inserted between step S4 and step S5.

In step S12, it is judged whether the instruction read from the instruction read from instruction memory 100 in step S4 is a wait_until_next_thread instruction. When this instruction is a wait_until_next_thread instruction, the processing advances to step S8 where the variable i is incremented and to step S9 where the read address (adr+i−1) of task(k) is stored as the read address (adr).

It should be noted here that regardless of the value of the variable i, if a wait_until_next_thread instruction is detected in step S12, the processing will advance to step S8 and the read address of the present task will be stored. By having the processing advance from step S12 directly to step S8 in this way, switching between tasks will be performed without waiting for four instructions to be executed for the present task.

Figure 40:
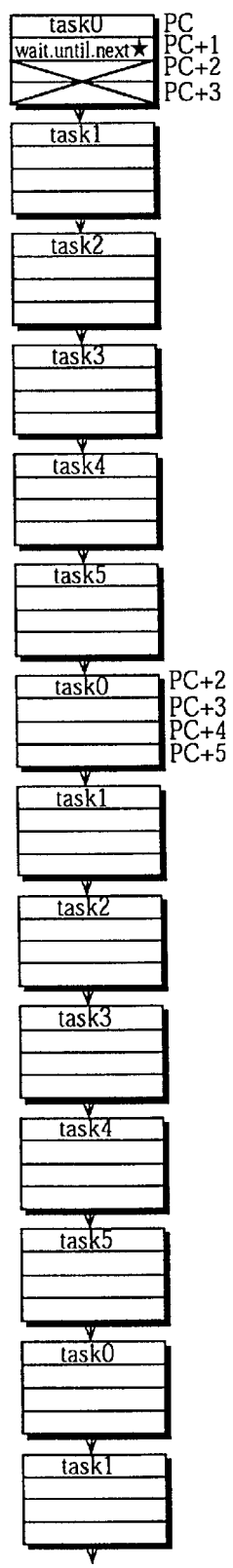
FIG. 40 shows how threads are assigned to tasks in the second embodiment.

FIG. 40 shows the transition between threads in the second embodiment.

As in FIG. 39, the vertical axis represents time, with time progressing in the downward direction. Each square containing four rectangles represents a thread. Each rectangle in each thread represents a cycle in which one instruction is executed. In the sequence in FIG. 40, the cycle marked with a star shows the wait_until_next_thread instruction. For each thread for task(0), the instruction in the instruction memory 100 which is currently being executed is expressed by the combinations of the program count value and a relative value, expressed as "PC", "PC+1", "PC+2", "PC+3", given to the right of the threads. Note that in this figure, the program count value has its initial value set as the value when the first instruction in the first thread for task(0) is read.

Figure 36:
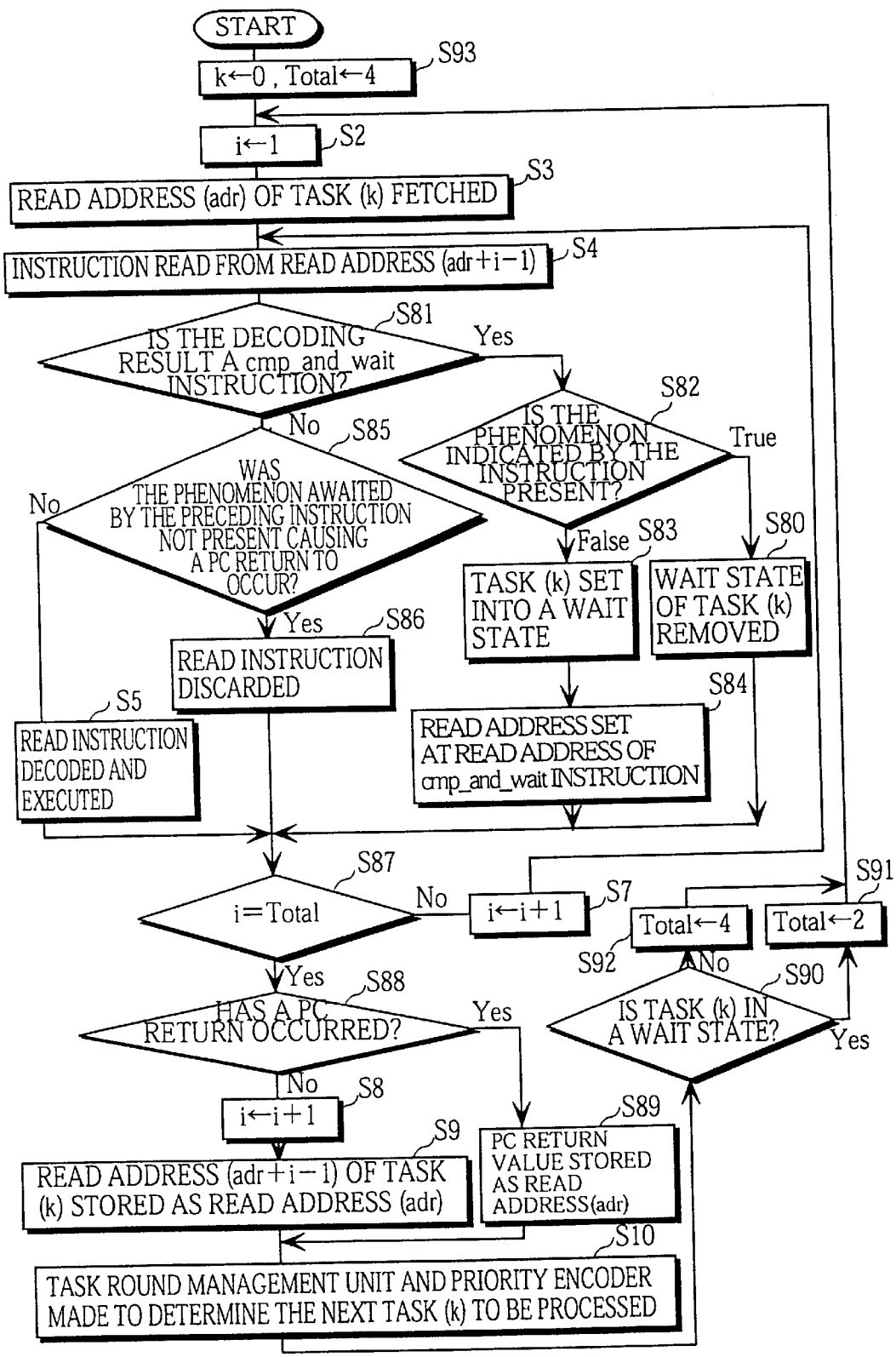
FIG. 36 is a flowchart showing the overall control of the I/O processor in the third embodiment.

As a result of the processing in steps S1 to S4 in FIG. 36, the first instruction in the first thread of task(0) is read. The decoding result of this instruction is judged in step S12, and since the first instruction in the first thread of task(0) is not a wait_until_next_thread instruction, the processing proceeds to step S5. As a result, the first instruction in the first thread of task(0) is executed, so that the processing of the present task proceeds by one instruction.

The procedure in step S1 to step S4 is repeated, so that the second instruction in the first thread of task(0) is read. The decoding result of this instruction is judged in step S12, and since this second instruction in the first thread of task(0) is a wait_until_next_thread instruction, the processing immediately advances to step S8. In step S8, the variable i is incremented by 1 to become "3", and in step S9 the read address (adr+2) is stored in the task-demarcated PC storage unit 24 as the read address for task(0).

After this, the next value of variable k is selected in step S10, so that the variable k becomes "1" and a task switching is performed from task(0) to task(1) without waiting for the third and fourth instructions in task(0) to be executed.

Four instructions are then executed for the first thread of task(1), and for the first threads of tasks (2) to (5). After the fourth instruction in the first thread for task(5) has been executed, the variable k is determined in step S10, the variable i is initialized to "1" in step S2, and in step S3 an instruction is read from the read address given in the task-demarcated PC storage unit 24 for task(0). It should be noted here that when the second instruction, i.e., the wait_until_next_thread instruction, of the first thread of task(0) was executed, PC+2 (where PC is the value of the program counter when the read address of the first instruction was read) was stored as the read address for task(0) in the task-demarcated PC storage unit 24. Since PC+2 is stored in the task-demarcated PC storage unit 24 in this way, the execution of instructions in the second thread of task(0) commences from PC+2, which is to say, the third instruction.

Overall Control Performed in the Third Embodiment

The overall control executed by the I/O processor in the third embodiment is performed in accordance with the flowchart in FIG. 36. Here, steps in the flowchart in FIG. 36 which are the same as the steps in the flowcharts of FIGS. 34 and 35 have been given the same reference numerals and their explanation has been omitted. In FIG. 36, the variable "Total" shows the value outputted by the selector 55 based on the content of the task management register 13 and is used to specify the upper limit for the number of instruction executions in a thread. The initial value of the variable Total is "4", indicating that a total of four instructions can be executed in a thread, although the variable can also be set at "2".

Figure 41:
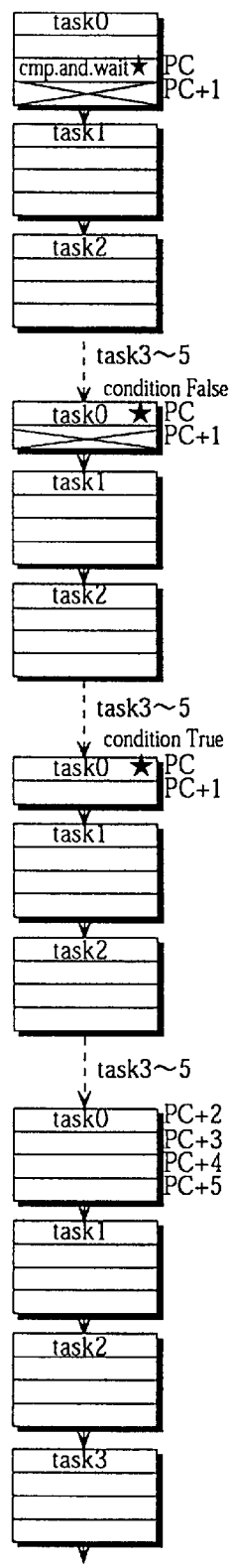
FIG. 41 shows how threads are assigned to tasks in the third embodiment.

FIG. 41 shows the transition between threads in the third embodiment. In FIG. 41, the first and second instructions in the first thread of task(0) have already been executed, with the third instruction being about to be read.

In step S93 of FIG. 36, the variable k is cleared to zero, and the variable Total is reset to "4". In step S2, the variable i is cleared to zero. In step S3, the read address of the task of the variable k that has been cleared to zero, which is to say, task(0), is read from the task-demarcated PC storage unit 24. In step S4, the read address of the task(0) is set as an absolute address in the instruction memory 100, and an instruction is read from the address indicated by the variable i as an offset value.

In step S81, it is judged whether the read instruction is a cmp_and_wait instruction. In step S82, the instruction decode control unit 81 and the calculation execution unit 84 refer to the state monitoring register j given as the first operand in the cmp_and_wait instruction and the immediate value given as the second operand and judge whether the phenomenon indicated by the cmp_and_wait instruction is present. When the stored value of the state monitoring register j and the immediate value do not match, the phenomenon is judged to be not present, so that the processing advances to step S83 where task k is set into a wait state before the processing advances to step S84. In step S84, the flip-flop 27 and the selector 25 set the address of the cmp_and_wait instruction as the read address so that the program count does not advance, with the processing then advancing to step S87.

Step S87 is the step for checking whether the maximum number of instructions have been executed, like step S6 in FIG. 35. While step S6 judges whether the value of the variable i has reached "4" to see whether four instructions have been executed as the condition for the execution of task switching, step S87 checks whether the variable i is equal to the variable Total as the condition for the execution of task switching. In the present iteration, the variable Total has not been updated, so that the check as to whether the variable i is equal to the variable Total is effectively a check as to whether the variable i is equal to "4". Since the cmp_and_wait instruction is included as the third instruction in the first thread of task(0) and the variable i is equal to "2", the processing advances from step S87 to step S7. After the variable i is incremented in step S7, a next instruction is read in step S4 so that the instruction following the cmp_and_wait instruction is read by the instruction decode control unit 81. The judgement "No" is given for the read instruction, and in step S85 the instruction decode control unit 11 judges that the phenomenon is not present for the immediately preceding instruction to judge whether the read address is set as the address of the cmp_and_wait instruction (whether a PC return has occurred).

Here, the instruction immediately preceding the instruction stored at the present address (adr+1) is the cmp_and_wait instruction, so that a PC return occurs when this cmp_and_wait instruction is decoded. As a result, the judgement "Yes" is given in step S85 and the processing advances to step S86. In step S86, the invalidation of the stored value of the general registers is requested to discard the instruction at the address (adr+1) read by the instruction decode control unit 11. As a result, the instruction shown as the fourth instruction in the first thread of task(0) in the task sequence of FIG. 40 is invalidated before the processing advances to step S87. Since the value of the variable i is "4", the result "Yes" is given for the judgement of whether the variable i equals the variable Total in step S87, so that the processing advances to step S88.

When the judgement "Yes" is given in step S87, this means that the execution of instructions has been completed for the present thread. In step S88, it is judged whether a PC return has occurred during the present thread. This judgement is made since it is necessary to store the return address when a PC return has occurred.

In the present example, the fourth instruction of task(0) is discarded and a PC return occurs during the third instruction, so that in step S89, the return address PC value is stored as the read address (adr) by the selector 25 and the flip-flop 27, before the processing advances to step S10. In step S10, the task round management unit 73 and the priority encoder 74 decide the next task by setting the value of the variable k, before the processing advances to step S90.

In step S90 to S92, it is judged whether the task indicated by the incremented variable k, which is to say the next task to be executed, is in a wait state, which affects the number of instructions in the next thread. In S90, the ID convertor 53 refers to the bit in the task management register 13 that corresponds to task(k) and judges whether task(k) is in a wait state. If this is the case, the selector 55 sets the variable Total at "2" in step S91, or else sets it at "4" in step S92.

Since task(1) is not in a wait state, the variable Total is set at "4" in step S91 and the processing returns to step S2. In the present example, task(1) does not include a cmp_and_wait instruction, so that the execution of an instruction is performed four times in the thread for task(1), before task switching is performed to the next task. The processing here is the same as in the first embodiment and so will not be described further.

Task switching is successively performed so that four instructions are executed for each of task(2), task(3), and task(4), none of which includes a cmp_and_wait instruction. Once four instructions have also been executed for task(5), the processing advances to step S10, where the variable k is set at "0". The processing then advances to step S90 where it is judged whether the bit k in the task management register 13 corresponding to task(k) is "1" or "0". This judgement refers to a judgement as to whether task(k) is in a wait state. Here, the value of the variable k is "0", and since task(0) was previously set into a wait state, the variable Total is set at "2" in step S91. It should be noted here that this variable Total sets the number of instruction executions in the next thread. Since the variable Total is reduced from "4" to "2" in step S91, this means that the number of instructions mapped into the next thread is reduced from "4" to "2". As a result, the variable i in the second thread for task(0) is only incremented from "1" to "2", which means that the processing in steps S81 to S85 and in step S5 are only repeated twice. When doing so, the read address of the cmp_and_wait instruction is stored in the task-demarcated PC storage unit 24 as the read address of task(0). The cmp_and_wait instruction is read from the read address in the same way as in the first thread, and a judgement is performed in step S82 to see whether the phenomenon has occurred. If in this case, the phenomenon has not occurred, the read address returns to the cmp_and_wait instruction and the processing in this second thread is completed.

Task switching is successively performed so that four instructions are executed for each of task(2), task(3), and task(4), none of which includes a cmp_and_wait instruction. Once four instructions have also been executed for task(5), task switching is performed and the third thread for task(0) is commenced.

Suppose here that the phenomenon awaited by the cmp_and_wait instruction of task(0) occurs. As a result, during the third thread of task(0), in step S82 the instruction decode control unit 81 will judge that the awaited phenomenon has occurred, so that the processing will advance to S80 and the wait state will be removed from the task in the task management register 13. Once this wait state is removed, the processing will advance from step S80 to S87, where the variable i is compared with the variable Total. In step S7, the variable i is incremented and in step S4 an instruction is read from the address (adr+1). A judgement is then performed in step S81 to see whether the read instruction is a cmp_and_wait instruction, but since this instruction is not a cmp_and_wait instruction, the processing advances to step S85. In step S85, it is judged whether the phenomenon for the immediately preceding instruction is not present and so has caused a PC return to occur. Since the phenomenon indicated by the cmp_and_wait instruction in the present example has occurred, the judgement "No" is given in step S85, the instruction following the cmp_and_wait instruction is at last executed in step S5 having had to wait two threads. After this following instruction is executed in step S5, the processing advances to step S87, where the variable i is compared with the variable Total. Since the variable Total is set at "2" during the second thread, the third thread for task(0) is completed after only two cycles. The processing then advances to step S88, where it is judged whether a PC return has occurred. This judgement is "No", so that in step S8 the variable i is incremented and in step S9 the read address (adr+1−1) of the task(k) is stored as the read address (adr). The processing then advances to step S10. In step S10, task switching is performed. As before, four instructions are executed for each of task(1), task(2), task(3), and task(4), none of which includes a cmp_and_wait instruction. Once four instructions have also been executed for task(5), task switching is performed and processing advances once more to step S90.

In step S90, the bit corresponding to task(k) in the task management register 13 is referred to in order to judge whether task(k) is in a wait state. In the present case, the wait state has been removed from task(0), so that the variable Total is set at "4" in step S92 and the processing returns to step S2. Since the value of the variable Total has been restored to "4", four instruction executions are hereafter performed in each thread for task(0)

Overall Control Performed in the Fourth Embodiment

Figure 37:
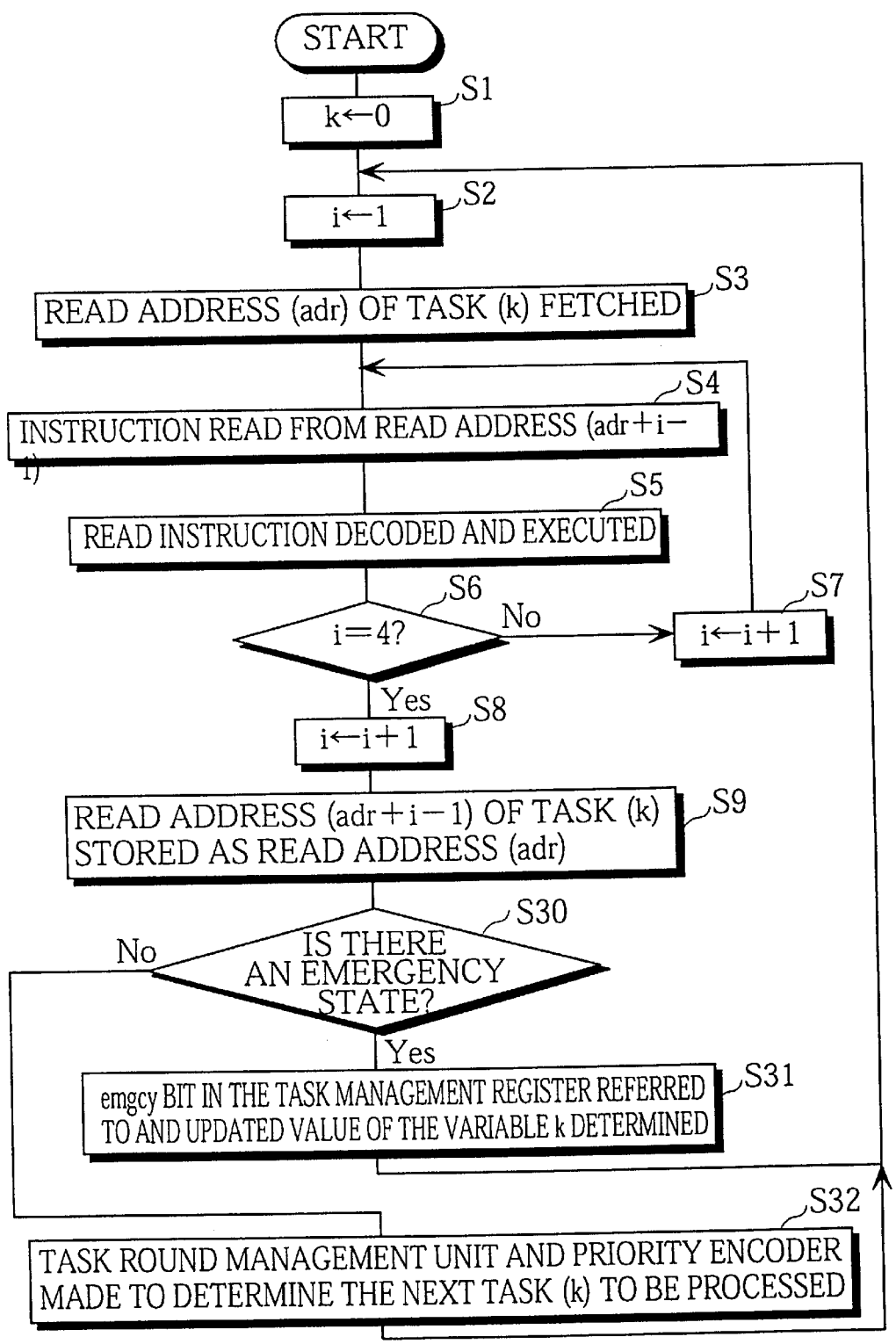
FIG. 37 is a flowchart showing the overall control of the I/O processor in the fourth embodiment.

FIG. 37 is a flowchart showing the entire control by the I/O processor in the fourth embodiment. In the flowchart in FIG. 37, steps S1 to S9 are the same as in the flowchart of FIG. 35.

The characteristic operations in the flowchart of FIG. 37 are steps S30, S31, and S32. In step S30, it is judged whether the emergency state transition permission signal iexecmode is "Low", and if the signal is "High", the processing advances to step S31 where the emergency task is determined as the next task to be executed.

On the other hand, when the emergency state transition permission signal iexecmode is "Low", the processing advances to step S32 where the priority encoder 80 is made to select the next task to be executed out of the normal tasks, based on the round value taskne.

Figure 42:
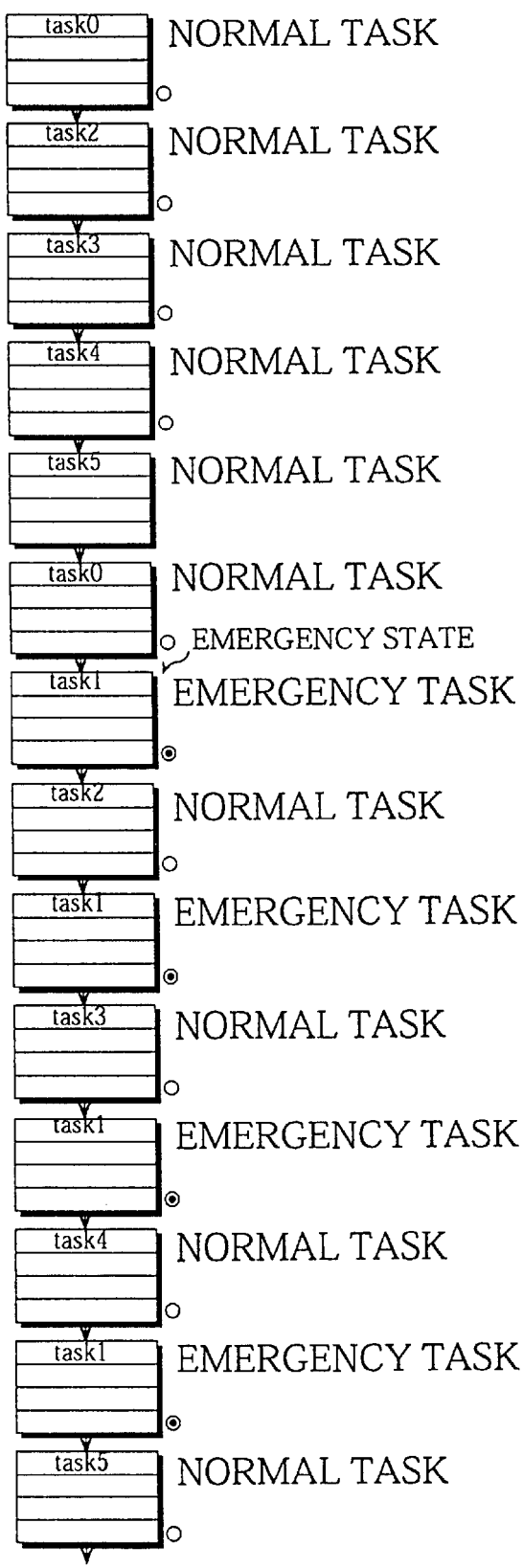
FIG. 42 shows how threads are assigned to tasks in the fourth embodiment.

FIG. 42 shows the transition between threads in this fourth embodiment. As shown in FIG. 42, when the processing starts with the AV decoder in a normal state, the processing in step S31 is skipped and, as shown in FIG. 41, the first thread for task(0), the first thread for task(2), the first thread for task(3), the first thread for task(4), and the first thread for task(5) are assigned in order.

Suppose that the emergency state transition permission signal iexecmode becomes "High" when a cycle of executions for the tasks taskne has been completed. After one task has been executed by the processing in steps S2 to S9, a branch is performed from step S30 to step S31. After this branch, the emergency task is performed in accordance with the "High" or "Low" value of the variable cstate shown in the cstate storage unit 85.

Overall Control Performed in the Fifth Embodiment

Figure 38:
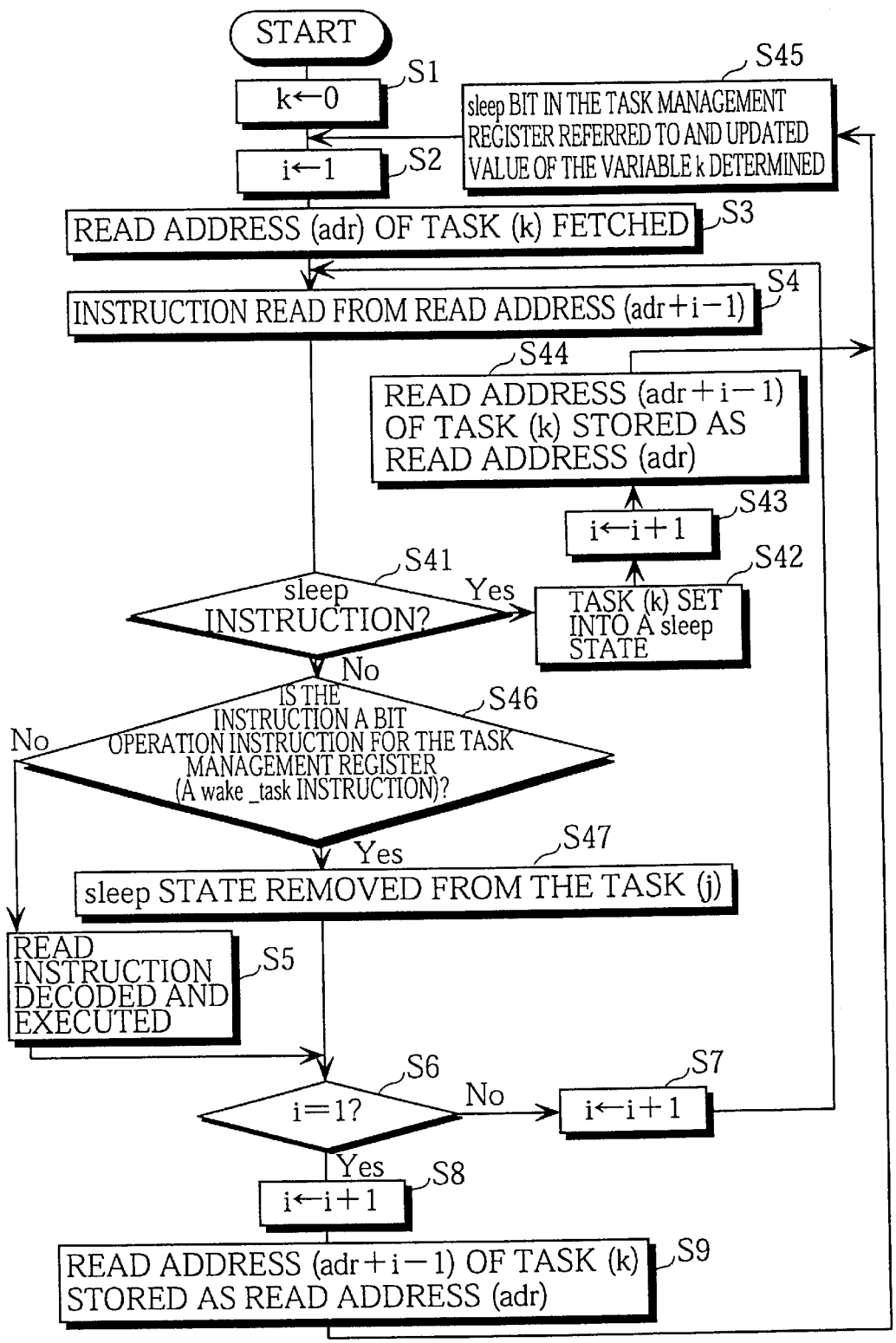
FIG. 38 is a flowchart showing the overall control of the I/O processor in the fifth embodiment.

FIG. 38 is a flowchart which shows the multitasking procedure in the fifth embodiment. This flowchart differs from the flowchart of the first embodiment in that steps S41 to S44, S46 and S47 have been inserted between step S4 and step S6.

In step S41, it is judged whether the instruction read from the task-demarcated PC storage unit 24 is a sleep instruction. If so, the processing advances to step S42. In step S42, the task management register 13 inverts the bit corresponding to task(k) to zero. Next, the variable i is incremented by one in step S43, in step S44 the read address (adr+i−1) of the task(k) is stored as the read address (adr), and the processing advances to step S45. In step S45, the inverter 94 and the OR circuit 95 generate a round value without the bit corresponding to the task for which the sleep state is indicated in the task management register 13, and output this round value to the priority encoder 74 which then determines the next task(k) to be executed. It should be noted here that the variable(k) is the variable that is used to specify one out of the six tasks stored in the instruction memory 100 and that the determination of this variable is the determination of a task to be switched to.

Step S45 described here differs from step S10 in that while step S10 determines the value of the variable k when the variable i equals "4", step S45 is performed whenever a sleep instruction is decoded, regardless of the value of the variable i. Since step S45 depends on the decoding of a sleep instruction and not on the value of the variable i, task switching is performed without waiting for four instructions to be executed for the present task.

In step S46, it is judged whether the instruction read from the read address(adr+1) is a wake_task instruction for any of the bits in the task management register 13. If not, the instruction is decoded and executed as before in step S5, or if so, the bit j specified by the wake_task instruction is operated on in step S47. As a result, the sleep state for task j is removed and the processing advances to step S6.

Figure 43:
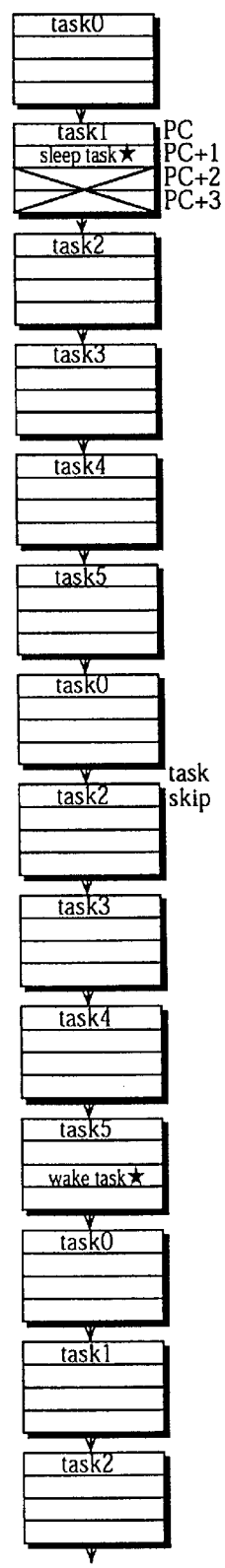
FIG. 43 shows how threads are assigned to tasks in the fifth embodiment.

FIG. 43 shows the transition between threads in this fifth embodiment. In this figure, a mark has been placed on the first thread of task(1), showing that the second instruction in the first thread of task(1) is a sleep instruction. In the same way as when a cmp_and_wait instruction is executed in the second embodiment, when such a sleep instruction is decoded as a second instruction in a thread, the processing in steps S41 to S44 is executed. After setting task(1) into a sleep state, a task switching is performed to effectively discard the processing for the third and fourth instructions in this thread.

As described in the first embodiment, task switching is then performed so that one cycle of executions of task(2), task(3), task(4), and task(5) is performed and the processing again reaches S45. At this point, the priority encoder 74 determines the next task to be executed from the round value taskn where the bit corresponding to the task in the sleep state is masked. In this example, the bit assigned to task(1) in the task management register 13 is set into a sleep state by the second instruction in the first thread of task(1). As a result, the execution of task(1) is skipped, and so the processing continues with the execution of the second thread of task(2).

As before, the task switching continues, so that a thread is assigned to each of task(2), task(3), task(4), and task(5) before the processing comes to step S45 once again.

Suppose that the third instruction in the second thread of task(5) is a wake_task instruction that indicates the removal of the wait state of task(1). When this instruction is read from the instruction memory 100, the judgement "Yes" will be given in step S46 and the processing will advance to step S47. In step S47, the bit assigned to task(1) in the task management register 13 is set at "off", so that the sleep state is removed for task(1). After this, the remaining instruction in the second thread of task(5) is executed as normal to complete the processing for the second threads.

After task(5) has been executed, task switching is performed to task(0). When the third thread for task(0) has been executed, the processing will come once again to step S45. In this example, the bit assigned to task(1) in the task management register 13 will be judged to be "off", since this is the setting that is made during the second thread for task(5). As a result, the processing will proceed to steps S2 and S3 where the execution of task(1) is recommenced.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A processor for processing n tasks, the processor comprising:

execution task indicating means for outputting a task identifier for one of the n tasks and, when execution of instructions has been performed for a number of instructions assigned to a task corresponding to the outputted task identifier, outputting a next task identifier in a predetermined order;

instruction indicating means for indicating one instruction at a time in order in the task corresponding to the outputted task identifier outputted by the execution task indicating means; and executing means for executing the instruction indicated by the instruction indicating means, wherein the execution task indicating means includes:

a task switching signal generator for counting a count number which is a number of times instructions are issued and for issuing a task switching signal when the count number becomes equal to the number of instructions assigned to the task corresponding to the outputted task identifier; and a task identifier outputting unit for generating the next task identifier in the predetermined order when the task switching signal has been issued, wherein the task switching signal generator includes:

a counter for counting a crock pulse; and a comparator for comparing a count value of the counter with the number of instructions that has been assigned to a presently selected task, and for outputting a task switching signal and resetting the counter when the count value matches the number of instructions.

2. The processor of claim 1, wherein the task switching signal generator includes:

a number of instructions storing unit for storing at least two different numbers of instructions; and a number of instructions selecting unit for selecting one of the numbers of instructions stored in the number of instructions storing unit according to the task identifier indicated by the execution task indicating means, wherein the number of instructions selected by the number of instructions selecting unit is inputted into the comparator to be used as the number of instructions that is compared with the count value.

3. The processor of claim 2, wherein the numbers of instructions stored by the number of instructions storing unit include a first fixed number of instructions and a second fixed number of instructions, the second fixed number of instructions being lower than the first fixed number of instructions, wherein the instruction indicating means includes a penalty task storing unit for storing an identifier of at least one penalty task, a penalty task being a task out of the n tasks that should be assigned the second fixed number of instructions, and wherein the number of instructions selecting unit includes:

a judging unit for judging, when the execution task indicating means outputs the next task identifier, whether the outputted next task identifier corresponds to an identifier for a penalty task; and a fixed number outputting unit for outputting the second fixed number of instructions stored by the number of instructions storing unit when the judging unit judges that the outputted next task identifier corresponds to an identifier for a penalty task.

4. The processor of claim 3, wherein at least one task in the n tasks includes a state monitoring instruction that indicates a presence of a phenomenon as a condition, wherein the executing means includes:

decoding means for decoding an instruction at the read address generated by the read address generating unit; and calculating means for executing, when the instruction decoded by the decoding means is a state monitoring instruction, a calculation to confirm whether a phenomenon, whose presence is indicated as a condition by the state monitoring instruction, is present, and wherein when a calculation result of the calculating means is that the indicated phenomenon is not present, the penalty task storing unit stores a task identifier of a task that includes the state monitoring instruction as an identifier of a penalty task.

5. An information processing system including the processor of claim 4, a buffer, and a memory, wherein the processor includes a plurality of state monitoring registers showing a state of the memory and the buffer, wherein each state monitoring instruction includes an indication of one out of the plurality of state monitoring registers and an indication of an immediate value, and wherein when the decoding result of the decoding means is a state monitoring instruction, the calculating means performs the calculation using a stored value of the state monitoring register indicated by the state monitoring instruction and the immediate value indicated by the state monitoring instruction.

6. A processor for processing n tasks, the processor comprising:

execution task indicating means for outputting a task identifier for one of the n tasks and, when execution of instructions has been performed for a number of instructions assigned to a task corresponding to the outputted task identifier, outputting a next task identifier in a predetermined order;

instruction indicating means for indicating one instruction at a time in order in the task corresponding to the outputted task identifier outputted by the execution task indicating means; and executing means for executing the instruction indicated by the instruction indicating means, wherein the execution task indicating means includes:

a task switching signal generator for counting a count number which is a number of times instructions are issued and for issuing a task switching signal when the count number becomes equal to the number of instructions assigned to the task corresponding to the outputted task identifier; and a task identifier outputting unit for generating the next task identifier in the predetermined order when the task switching signal has been issued, wherein the task identifier outputting unit includes:

an order storing unit for storing an output order for outputting each task identifier as the predetermined order of the n tasks; and a selection outputting unit for outputting, when a task switching signal has been issued by the task switching signal generator, a task identifier which is next in the output order stored by the order storing unit to the instruction indicating means, wherein at least one of the n tasks includes an emergency announcement instruction that indicates that a present task requires emergency treatment, wherein the executing means includes decoding means for decoding the instruction indicated by the instruction indicating means, and wherein the execution task indicating means includes:

an emergency task register for storing, when a decoding result of the decoding means is an emergency announcement instruction, a task identifier of a task that is indicated by the decoded emergency announcement instruction as a task that requires emergency treatment; and an output ratio control unit which (1) when no task identifier for an emergency task is stored in the emergency task register, forwards the task identifier outputted by the selection outputting unit to the executing means when a task switching signal is issued, and (2) when a task identifier for an emergency task is stored in the emergency task register, forwards, at a ratio of once every m task switching signals (where m 2), the task identifier for the emergency task stored in the emergency task register to the executing means, when a task switching signal is issued.

7. A processor for processing n tasks, the processor comprising:

execution task indicating means for outputting a task identifier for one of the n tasks and, when execution of instructions has been performed for a number of instructions assigned to a task corresponding to the outputted task identifier, outputting a next task identifier in a predetermined order;

instruction indicating means for indicating one instruction at a time in order in the task corresponding to the outputted task identifier outputted by the execution task indicating means; and executing means for executing the instruction indicated by the instruction indicating means, wherein the execution task indicating means includes:

a task switching signal generator for counting a count number which is a number of times instructions are issued and for issuing a task switching signal when the count number becomes equal to the number of instructions assigned to the task corresponding to the outputted task identifier; and a task identifier outputting unit for generating the next task identifier in the predetermined order when the task switching signal has been issued, wherein the task identifier outputting unit includes:

an order storing unit for storing an output order for outputting each task identifier as the predetermined order of the n tasks; and a selection outputting unit for outputting, when a task switching signal has been issued by the task switching signal generator, a task identifier which is next in the output order stored by the order storing unit to the instruction indicating means, wherein at least one of the n tasks includes an emergency announcement instruction that indicates that a present task requires emergency treatment, and wherein the execution task indicating means includes:

monitoring means for monitoring whether a predetermined signal has been inputted from a periphery of the processor to judge whether the periphery of the processor is in an emergency state;

an emergency task register for storing an identifier of an emergency task that should be given emergency treatment while the predetermined signal shows that the periphery of the processor is it an emergency state; and an output ratio control unit which (1) when no task identifier for an emergency task is stored in the emergency task register, forwards the task identifier outputted by the selection outputting unit to the executing means when a task switching signal is issued, and (2) when a task identifier for an emergency task is stored in the emergency task register, forwards, at a ratio of once every m task switching signals (where m 2), the task identifier for the emergency task stored in the emergency task register to the executing means when a task switching signal is issued.

8. The processor of claim 7, wherein the order storing unit includes an n-bit register for storing an n-bit array, each bit in the n-bit array corresponding to one of task identifiers of the n tasks, and wherein the output order of the task identifiers is decided by ordinal positions of the bits in the n-bit array that correspond to the task identifiers, calculated from one of a most significant bit end and a least significant bit end of the n-bit array.

9. The processor of claim 8, wherein a bit in the n-bit array which corresponds to a task identifier that has been outputted is set at "1" and a bit in the n-bit array which corresponds to a task identifier that is yet to be outputted is set at "0", wherein the task identifier outputting unit includes:

a bit setting unit for setting, when the next task identifier in the predetermined order has been outputted by the selection outputting unit, a bit in the n-bit array that corresponds to the outputted next task identifier to "1"; and a bit resetting unit for resetting the all bits in the n-bit array to "0" when all bits in the n-bit array have been set at "1" by the bit setting unit, and wherein the selection outputting unit includes a priority encoder which, based on a closest bit position to one of a most significant bit end or a least significant bit end of the n-array stored in the n-bit register to have a bit value of "0" and not "1", generates the next task identifier to be outputted and outputs the generated next task identifier to the execution task indicating means.

10. The processor of claim 9, wherein the task identifier outputting unit includes a mask unit for setting, when the emergency task register stores a task identifier of a task including an emergency announcement instruction, a bit in the n-bit array that is assigned to the task identifier stored in the emergency task register to "1".

11. The processor of claim 10, wherein the processor is provided in an AV decoder system that decodes video streams, wherein at least one emergency task is a task that outputs a result of decoding one of the video streams when the decoding of the one of the video streams has been completed by the AV decoder system, and wherein the predetermined signal monitored by the monitoring means is at least one of a horizontal return interval signal and vertical return interval signal for a display used to display an image signal.

12. The processor of claim 7, wherein the task switching signal generator includes:

a counter for counting a clock pulse; and a comparator for comparing a count value of the counter with the number of instructions that has been assigned to a presently selected task, and for outputting a task switching signal and resetting the counter when the count value matches the number of instructions.

13. The processor of claim 12, wherein the task switching signal generator includes:

a number of instructions storing unit for storing at least two different numbers of instructions; and a number of instructions selecting unit for selecting one of the numbers of instructions stored in the number of instructions storing unit according to the task identifier indicated by the execution task indicating means, wherein the number of instructions selected by the number of instructions selecting unit is inputted into the comparator to be used as the number of instructions that is compared with the count value.

14. The processor of claim 13, wherein the numbers of instructions stored by the number of instructions storing unit include a first fixed number of instructions and a second fixed number of instructions, the second fixed number of instructions being higher than the first fixed number of instructions, wherein the task identifier outputting unit includes:

an emergency task storing unit for storing at least one task identifier of an emergency task that should be assigned the second fixed number of instructions when the task identifier of the emergency task is next outputted, and wherein the number of instructions selecting unit includes:

a judging unit for judging, when the monitoring means judges that the predetermined signal inputted from the periphery of the processor is in an emergency state and a task identifier has been outputted by the execution task indicating means, whether the outputted task identifier is a task identifier for an emergency task; and a fixed number outputting unit for outputting the second fixed number of instructions to the comparator when the judging unit judges that the outputted task identifier is a task identifier for an emergency task.

15. A processor for processing n tasks, the processor comprising:

execution task indicating means for outputting a task identifier for one of the n tasks and, when execution of instructions has been performed for a number of instructions assigned to a task corresponding to the outputted task identifier, outputting a next task identifier in a predetermined order;

instruction indicating means for indicating one instruction at a time in order in the task corresponding to the outputted task identifier outputted by the execution task indicating means; and executing means for executing the instruction indicated by the instruction indicating means, wherein the execution task indicating means includes:

a task switching signal generator for counting a count number which is a number of times instructions are issued and for issuing a task switching signal when the count number becomes equal to the number of instructions assigned to the task corresponding to the outputted task identifier; and a task identifier outputting unit for generating the next task identifier in the predetermined order when the task switching signal has been issued, wherein the task identifier outputting unit includes:

an order storing unit for storing an output order for outputting each task identifier as the predetermined order of the n tasks; and a selection outputting unit for outputting, when a task switching signal has been issued by the task switching signal generator, a task identifier which is next in the output order stored by the order storing unit to the instruction indicating means, wherein at least one of the n tasks includes a sleep-inducing instruction which sets an execution state of a task into a sleep state, wherein the executing means includes decoding means for an instruction which is indicated by the instruction indicating means as the next instruction to be executed, wherein the execution task indicating means further includes a sleeping task register for storing, when a decoding result of the decoding means is a sleep-inducing instruction, a task identifier of a task indicated by the sleep-inducing instruction as a task that should be treated as a sleeping task, and wherein when a next task identifier stored in the order storing unit is a task identifier for a sleeping task, the selection outputting means outputs a task identifier following the task identifier for the sleeping task.

16. The processor of claim 15, wherein at least one task includes a forcible removal instruction that removes a sleep state for another task, and wherein the execution task indicating means includes a deleting unit for deleting, when a decoding result of the decoding means is a forcible removal instruction, a task identifier identified by the forcible removal instruction from the sleeping task register.

17. The processor of claim 16, wherein the order storing unit includes an n-bit register for storing an n-bit array, each bit in the n-bit array corresponding to one of task identifiers of the n tasks, and wherein the output order of the task identifiers is decided by ordinal positions of the bits in the n-bit array that correspond to the task identifiers, calculated from one of a most significant bit end and a least significant bit end of the n-bit array.

18. The processor of claim 17, wherein a bit in the n-bit array which corresponds to a task identifier that has been outputted is set at "1" and a bit in the n-bit array which corresponds to a task identifier that is yet to be outputted is set at "0", wherein the task identifier outputting unit includes:

a bit setting unit for setting, when the next task identifier in the predetermined order has been outputted by the selection outputting unit, a bit in the n-bit array that corresponds to the outputted next task identifier to "1"; and a bit resetting unit for resetting the all bits in the n-bit array to "0" when all bits in the n-bit array have been set at "1" by the bit setting unit, and wherein the selection outputting unit includes a priority encoder which, based on a closest bit position to one of a most significant bit end or a least significant bit end of the n-array stored in the n-bit register to have a bit value of "0" and not "1", generates the next task identifier to be outputted and outputs the generated next task identifier to the execution task indicating means.

19. The processor of claim 18, wherein the execution task indicating means includes:

a masking unit for masking, when the emergency task register is storing a task identifier for a task that includes a sleep-inducing instruction, a bit assigned to the sleeping task out of the n-bit array to "1"; and an unmasking unit for setting, when a decoding result of the decoding means is a forcible removal instruction, a bit in the n-bit array that is assigned to the task indicated by the forcible removal instruction to "0".

20. A processor for executing n tasks, the processor comprising:

number of cycles storing means which stores a number of cycles which is assigned to every task in the n tasks, the number of cycles being a maximum number of cycles from a start of execution of a task to a task switching to a next task, and a total time for a maximum number of cycles for all n tasks being set so as to be shorter than an interval for which an asynchronous phenomenon is present;

a counter for counting a count value based on a clock;

comparing means for comparing the count value of the counter with the number of cycles stored in the number of cycles storage means, and issuing a task switching signal and a counter reset signal when the count value of the counter is equal to the number of cycles;

selecting means for selecting a task when a task switching signal is inputted according to a predetermined order for selecting tasks;

instruction indicating means for successively indicating instructions in a task selected by the selecting means one instruction at a time; and executing means for executing an instruction indicated by the instruction indicating means for the task selected by the selecting means.

21. The processor of claim 20, wherein one of the tasks is assigned processing relating to the asynchronous phenomenon, and wherein the number of cycles, given by a product of a number of cycles assigned to the task assigned processing relating to the asynchronous phenomenon and a number of times the task assigned processing relating to the asynchronous phenomenon is selected during an occurrence interval of the asynchronous phenomenon, is greater than a required amount of processing in response to the asynchronous phenomenon.

22. The processor of claim 21, wherein the processor is provided in an AV (Audio-Visual) decoder system that also comprises a decoder unit for decoding audio streams and video streams, a local buffer that is used in decoding processing by the decoder unit, and an external memory, wherein n equals four, wherein a first task in the four tasks is a task for extracting an audio stream and a video stream from a bitstream inputted from a periphery of the AV decoder system and for writing the extracted audio stream and video stream into the external memory, wherein a second task in the four tasks is a task for supplying an audio stream and a video stream to be processed next from the external memory to the decoder unit as the decoding processing by the decoder unit progresses, wherein a third task in the four tasks is a task for reading video data out of a decoding result of the decoder unit from the external memory and outputting the read video data to an externally connected display in synchronization with a synchronization signal of the display, wherein a fourth task in the four tasks is a task for reading audio data out of a decoding result of the decoder unit from the external memory and outputting the read audio data to an externally connected speaker apparatus with a predetermined synchronization, and wherein the number of cycles assigned to each of the four tasks is four.

23. A processor for executing n tasks, comprising:

task selecting means for successively selecting one of the n tasks at intervals of a predetermined number of cycles;

instruction indicating means, having n sets of instruction indicating information which each correspond to a different one of the n tasks, which validates a set of instruction indicating information that corresponds to the task selected by the task selecting means and which dynamically generates information indicating which instruction should be read next according to the validated set of instruction indicating information; and executing means for reading the instruction indicated by the information generated by the instruction indicating means and executing the read instruction, wherein the instruction indicating means includes:

n address registers which each correspond to a different one of the n tasks, each address register storing an address value to be read next for a corresponding task as the set of instruction indicating information for the corresponding task;

a register selecting unit for selecting an address register corresponding to the task selected by the task selecting means and having an address value in the selected address register outputted;

a count value register for storing, when an address register has been selected by the register selecting unit, the address value stored in the selected address register as a starting count value;

an incrementor for incrementing the count value stored in the count value register in each cycle; and a read address storing unit for storing the count value incremented by the incrementor as an updated value for information that indicates an instruction to be read next.

24. The processor of claim 23, wherein the instruction indicating means includes:

a first selector for forwarding the count value incremented by the incrementor to the read address storing unit to have the count value stored in the read address storing unit and, when a task has been selected by the task selecting unit, selectively outputting an address value in the address register corresponding to the selected task to have the address value stored in the read address storing unit; and a first rewriting unit which, when switching is performed to a next task, uses the count value stored in the count value register to rewrite the address value stored in the address register that was selected by the register selecting unit before the switching.

25. The processor of claim 24, wherein at least one task includes a switching instruction that indicates a task switching should be performed, wherein the executing means includes decoding means for decoding an instruction specified by the address stored in the read address storing unit, wherein instruction indicating means further includes a second rewriting unit which, when a decoding result of the decoding means is a task switching instruction, uses a set of instruction indication information stored in the read address storing unit to rewrite an address value stored in the address register selected by the register selecting unit before task switching, wherein when the decoding result of the decoding means is a task switching instruction, the first selector selects a read address of an address register corresponding to a next task and has the read address stored in the read address storing unit.

26. The processor of claim 25, wherein at least one task includes a branch instruction that indicates an absolute address as a branch destination, wherein the instruction indicating means includes:

a third rewriting unit which, when the decoding result of the decoding means is a branch instruction, uses an absolute address in the branch instruction to rewrite an address value stored in the address register that was selected by the register selecting unit before task switching.

27. The processor of claim 26, wherein at least one task includes a branch instruction that has an indirect address indication as a branch destination, wherein the instruction indicating means includes:

a fourth rewriting unit which, when the decoding result of the decoding means is a branch instruction that has an indirect address indication and a branch destination address has been calculated by instruction execution by the executing means, uses the calculated branch destination address to rewrite an address value stored in the address register that was selected by the register selecting unit before task switching.

28. The processor of claim 27, wherein the executing means includes:

a general register set which is composed of n*m general registers, wherein m general registers are assigned to each of the n tasks;

a calculation executing unit for executing, when a task has been selected by the task selecting unit, a calculation for an instruction included in the selected task using the m general registers which correspond to the selected task.

* * * * *

UNITED STATES PATENT AND TRADEMARK OFFICE
CERTIFICATE OF CORRECTION

PATENT NO.     : 6,470,376 B1                                            Page 1 of 1
DATED          : October 22, 2002
INVENTOR(S)    : Takaharu Tanaka et al.

It is certified that error appears in the above-identified patent and that said Letters Patent is hereby corrected as shown below:

<u>Column 46,</u>
Lines 6 and 64, delete "(where m 2)" and insert -- (where $m \geq 2$) --.

Signed and Sealed this

Tenth Day of June, 2003

JAMES E. ROGAN
*Director of the United States Patent and Trademark Office*